(12) United States Patent
Koning et al.

(10) Patent No.: US 11,512,165 B2
(45) Date of Patent: *Nov. 29, 2022

(54) POLYMERS, PROCESSES, COMPOSITIONS AND USES

(71) Applicant: COVESTRO (NETHERLANDS) B.V., Geleen (NL)

(72) Inventors: Cornelis Eme Koning, Echt (NL); Theo Veldhuis, Echt (NL); Paulus Franciscus Anna Buijsen, Echt (NL); Jan Pieter Drijfhout, Echt (NL); Albertus Johannes Reuvers, Echt (NL); Rafael Jean Sablong, Echt (NL); Chunliang Li, Echt (NL)

(73) Assignee: COVESTRO (NETHERLANDS) B.V., Geleen (NL)

( * ) Notice: Subject to any disclaimer, the term of this patent is extended or adjusted under 35 U.S.C. 154(b) by 281 days.

This patent is subject to a terminal disclaimer.

(21) Appl. No.: 16/999,043

(22) Filed: Aug. 20, 2020

(65) Prior Publication Data

US 2021/0002419 A1 Jan. 7, 2021

Related U.S. Application Data

(63) Continuation of application No. 16/304,383, filed as application No. PCT/EP2017/062796 on May 26, 2017, now Pat. No. 10,875,959.

(30) Foreign Application Priority Data

May 27, 2016 (EP) .................................... 16171745

(51) Int. Cl.
*C08G 63/199* (2006.01)
*C08G 64/02* (2006.01)
*C09D 167/02* (2006.01)
*C09D 169/00* (2006.01)

(52) U.S. Cl.
CPC ......... *C08G 63/199* (2013.01); *C08G 64/025* (2013.01); *C08G 64/0241* (2013.01); *C09D 167/02* (2013.01); *C09D 169/00* (2013.01)

(58) Field of Classification Search
CPC .............. C08G 63/199; C08G 63/6856; C08G 63/6886; C08G 64/0208; C08G 64/0241; C08G 64/025; C08G 64/34; C09D 167/00; C09D 167/02; C09D 169/00
See application file for complete search history.

(56) References Cited

U.S. PATENT DOCUMENTS

| 5,026,676 | A | 6/1991 | Motika et al. |
| 10,875,959 | B2 * | 12/2020 | Koning ............... C08G 63/199 |
| 2011/0201779 | A1 | 8/2011 | Cherian |
| 2011/0257296 | A1 | 10/2011 | Lapointe |

FOREIGN PATENT DOCUMENTS

| WO | 2009/025850 | 2/2009 |
| WO | 2011/163133 | 12/2011 |

OTHER PUBLICATIONS

Carmen Martin et al "Terpolymers Derived from Limonene Oxide and Carbon Dioxide: Access to Cross-Linked Polycarbonates with Improved Thermal Properties", Macromolecules 2016, 49, 6285-6295 (Year: 2016).*
O. Hauenstein et al "Bio-based polycarbonate from limonene oxide and CO2 with high molecular weight, excellent thermal resistance, hardness and transparency", Green Chem., 2016, 18, 760 (Year: 2016).*
Chunliang Li et al "Synthesis and characterization of fully-biobased dihydroxyl poly(limonene carbonate )s and their initial evaluation in coating applications", European Polymer Journal 67 (2015) 449-458 (Year: 2015).*
C. Koning et al, "Synthesis and physical characterization of poly(cyclohexane carbonate),synthesized from CO2 and cyclohexene oxide," Polymer 42 (2001), 3995-4004 (Year: 2001).
Tim Stober et al., Bio-derived polymers for coating applications: comparing poly(limonene carbonate) and poly(cyclohexadiene carbonate), Polym. Chem., 2017,8,6099 (Year: 2017).
Hauenstein et al., "Bio-based polycarbonate as synthetic toolbox," Published Jun. 15, 2016 (Year: 2016).
Chunliang Li et al., "Chemoselective Alternating Copolymerization of Limonene Dioxide and Carbon Dioxide: A New Highly Functional Aliphatic Epoxy olycarbonate," Aug. 16, 2016 (Year: 2016).

* cited by examiner

*Primary Examiner* — Frances Tischler
*Assistant Examiner* — Gennadiy Mesh
(74) *Attorney, Agent, or Firm* — Nixon & Vanderhye P.C.

(57) ABSTRACT

Polymers and methods of making the same are described whereby the polymers generically include one or more units each of which necessarily has a 1,2,4-substituted cyclohexane group or a 1,1,2,4-substituted cyclohexane group. According to specific disclosures herein, polymers and methods of making the same are described whereby the polymers have one or more S1 units represented by the formula:

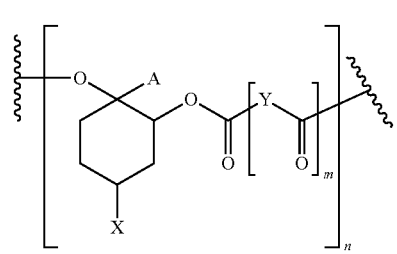

wherein n is an integer equal to or higher than 1, m is 0 or 1, A is H or $CH_3$, and wherein each of X and Y is a specifically defined group.

21 Claims, No Drawings

POLYMERS, PROCESSES, COMPOSITIONS AND USES

CROSS-REFERENCE TO RELATED APPLICATIONS

This application is a continuation of commonly owned U.S. Ser. No. 16/304,383, filed Nov. 26, 2018, (now U.S. Pat. No. 10,875,959), which is the U.S. national phase of International Application No. PCT/EP2017/062796 filed May 26, 2017 which designated the U.S. and claims priority to EP Patent Application No. 16171745.9 filed May 27, 2016, the entire contents of each of which are hereby incorporated by reference.

FIELD

The invention relates to a polymer comprising certain specific units. The invention further relates to processes for making the polymer of the invention. The invention further relates to a binder and compositions comprising the polymer, preferably to compositions suitable for paints and coatings. The invention relates in particular to water-borne, solvent-borne and powder coating compositions and preferably to curable water-borne, curable solvent-borne and curable powder coating compositions. The invention further relates to cured compositions. The invention further relates to objects, in particular coatings prepared from the compositions of the invention. The invention further relates to processes for making the compositions of the invention. The invention further relates to articles having coated thereon the compositions of the invention. The invention further relates to articles having coated and cured thereon the compositions of the invention. The invention further relates to various uses of the polymer of the invention, the binder of the invention, the composition of the invention, the cured composition of the invention, objects prepared from the compositions of the invention and various uses of articles having coated and optionally cured thereon the compositions of the invention.

BACKGROUND AND SUMMARY

Polymers are a large class of materials consisting of many small molecules (called monomers) that are linked together to form chains of various lengths. Polymers have been used for years in a variety of applications and continue to be used nowadays in a plethora of modern and high-tech applications. One of the major applications for polymers has been that of paints and coatings. Paints are typically liquid or powder compositions that after application to an article are able to form a thin continuous (uncured) films which once cured are transformed into solid films, known in the literature as coatings. Depending on their end use, coatings may be required to exhibit certain particular properties or property. One of the very desirable properties for a coating to exhibit is hardness measured by Koenig pendulum, known in the literature as Koenig (or König) hardness. Koenig hardness ('KH') is indicative of the ability of a coating to resist deformation of its surface; more particularly, a Koenig pendulum makes contact with a coating e.g. a coated panel through two steel balls. Koenig hardness is reported as the time (in seconds) for the swing to be dampened from a certain angle (e.g. 6 to 3° angle) from the perpendicular. Usually, coatings having high Koenig hardness give longer times. High Koenig hardness is very desirable because coatings that exhibit high Koenig hardness have higher resistance to surface deformation and thus resist degradation over longer periods of time; as a result, coatings having high Koenig hardness may have extended life-times and reduced maintenance costs. It is hard to achieve high Koenig hardness since it is a rather complex property. The complexity of the task to develop coatings having enhanced Koenig hardness becomes ever more complex once one wishes to also enhance the rate (the time after the coating is applied on an article) at which a coating develops and reaches high Koenig hardness. The faster the rate (or equally the shorter the time after the coating is applied to an article) a coating reaches high Koenig hardness, the better it is. The reason being a fast rate offers to the coating applicator fast turn-around time due to the fact that he can handle the coated articles at significant shorter times after coating the articles without risking damaging their coated surfaces. The complexity of the task to develop coatings having excellent Koenig hardness becomes even more complex once one wishes to combine said excellent Koenig hardness with a number of additional very desired properties such as excellent surface drying rate, and especially good (preferably) water resistance and good chemical resistance. Coatings possessing such an array of properties are highly desired since not only they present coaters with significant advantages but they are also attractive to the end-consumers since they are more resistant to the elements e.g. water/rain and require less maintenance.

WO 2011-163133 A1 (to Novomer Inc) disclosed aliphatic polycarbonate polymers (APCs) from the reaction of aliphatic oxides and carbon dioxide in the presence of a metal complex, and methods of making the same. Terpolymers incorporating two aliphatic oxides and carbon dioxide were also described. In one aspect WO 2011-163133 A1 provided polymers of the following formula wherein E, G, Ra, Rb, Rc, Rd, j, k and m were as shown in WO 2011-163133 A1.

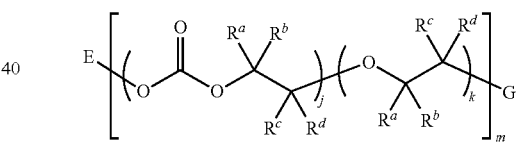

It is clear that these polymers are very different from the polymers of the present invention. In addition, WO 2011-163133 A1 is absolutely silent as to how to provide coatings that have all of the following very desired properties:

i) excellent enhanced Koenig hardness, and ii) good—preferably excellent—water resistance, and iii) excellent surface drying rate, and iv) good chemical resistance.

Therefore, WO 2011-163133 A1 not only fails to provide any motivation to one of ordinary skill in the art seeking to achieve coatings which combine all of the just above mentioned properties, to perhaps contemplate using its polymers coatings, but it also teaches away from the present invention by instructing one of ordinary skill in the art to use different polymers than those of the present invention.

WO 2009-025850 A2 (to Cornell Research Foundation Inc.) disclosed the preparation of polymers derived upon the polymerization of an epoxide and a cyclic anhydride. In one aspect (see claim 1 of) WO 2009-025850 A2 provided polymers of the following formula wherein Ra, Rb, Rc, Rd were as shown in WO 2009-025850 A2.

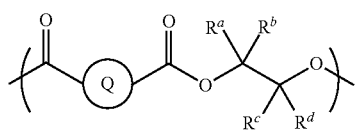

It is clear that these polymers are very different from the polymers of the present invention. In addition, WO 2009-025850 A2 is absolutely silent as to how to provide coatings that have all of the following very desired properties:
i) excellent enhanced Koenig hardness, and
ii) good—preferably excellent—water resistance, and
iii) excellent surface drying rate, and
iv) good chemical resistance.

Hence, WO 2009-025850 A2 not only fails to provide any motivation to one of ordinary skill in the art seeking to achieve coatings which combine all of the just above mentioned properties, to perhaps contemplate using its polymers coatings, but it also teaches away from the present invention by instructing one of ordinary skill in the art to use different polymers than those of the present invention.

Therefore, there is an unmet need and a desire for coatings that have all of the following very desired properties:
i) excellent enhanced Koenig hardness, and
ii) good—preferably excellent—water resistance, and
iii) excellent surface drying rate, and
iv) good chemical resistance.

It is therefore the object of the invention to provide coatings that have all of the just above mentioned properties i) to iv).

It was surprisingly found that the object of the invention was achieved by a polymer as described in the claims and as disclosed herein (see Examples and in particular Table 1). The coatings prepared from the polymer (or the compositions) of the invention, had a unique combination of:
i) excellent enhanced Koenig hardness, and
ii) good—preferably excellent—water resistance, and
iii) excellent surface drying rate, and
iv) good chemical resistance.

DETAILED DESCRIPTION

Broadly in accordance with the invention, there is provided a polymer as described in the claims and as disclosed herein.

Broadly in accordance with the invention, there is provided a process for making a polymer, as said process is disclosed herein.

Broadly in accordance with the invention, there is provided a binder as described in the claims and as disclosed herein.

Broadly in accordance with the invention, there is provided a composition as described in the claims and as disclosed herein.

Broadly in accordance with the invention, there is provided a cured composition as described in the claims and as disclosed herein.

Broadly in accordance with the invention, there is provided an article as described in the claims and as disclosed herein.

Broadly in accordance with the invention, there are provided various uses as described in the claims and as disclosed herein.

All combinations of minimum and maximum values of the parameters disclosed herein may be used to define the parameter ranges for various preferments or embodiments of the invention.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application can be combined with each other.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 1 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 3 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 4 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Definitions

By the term 'functional groups' is meant herein a covalently bonded group of atoms within a molecule, such as for example the carboxyl group, or the hydroxyl group or the oxirane group, that determines the chemical behaviour of said entity e.g. molecule, are capable of reacting and/or interacting with functional groups of another monomeric molecule or polymer and are responsible for the characteristic chemical reactions and/or chemical behaviour of those molecules.

By the term 'ionic functional group' is meant herein a functional group that comprises one or both of a cation and an anion.

By the term 'ionic monomer' is meant herein an organic monomer able to polymerize and which said monomer comprises ionic functional groups which said ionic functional groups are not consumed during the polymerization of said monomer. Exemplary ionic monomers include but are not limited to organic monomers comprising ammonium salt moieties, dicarboxylic sulfonic acids, dicarboxylic sulfonic acid salts, diesters of dicarboxylic sulfonic acids, diesters of dicarboxylic sulfonic acid salts, dicarboxylic phosphonic acids, dicarboxylic phosphonic acid salts, diesters of dicarboxylic phosphonic acids, diesters of dicarboxylic phosphonic acid salts, dicarboxylic sulfonic acid alkali metal salts e.g. 5-sulfoisophtalic acid sodium salt, diesters of dicarboxylic sulfonic acid alkali metal salts, dicarboxylic phosphonic acid alkali metal salts, diesters of dicarboxylic phosphonic acid alkali metal salts, dicarboxylic sulfonic acid amine salts, diesters of dicarboxylic sulfonic acid amine salts, dicarboxylic phosphonic acid amine salts, diesters of dicarboxylic phosphonic acid amine salts, dicarboxylic aromatic sulfonic acids, dicarboxylic aromatic sulfonic acid salts, diesters of dicarboxylic aromatic sulfonic acids, diesters of dicarboxylic aromatic sulfonic acid salts, dicarboxylic aromatic phosphonic acids, dicarboxylic aromatic phosphonic acid salts, diesters of dicarboxylic aromatic phosphonic acids, diesters of dicarboxylic aromatic phosphonic acid salts, dicarboxylic aromatic sulfonic acid alkali metal salts e.g. 5-sulfoisophtalic acid sodium salt, diesters of dicarboxylic aromatic sulfonic acid alkali metal salts, dicarboxylic aromatic phosphonic acid alkali metal salts, diesters of dicarboxylic aromatic phosphonic acid alkali metal salts, dicarboxylic aromatic sulfonic acid amine salts, diesters of dicarboxylic aromatic sulfonic acid amine salts, dicarboxylic aromatic phosphonic acid amine salts, diesters of dicarboxylic aromatic phosphonic acid amine salts. By the term 'functional polymer' is meant herein a polymer comprising functional groups.

By the term 'acid-functional' (referring to a polymer) is meant a polymer which predominantly has carboxyl functional groups, and has an acid value that is higher than its hydroxyl value. Preferably, an acid-functional polymer has a hydroxyl value (OHV) lower than 14 mg KOH/g, and an acid value (AV) of at least 14, more preferably of at least 14 and at most 300 mg KOH/g. The AV is measured as disclosed herein.

By the term 'hydroxyl-functional' (referring to a polymer) is meant a polymer which predominantly has hydroxyl functional groups, and has a hydroxyl value that is higher than its acid value. Preferably, a hydroxyl-functional polymer has an AV lower than 14 mg KOH/g, and an OHV of at least 14, more preferably of at least 14 and at most 500 mg KOH/g. The OHV is measured as disclosed herein.

By the term 'copolymerizable polymer' is meant herein a functional polymer that is able to react with one or both of Polymer and copolymerizable agent, and said functional polymer is neither a BHA compound, nor an EPX compound. Preferably the copolymerizable polymer is able to react with any copolymerizable agent present in a Composition. An example of copolymerizable polymer is copolymerizable polymer A as the latter is disclosed herein By the term 'Polymer' is meant herein a polymer according to the invention. The term 'Polymer' as used herein includes any and all of its preferments, combinations of its features and ranges as well as combinations of any and all of its preferments with any and all of the combinations of its features and ranges, e.g. the term Polymer includes acid-functional Polymer, PolymerCS, acid-functional PolymerCS, acid-functional PolymerCS P, etc, as each of them is disclosed herein. The Polymer is a functional polymer. The Polymer is able to react with one or both of copolymerizable polymer and copolymerizable agent. Preferably the Polymer is able to react with any copolymerizable agents present in a Composition.

By the term 'copolymerizable agent' is meant herein a compound which is able to react with at least the Polymer, and said compound is selected from the group consisting of BHA compounds, EPX compounds, monomeric compounds comprising functional groups, and mixtures thereof. Preferably the copolymerizable agent is able to react with any one of Polymer and any one of copolymerizable polymers present in a Composition.

By "BHA compound" is meant herein any compound which comprises at least two β-hydroxyalkylamide groups in its structure.

By "EPX compound" is meant herein any compound which comprises at least two oxirane groups in its structure.

By the term 'Composition' is meant herein a composition of matter according to the invention. The term 'Composition' as used herein includes any and all of its preferments, combinations of its features and ranges as well as combinations of any and all of its preferments with any and all of the combinations of its features and ranges. The Composition comprises a Binder. The Composition comprises a Binder and optionally a constituent B.

By the term 'Binder' is meant herein: i) the total of copolymerizable polymer and Polymer and ii) the total of constituent A, contained in a Composition. The term 'Binder' as used herein includes any and all of the its preferments, combinations of its features and ranges as well as combinations of any and all of its preferments with any and all of the combinations of its features and ranges; the Binder is obviously a component of the Composition.

By the term 'constituent A' is meant herein a component of the Composition wherein said component is selected from the group consisting of organic metal salt, thermal initiator, photoinitiator, copolymerizable agent and mixtures thereof. The term 'constituent A' as used herein includes any and all of its preferments, combinations of its features and ranges as well as combinations of any and all of its preferments with any and all of the combinations of its features and ranges.

By the term 'constituent B' is meant herein a component of the Composition wherein said component is selected from the group consisting of pigment, dye, additive and mixtures thereof. The term 'constituent B' as used herein includes any and all of its preferments, combinations of its features and ranges as well as combinations of any and all of its preferments with any and all of the combinations of its features and ranges.

By the term 'organic metal salt' is meant herein a metal salt of an organic acid and mixtures thereof. Preferably the metal of the metal cation of the organic metal salt is selected from the group consisting of Co, Mn, Fe, Ce, V, Pb, Nd, Zr, Bi, Ba, Al, Sr, Ca, Zn, Li, K. More preferably, the metal of the metal cation of the organic metal salt is selected from the group consisting of Co, Mn, Fe, Ce, V, Pb, Nd, Zr, Bi, Ba, Al, Sr, Ca, Zn, Li, K, and the anion is a carboxylate selected from the group consisting of OL1, OL2, OL3 and mixtures thereof, wherein OL01, OL2 and OL3 have the following formulae:

OL1

OL2

OL3 wherein
j is an integer equal to or higher than 1 and at most 34, and and Q1, Q2, Q3, Q4 is each independently selected from the group consisting of H, $CH_3$, $C_2H_5$, $C_3H$, $C_4H_9$ and $C_5$-$C_{20}$ saturated-hydrocarbyl. Preferably in OL1, Q1, Q2, Q3, Q4 is each independently selected from the group consisting of H and $C_1$-$C_{10}$ saturated-hydrocarbyl. Preferably in OL2, Q1 is $C_4H_9$ and Q2 is $C_2H_5$. Preferably in OL3, Q1 is $CH_3$ and Q2 and Q3 is each independently selected from a $C_1$-$C_{10}$ saturated-hydrocarbyl.

By the term 'anhydride group' is meant herein the group of atoms according to the following formula:

. . . —C(=O)—O—C(=O)— . . .

By the term 'unsaturation' is meant herein a cis- or trans-configured carbon-carbon double bond (carbon-carbon double bond unsaturation), or a carbon-carbon triple bond (carbon-carbon triple bond unsaturation).

By the term 'unsaturated' is meant herein that the relevant entity has at least one carbon-carbon double bond and no carbon-carbon triple bond.

By the term 'ethylenic unsaturation' is meant herein a non-aromatic cis- or trans-configured carbon-carbon double bond unsaturation according to the following formula:

. . . —CH=CH— . . .

By the term 'ethylenically unsaturated' is meant herein that the relevant entity comprises one or more ethylenic unsaturations and said entity has neither a carbon-carbon triple bond unsaturation, nor a carbon-carbon double bond unsaturation other than the ethylenic unsaturations.

By the term 'saturated' is meant herein that the relevant entity does not contain any unsaturation.

By the term 'non-cyclic' is meant herein that the relevant group or entity does not contain any closed ring structure such as for example a cyclohexane ring, a benzene ring, etc.

By the term 'hydrocarbon' is meant herein a chemical compound consisting of carbon and hydrogen only.

By the term 'hydrocarbyl' is meant herein a univalent organic group formed by removing a hydrogen atom from a saturated or unsaturated hydrocarbon. Exemplary hydrocarbyls include but are not limited to methyl, ethyl, phenyl, benzyl.

By the term 'saturated-hydrocarbyl' is meant herein a saturated hydrocarbyl. Exemplary saturated-hydrocarbyls include but are not limited to alkyls such as methyl, ethyl, propyl, butyl, pentyl, hexyl.

By the term 'optionally-substituted-hydrocarbyl' is meant herein a hydrocarbyl optionally substituted by one or more substituents.

By the term 'acyclic-hydrocarbyl' is meant herein a non-cyclic optionally substituted hydrocarbyl group that may optionally be ethyllenically unsaturated comprising preferably at least one and at most seven, more preferably at least one and at most five, most preferably at least one and at most three ethylenic unsaturations, especially three conjugated ethylenic unsaturations. Preferably the acyclic-hydrocarbyl is non-branched. Preferably the acyclic-hydrocarbyl is not substituted. Preferably the acyclic-hydrocarbyl is non-branched and not substituted.

By the term 'unsaturated-acyclic-hydrocarbyl' is meant herein a non-cyclic optionally substituted and ethyllenically unsaturated hydrocarbyl group comprising at least one and at most seven, more preferably at least one and at most five, most preferably at least one and at most three ethylenic unsaturations, especially three conjugated ethylenic unsaturations. Preferably the unsaturated-acyclic-hydrocarbyl is non-branched. Preferably the unsaturated-acyclic-hydrocarbyl is not substituted. Preferably the unsaturated-acyclic-hydrocarbyl unsaturated fatty acid is non-branched and not substituted. Preferably the unsaturated-acyclic-hydrocarbyl is non-branched and comprises at least one and at most seven, more preferably at least one and at most five, most preferably at least one and at most three ethylenic unsaturations, especially three conjugated ethylenic unsaturations. Preferably the unsaturated-acyclic-hydrocarbyl is not substituted and comprises at least one and at most seven, more preferably at least one and at most five, most preferably at least one and at most three ethylenic unsaturations, especially three conjugated ethylenic unsaturations. Preferably the unsaturated-acyclic-hydrocarbyl is non-branched and not substituted and comprises at least one and at most seven, more preferably at least one and at most five, most preferably at least one and at most three ethylenic unsaturations, especially three conjugated ethylenic unsaturations.

By the term 'hydrocarbylene' is meant herein a divalent organic group formed by removing two hydrogen atoms from a saturated or unsaturated hydrocarbon, the free valences of which are not engaged in a double bond. Exemplary hydrocarbylenes include but are not limited to methylene, 1,3-phenylene.

By the term 'saturated-hydrocarbylene' is meant herein a saturated hydrocarbylene.

By the term 'optionally-substituted-hydrocarbylene' is meant herein a hydrocarbylene optionally substituted by one or more substituents.

By the term 'substituent' is meant herein an atom or a group of atoms that replaces one or more hydrogen atoms attached to a parent structure. Exemplary substituents include but are not limited to oxygen, carboxyl, hydroxyl, amino, cyano, methoxy, formyl, imino, etc.

The term 'optionally substituted' and 'optionally substituted by one or more substituents' are used herein interchangeably.

By the term 'oil' is meant herein a naturally occurring oil (natural oil) which is a mixture of triglycerides.

By the term 'triglyceride' is meant herein a triester of glycerol and fatty acids.

By the term 'saturated fatty acid' is meant herein a non-cyclic, saturated, optionally substituted monocarboxylic acid having a carbon atom chain said carbon atom chain consisting of at least 4 and at most 34, preferably at least 8 and at most 34, more preferably least 10 and at most 34, even more preferably at least 12 and at most 34, especially at least 14 and at most 34, more especially at least 12 and at most 28 carbon atoms. Preferably the saturated fatty acid is non-branched. Preferably the saturated fatty acid is not substituted. Preferably the saturated fatty acid is non-branched and not substituted. Exemplary saturated fatty acids include but are not limited to, lauric acid [$CH_3(CH_2)_{10}COOH$], myristic [$CH_3(CH_2)_{12}COOH$], palmitic acid [$CH_3(CH_2)_{14}COOH$], stearic acid [$CH_3(CH_2)_{16}COOH$), arachidic acid [$CH_3(CH_2)_{18}COOH$], isostearic acid [$(CH_3)_2—CH—(CH_2)_{14}COOH$].

By the term 'unsaturated fatty acid' is meant herein a non-cyclic, ethyllenically unsaturated, optionally substituted monocarboxylic acid having a carbon atom chain said carbon atom chain consisting of at least 4 and at most 34, preferably at least 8 and at most 34, more preferably least 10 and at most 34, most preferably at least 12 and at most 34, especially at least 14 and at most 34, more especially at least 12 and at most 28 carbon atoms in its carbon atom chain. Preferably the unsaturated fatty acid is non-branched. Preferably the unsaturated fatty acid is not substituted. Preferably the unsaturated fatty acid is non-branched and not substituted. Preferably, the unsaturated fatty acid comprises at least one ethylenic unsaturation, more preferably at least one and at most seven, even more preferably at least one and at most five, most preferably at least one and at most three ethylenic unsaturations, especially three conjugated ethylenic unsaturations. Preferably, the unsaturated fatty acid is non-branched and comprises at least one ethylenic unsaturation, more preferably at least one and at most seven, even more preferably at least one and at most five, most preferably at least one and at most three ethylenic unsaturations, especially three conjugated ethylenic unsaturations. Preferably, the unsaturated fatty acid is not substituted and comprises at least one ethylenic unsaturation, more preferably at least one and at most seven, even more preferably at least one and at most five, most preferably at least one and at most three ethylenic unsaturations, especially three conjugated ethylenic unsaturations. Preferably, the unsaturated fatty acid is non-branched and not substituted and comprises at least one ethylenic unsaturation, more preferably at least one and at most seven, even more preferably at least one and at most five, most preferably at least one and at most three ethylenic unsaturations, especially three conjugated ethylenic unsaturations. Exemplary unsaturated fatty acids include but are not limited to, myristoleic acid [$CH_3(CH_2)_3CH=CH(CH_2)_7COOH$], palmitoleic acid [$CH_3(CH_2)_5CH=CH(CH_2)_7COOH$], oleic acid [$CH_3(CH_2)_7CH=CH(CH_2)_7COOH$], linoleic acid [$CH_3(CH_2)_4CH=CHCH_2CH=CH(CH_2)_7COOH$], linolenic acid [$CH_3CH_2CH=CHCH_2CH=CHCH_2CH=CH(CH_2)_7COOH$], pinolenic acid [$CH_3(CH_2)_4CH=CHCH_2 CH=CHCH_2CH_2CH=CH(CH_2)_3COOH$], α-alpha-linolenic acid [$CH_3CH_2CH=CHCH_2CH=CHCH_2CH=CH(CH_2)_7COOH$], arachidonic acid [$CH_3(CH_2)_4CH=CHCH_2 CH=CHCH_2CH=CHCH_2CH=CH(CH_2)_3COOH$], eicosapentaenoic acid [$CH_3CH_2CH=CHCH_2CH=CHCH_2CH=CHCH_2 CH=CHCH_2CH=CH(CH_2)_3COOH$], erucic acid [$CH_3(CH_2)_7CH=CH(CH_2)COOH$], docosahexaenoic acid [$CH_3CH_2CH=CHCH_2CH=CHCH_2CH=CHCH_2CH=CHCH_2CH=CHCH_2CH=CH(CH_2)_2COOH$], ricinoleic acid [$CH_3(CH_2)_5C(OH)HCH_2 CH=CH(CH_2)_7COOH$, stearidonic acid [$CH_3CH_2CH=CHCH_2CH=CHCH_2CH=CHCH_2 CH=CH(CH_2)_4COOH$], vaccenic acid [$CH_3(CH_2)_5 CH=CH(CH_2)_9COOH$], paullinic acid [$CH_3(CH_2)_5 CH=CH(CH_2)_{11}COOH$], elaidic acid [$CH_3(CH_2)_7 CH=CH(CH_2)_7COOH$], gondoic acid [$CH_3(CH_2)_7 CH=CH(CH_2)_9COOH$], nervonic acid [$CH_3(CH_2)_7 CH=CH(CH_2)_{13}COOH$], mead acid [$CH_3(CH_2)_7 CH=CHCH_2CH=CHCH_2CH=CH(CH_2)_3COOH$], docosahexaenoic acid [$CH_3CH_2CH=CHCH_2CH=CHCH_2CH=CHCH_2 CH=CHCH_2CH=CHCH_2CH=CH(CH_2)_2COOH$], γ-linolenic acid [$CH_3(CH_2)_4CH=CHCH_2CH=CHCH_2CH=CH(CH_2)_4COOH$], dihomo-γ-linolenic acid [$CH_3(CH_2)_4CH=CHCH_2CH=CHCH_2CH=CH(CH_2)_6COOH$], docosatetraenoic acid [$CH_3(CH_2)_4CH=CHCH_2CH=CHCH_2CH=CHCH_2CH=CH(CH_2)_5COOH$]. Unsaturated fatty acids may be obtained or derived from oils such as soya oil, sunflower oil, linseed oil, safflower oil, cottonseed oil, tung oil, tall oil soybean oil, dehydrated castor oil, calendula oil. Preferably the unsaturated fatty acids are obtained from oils. Preferably unsaturated fatty acids have an iodine number of at least 100 cg/g, more preferably of at least 120 to at most 200 cg/g. The iodine number (reported in cg/g) is measured according to DIN 53241-1.

By the term 'fatty acid' is meant herein an entity selected from the group consisting of saturated fatty acid, unsaturated fatty acid, and mixtures thereof; preferably the fatty acid is selected from the group consisting of unsaturated fatty acid and mixtures of unsaturated fatty acids, even more preferably the fatty acid is a mixture of unsaturated fatty acids. Exemplary fatty acids include but are not limited to, myristoleic acid [$CH_3(CH_2)_3CH=CH(CH_2)_7COOH$], palmitoleic acid [$CH_3(CH_2)_5CH=CH(CH_2)_7COOH$], oleic acid [$CH_3(CH_2)_7CH=CH(CH_2)_7COOH$], linoleic acid [$CH_3(CH_2)_4CH=CHCH_2CH=CH(CH_2)_7COOH$], linolenic acid [$CH_3CH_2CH=CHCH_2CH=CHCH_2CH=CH(CH_2)_7COOH$], pinolenic acid [$CH_3(CH_2)_4CH=CHCH_2 CH=CHCH_2CH_2CH=CH(CH_2)_3COOH$], palmitic acid [$CH_3(CH_2)_{14}COOH$], oleic acid [$CH_3(CH_2)_7CH=CH(CH_2)_7COOH$], α-alpha-linolenic acid [$CH_3CH_2CH=CHCH_2CH=CHCH_2CH=CH(CH_2)_7COOH$], arachidonic acid [$CH_3(CH_2)_4CH=CHCH_2 CH=CHCH_2CH=CHCH_2CH=CH(CH_2)_3COOH$], eicosapentaenoic acid [$CH_3CH_2CH=CHCH_2CH=CHCH_2CH=CHCH_2 CH=CHCH_2CH=CH(CH_2)_3COOH$], erucic acid [$CH_3(CH_2)_7CH=CH(CH_2)COOH$], docosahexaenoic acid [$CH_3CH_2CH=CHCH_2CH=CHCH_2CH=CHCH_2CH=CHCH_2CH=CHCH_2CH=CH(CH_2)_2COOH$], stearic acid [$CH_3CH_2(CH_2)_{15}COOH$), ricinoleic acid [$CH_3(CH_2)_5C(OH)HCH_2CH=CH(CH_2)_7 COOH$, stearidonic acid [$CH_3CH_2CH=CHCH_2 CH=CHCH_2CH=CHCH_2 CH=CH(CH_2)_4COOH$], vaccenic acid [$CH_3(CH_2)_5 CH=CH(CH_2)_9COOH$], paullinic acid [$CH_3(CH_2)_5 CH=CH(CH_2)_{11}COOH$], elaidic acid [$CH_3(CH_2)_7 CH=CH(CH_2)_7COOH$], gondoic acid [$CH_3(CH_2)_7 CH=CH(CH_2)_9COOH$], nervonic acid [$CH_3(CH_2)_7 CH=CH(CH_2)_{13}COOH$], mead acid [$CH_3(CH_2)_7 CH=CHCH_2CH=CHCH_2CH=CH(CH_2)_3COOH$], docosahexaenoic acid [$CH_3CH_2CH=CHCH_2CH=CHCH_2CH=CHCH_2CH=CHCH_2CH=CHCH_2CH=CH(CH_2)_2COOH$], γ-linolenic acid [$CH_3(CH_2)_4 CH=CHCH_2CH=CHCH_2CH=CH(CH_2)_4COOH$], dihomo-γ-linolenic acid [$CH_3(CH_2)_4CH=CHCH_2 CH=CHCH_2CH=CH(CH_2)_6COOH$], docosatetraenoic acid [$CH_3(CH_2)_4CH=CHCH_2CH=CHCH_2CH=CHCH_2 CH=CH(CH_2)_5COOH$], tung oil fatty acid, soya oil fatty acid, sunflower oil fatty acid, soybean oil fatty acid, linseed oil fatty acid, dehydrated castor oil fatty acid, tall oil fatty acid, and calendula oil fatty acid.

By the term 'tung oil fatty acid' is meant herein a mixture of: i) saturated fatty acids—if any—and ii) unsaturated fatty acids, wherein i) and ii) are derived from tung oil.

By the term 'soya oil fatty acid' is meant herein a mixture of: i) saturated fatty acids—if any—and ii) unsaturated fatty acids, wherein i) and ii) are derived from soya oil.

By the term 'sunflower oil fatty acid' is meant herein a mixture of: i) saturated fatty acids—if any—and ii) unsaturated fatty acids, wherein i) and ii) are derived from sunflower oil.

By the term 'soybean oil fatty acid' is meant herein a mixture of: i) saturated fatty acids—if any—and ii) unsaturated fatty acids, wherein i) and ii) are derived from soybean oil.

By the term 'linseed oil fatty acid' is meant herein a mixture of: i) saturated fatty acids—if any—and ii) unsaturated fatty acids, wherein i) and ii) are derived from derived from linseed oil.

By the term 'dehydrated castor oil fatty acid' is meant herein a mixture of: i) saturated fatty acids—if any—and ii) unsaturated fatty acids, wherein i) and ii) are derived from dehydrated castor oil.

By the term 'tall oil fatty acid' is meant herein a mixture of: i) saturated fatty acids—if any—and ii) unsaturated fatty acids, wherein i) and ii) are derived from tall oil.

By the term 'calendula oil fatty acid' is meant herein a mixture of: i) saturated fatty acids—if any—and ii) unsaturated fatty acids, wherein i) and ii) are derived from calendula oil.

By the term '$T_g$' is meant herein glass transition temperature and is measured as disclosed herein.

B the term '$M_n$' is meant herein number average molecular weight and is measured as disclosed herein.

By the term '$M_w$' is meant herein weight average molecular weight and is measured as disclosed herein.

By the term 'polydispersity' (abbreviated as 'D' and referring to a polymer) is meant herein:

$$D = M_w/M_n$$

wherein each of $M_w$ and $M_n$, is measured as described herein.

By the term 'oil length' (of a polymer) is meant herein:

$$\text{Oil length} = \frac{1,045 \times \text{weight of fatty acids}}{\text{weight of polymer} - \text{weight of water evolved}} \times 100$$

By the term 'functionality' (abbreviated as f) of a polymer is meant herein:

$$f = \frac{[M_n \times (AV + OHV)]}{56110}$$

wherein
$M_n$ is the number average molecular weight of the polymer and it is measured as disclosed herein,
AV is the acid value of the polymer and it is measured as disclosed herein,
OHV is the hydroxyl value of the polymer and it is measured as disclosed herein.

By the term 'Molar Ratio Q' (abbreviated as MRQ and referring to a polymer comprising at least one S1 unit) is meant herein:

$$MRQ = \frac{S_{total}}{S_{specific}} = \frac{S_{specific} + S_{rest}}{S_{specific}}$$

wherein
$S_{total} = S_{specific} + S_{rest}$, and
$S_{specific} =$ (total moles S1)+(total moles S2), and
$S_{rest} =$ the total moles of all the units of a polymer wherein said units are not any one of S1, S2.

The MRQ is by definition equal to or higher than 1. For example a polymer that has 1 mol of S1 and no S2, and 99 moles of all the other units together apart from S1, then said polymer has MRQ=100 (=100/1). The MRQ can be determined as disclosed herein.

By the term 'cyclo-epoxide' (abbreviated as CEPOX) is meant herein a chemical compound selected from the group consisting of I and II and mixtures thereof as each of I and are represented by the corresponding following formulae:

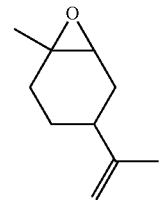

I

II

For convenience, the compound I is mentioned herein as CEPOX-1 and the compound is mentioned herein as CEPOX-2.

By the term 'mono-epoxide' is meant herein any chemical compound that comprises only one oxirane group in its structure and said chemical compound is not CEPOX. Exemplary mono-epoxides include but are not limited to the following mono-epoxides E1 to E29 and mixtures thereof. Preferably the mono-epoxide is selected from the group consisting of E1, E2, E3, E4, E5, E6, E7, E8, E9, E10, E11, E12, E13, E14, E15, E16, E17, E18, E19, E20, E21, E22, E23, E24, E25, E26, E27, E28, E29, and mixtures thereof, as each of E1 to E29 is represented by the following corresponding formula:

E1

E2

E3

-continued
E4 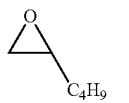
E5 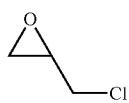
E6 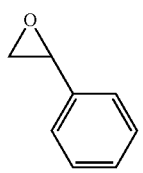
E7 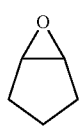
E8 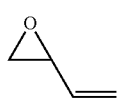
E9 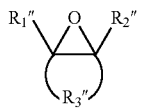
E10 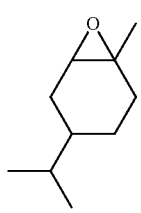
E11 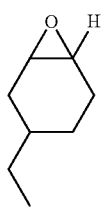
E12 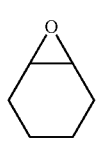
E13 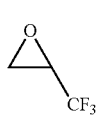
E14 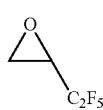
-continued
E15 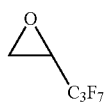
E16 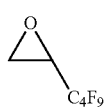
E17 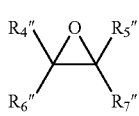
E18 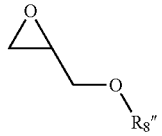
E19 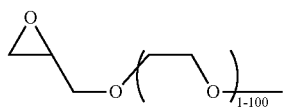
E20 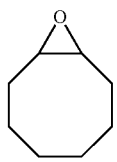
E21 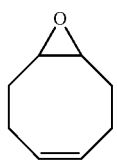
E22 
E23 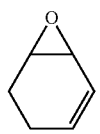
E24 
E25 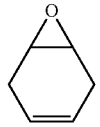

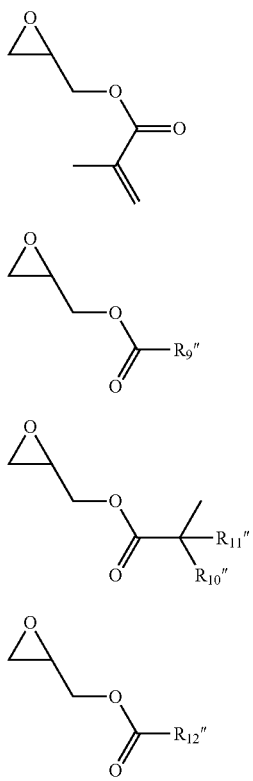

E26

E27

E28

E29 wherein $R_1''$, $R_2''$ is independently selected from the group consisting of H and $CH_3$, and $R_3''$, is $CH_2$ or a $C_2$-$C_{34}$ optionally-substituted-hydrocarbylene, and $R_4''$ $R_5''$ $R_6''$ $R_7''$ is independently selected from the group consisting of H, $CH_3$, and $C_2$-$C_{34}$ optionally-substituted-hydrocarbyl, $R_8''$ is a $C_1$-$C_{34}$ optionally-substituted-hydrocarbyl, $R_9''$ is a $C_1$-$C_{34}$ optionally-substituted-hydrocarbyl, and $R_{10}''$, $R_{11}''$ is independently selected from $C_1$-$C_{12}$ saturated-hydrocarbyl, and $R_{12}''$ is a $C_1$-$C_{34}$ unsaturated-acyclic-hydrocarbyl.

By the term 'LDO' is meant herein any and all isomers of limonene dioxide; typically, limonene dioxide (including also those grades that are resourced or produced from biorenewable resources) exists in four isomers having the following formulae 1a to 1d:

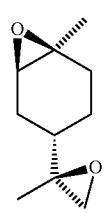

1S,2R,4S,8S

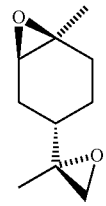

1S,2R,4R,8R

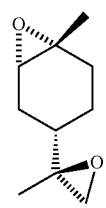

1R,2S,4R,8S

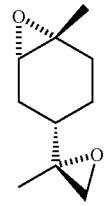

1R,2S,4R,8R

By the term 'anhydride A' is meant herein any chemical compound represented by the following formula AY, and mixtures of thereof:

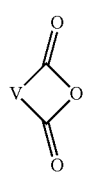

AY wherein V is selected from the group consisting of V1, V2, V3, V4, V5, V6, V7, V8, V9, V10, V11, V12, V13, V14, as each of V1 to V14 is defined below, and wherein the black bold dots shown in each of the formulae of any one of V1 to V14 represent the attachment points of each of V1 to V14 to the AY, wherein each attachment point is a carbon atom,

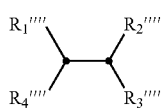

V1

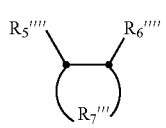

V2

-continued

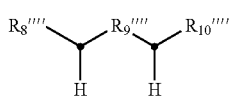
V3

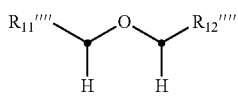
V4

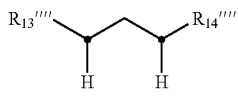
V5

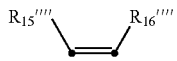
V6

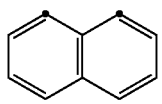
V7

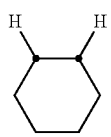
V8

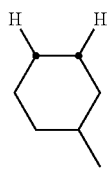
V9

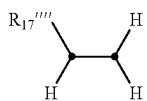
V10

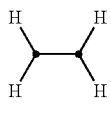
V11

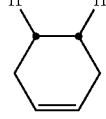
V12

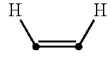
V13

V14 wherein
$R_1''''$, $R_2''''$, $R_3''''$, $R_4''''$, $R_5''''$, $R_6''''$, $R_8''''$, $R_{10}''''$, $R_{11}''''$, $R_{12}''''$, $R_{13}''''$, $R_{14}''''$, $R_{15}''''$, $R_{16}''''$, is each independently selected from the group consisting of H, $CH_3$, and $C_2$-$C_{34}$ optionally-substituted-hydrocarbyl, and
$R_7''''$ is either $CH_2$ or a $C_2$-$C_{34}$ optionally-substituted-hydrocarbylene, and
$R_9''''$ is a $C_2$-$C_{34}$ optionally-substituted-hydrocarbylene, and
$R_{17}''''$ is a $C_1$-$C_{34}$ optionally-substituted-hydrocarbyl, and
with the proviso that none of $R_1''''$ to $R_{17}''''$ comprises any carboxyl group and none of $R_1''''$ to $R_{17}''''$ comprises any anhydride group.

In view of this paragraph, the anhydride A is effectively selected from the group consisting of AYV1, AYV2, AYV3, AYV4, AYV5, AYV6, AYV7, AYV8, AYV9, AYV10, AYV11, AYV12, AYV13, AYV14, and mixtures thereof.

By the term 'AYV1' is meant herein an individual anhydride A wherein V is V1. The meaning of each of the terms 'AYV2', 'AYV3', 'AYV4', 'AYV5', 'AYV6', 'AYV7', 'AYV8', 'AYV9', 'AYV10', 'AYV11', 'AYV12', 'AYV13', 'AYV14', is analogous to that of 'AYV1'.

By the term 'organic cosolvent' is meant herein an organic solvent which is at least partially miscible with water. Preferably the cosolvent is completely miscible with water. Exemplary organic cosolvents include but are not limited to ethanol, propanol, butanol, propylene glycol, methoxypropylene glycol, dipropyleneglycol, dipropyleneglycol methylether, dipropyleneglycol dimethylether, ethyl diglycol, ethyl glycol acetate, butyl glycol, butyl glycol acetate, butyl diglycol, butyl diglycol acetate, methoxypropylene glycol acetate, acetone, methyl ethyl ketone.

By the term 'curing' or 'cure' is meant herein the process of becoming 'set' that is to form an irreversibly crosslinked network (the so-called 'cured form' or 'cured composition'), a material that can no longer flow, be melted or dissolved. Herein, the terms 'curing' 'cure' and 'crosslinking' are used interchangeably. The curing of the Composition may take place with or without the use of one or both of heat and radiation. If the curing of the Composition takes place using heat, then the curing is called 'heat curing'. For clarity, the term heat curing does not include ultraviolet (UV) or electron beam induced curing. If the curing of the Composition takes place using radiation i.e. UV and/or electron beam, curing is called 'radiation curing'.

By the term 'curable composition' is meant herein a composition that has the ability to cure at atmospheric pressure without the need to apply one or multiple of heat, radiation and pressure (above or below atmospheric pressure) in any combination, to induce and achieve the curing of the composition; heat, radiation and pressure (above or below atmospheric pressure) are not excluded but are not necessary for the curing of said composition. Thus, the term curable composition includes (and discloses) any one of and all of r.t.-curable, heat-curable and radiation-curable, heat/radiation curable compositions.

By the term 'r.t.-curable composition' is meant herein a composition that has the ability to cure at room temperature and at atmospheric pressure without the need to apply one or multiple of heating above room temperature, radiation and pressure (above or below atmospheric pressure) in any combination, to induce and achieve the curing of the composition; thus, heating above room temperature, radiation and pressure (above or below atmospheric pressure) are not excluded but are not necessary for the curing of said composition.

By the term 'heat-curable composition' is meant herein a composition that has the ability to cure at atmospheric pressure and at a temperature above the room temperature (elevated temperature) and that heating at elevated temperature is necessary to induce and achieve the curing of the composition; radiation and pressure (above or below atmospheric pressure) are not excluded but are not necessary for the curing of said composition.

By the term 'radiation-curable composition is meant herein a composition that has the ability to cure at atmospheric pressure and upon radiation i.e. UV and/or electron beam radiation and that said radiation is necessary to induce and achieve the curing of the composition; heating at elevated temperature and pressure (above or below atmospheric pressure) are not excluded but are not necessary for the curing of said composition.

By the term 'heat/radiation-curable composition' is meant herein a composition that can be one or both of a heat-curable and radiation-curable composition.

By the term 'cured composition' is meant herein an object that is derived upon, and/or obtainable by, and/or obtained by, and/or resulting from the curing of a composition; in other words a cured composition is a cross-linked composition; said curing may be effected via one or both of heat and radiation, preferably via heat; said object may have any shape, size or form and said object may for example be a coating; by 'coating' is meant herein a cured film that is derived upon, and/or obtainable by and/or obtained by, and/or resulting from partial or full curing of a composition; in other words a coating is a cured composition in the form of a film.

By the term 'powder' is meant herein, a substantially dry solid substance at room temperature and at atmospheric pressure reduced to a state of fine, loose particles wherein the individual particles have preferably a maximum particle size of at most 200, more preferably of at most 180, even more preferably of at most 160, most preferably of at most 150, especially of at most 140, more especially of at most 130, most especially of at most 120, for example of at most 110, for example of at most 100, for example of at most 90 µm at 23° C. and at atmospheric pressure; the individual particles have preferably a minimum particle size of at least 10, more preferably of at least 15, even more preferably of at least 20, most preferably of at least 25, especially of at least 30, more especially of at least 35, most especially of at least 40, for example of at least 45, for example of at least 50, for example of at least 60, for example of at least 70 µm at room temperature and at atmospheric pressure. A particle is defined as a small object that: a) has mean linear dimensions as described herein after and b) behaves as a whole unit in terms of its transport and properties. The particle size distribution (PSD) of a powder is a list of values or a mathematical function that defines the relative amounts of particles present, sorted according to size. The terms 'particle size' and 'particle size distribution' will be used interchangeably in the context of the invention when used in relation to a powder. The method used to measure the particle size of the thermosetting powder coating compositions of the invention is sieve analysis. According to it, the powder is separated on sieves of different sizes. Thus, the PSD is defined in terms of discrete size ranges: e.g. 'weight % of sample powder has particle size in the range of 75 microns to 90 microns', when sieves of these sizes are used. Preferably, 90 weight % of the thermosetting powder coating composition of the invention has a particle size in the range of 20 to 200 microns. The PSD can be determined for example by the following method: a certain amount of thermosetting powder coating composition, for example 100 g, is brought onto a Fritsch Analysette Spartan sieving apparatus equipped with a 200 micron sieve. The sample is sieved for 15 minutes at a 2.5 mm amplitude. The fraction of the sample which remained on the sieve was weighed after sieving. The fraction of the sample that went through the sieve (sieved fraction) is collected and is placed on a 160 micron sieve and is sieved as mentioned herein above. Once the same measurements (weighing) are performed as mentioned herein above, the same procedure is repeated using sequentially a 140, a 125, a 112, a 100, a 90, a 75, a 50 and a 20 micron sieve; the last sieved fraction with a size smaller than 20 micron is also weighed. Summing up the various weight fractions, this should yield the initial amount of sample, in this example 100 g. The various weight fractions represent the PSD as a list of values representing the relative amounts of particles present, sorted according to sieves used.

By "heat-curable powder compositions" is meant herein, a mixture of components in the form of a powder and which compositions are heat-curable thus they have the ability to form the so-called "cured form" or "cured composition" upon heating and curing at elevated temperatures and atmospheric pressure. For clarity, reference to any one of terms "heat-curable powder coating compositions" is to be understood as uncured heat-curable powder compositions. Heat-curable powder compositions are also known as 'thermosetting powder compositions. Heat-curable powder coating compositions (or equally thermosetting powder coating compositions) are examples of heat-curable powder compositions.

By the term 'substantially dry' is meant herein that the powder e.g. a powder composition, a heat-curable powder composition, does not comprise any deliberately added water or moisture but the powder may comprise moisture absorbed from the atmosphere or water present as a stabilizer of the peroxides in an amount of up to 30, preferably up to 20, more preferably up to 10, even more preferably up to 5, most preferably up to 3, especially up to 2, more especially up to 1% w/w based on the total weight of the entity to which the term substantially dry refers to; for example if the term substantially dry refers to a powder composition then the % w/w is based on the total weight of the powder composition.

By the term 'photoinitiator' is meant herein any organic or inorganic compound that is capable to generate free radicals, cations or anions upon exposure to UV radiation without the application of heat. Exemplary photoinitiators include but are not limited to:

i) acyl phosphines such as bis-acyl phosphine oxides such as 2,4,6,-trimethylbenzoyl diphenylphosphine oxide, and ii) α-hydroxy ketones, iii) α-cleavage free radical photoinitiators including benzoin and its derivatives such as benzoin ethers such as isobutyl benzoin ether, and benzyl ketals such as benzyl dimethyl ketal, 2-hydroxy-2-methyl-1-phenylpropan-1-one and 4-(2-hydroxyethoxy)phenyl-2-hydroxy-2-propyl ketone, and iii) aryl ketones such as 1-hydroxycyclohexyl phenyl ketone, 2-benzyl-2-dimethylamino-1-(4-morpholinophenyl)-butan-1-one, 2,2-dimethoxy-2-phenylaceto-phenone, mixture of benzophenone and 1-hydroxycyclohexyl phenyl ketone, perfluorinated diphenyl titanocene and 2-methyl-1-(4-(methylthiophenyl)-2-(4-morpholinyl))-1-propanone, and iv) hydrogen abstraction free radical type photoinitiators such as Michler's ketone (4-4'-bisdimethylamino benzophenone), Michler's ethyl ketone (4-4'-bisdiethylamino benzophenone ethyl ketone), benzophenone, thioxanthone, anthroquinone, d,l-camphorquinone, ethyl d,l-ccamphorquinone, ketocoumarin, anthracene and derivatives of each of them, and v) cationic photoiniators such as v-i) diaryliodonium salts, and copper synergists such as diphenyl iodonium hexafluorophosphate, dibenzyl iodonium hexafluorophosphate, dibenzyl iodonium hexafluoroarsinate, and copper acetate, v-ii) triarylsulfonium salts such as triphenyl sulphonium hexafluorophosphate, triphenyl sulphonium tetrafluoroborate, v-iii) dialkylphenacyl-sulfonium salts, ferrocenium salts such as cyclopentadienyl iron(II) hexafluorophosphate, (5-cyclopentadienyl)-bis(2,6-difluoro-3-[pyrr-1-yl]-phenyl titanium v-iv) alpha-sulfonyloxy ketone and v-v) silyl benzyl ethers.

By the term 'thermal initiator' is meant herein any organic or inorganic compound that is capable to generate free radicals at any temperature ranging from −20° C. up to 170° C. without the application of UV radiation. Preferably the thermal initiator has thermally liable groups. Preferably the thermal initiator is selected from the group consisting of peroxide, azo compound and mixtures thereof. Preferably the thermal initiator is a peroxide or a mixture of peroxides. Exemplary azo compounds include but are not limited to azo isobutyronitrile (AIBN), 1,1'-azobis(cyclohexanenitrile), 1,1'-azobis(2,4,4-trimethylpentane). Exemplary peroxides include but are not limited to diacyl peroxides, such as 2-4-diclorobenzyl peroxide, diisononanoyl peroxide, decanoyl peroxide, lauroyl peroxide, succinic acid peroxide, acetyl peroxide, benzoyl peroxide, and diisobutyryl peroxide, acetyl alkylsulfonyl peroxides, such as acetyl cyclohexylsulfonyl peroxide, dialkyl peroxydicarbonates, such as di(n-propyl)peroxy dicarbonate, di(sec-butyl)peroxy dicarbonate, di(2-ethylhexyl)peroxy dicarbonate, diisopropylperoxy dicarbonate, and dicyclohexylperoxy dicarbonate, peroxy esters, such as alpha-cumylperoxy neodecanoate, alpha-cumylperoxy pivalate, t-amyl neodecanoate, t-amylperoxy neodecanoate, t-butylperoxy neodecanoate, t-amylperoxy pivalate, t-butylperoxy pivalate, 2,5-dimethyl-2,5-di(2-ethylhexanoylperoxy)hexane, t-amylperoxy-2-ethyl hexanoate, t-butylperoxy-2-ethyl hexanoate, and t-butylperoxy isobutyrate, azobis, (alkyl nitrile) peroxy compounds, such as 2,2'-azobis-(2,4-dimethylvaleronitrile), azobisisobutyronitrile, and 2,2'-azobis-(2-methylbutyronitrile); t-butyl-peroxymaleic acid, 1,1'-azobis-(1-cyclohexanecarbonitrile). Other thermal initiators, include peroxy ketals, such as 1,1-di(t-butylperoxy)-3,3,5-trimethylcyclohexane, peroxy esters, such as o,o'-t-butyl-o-isopropyl monoperoxy carbonate, 2,5-dimethyl-2,5-di(benzoylperoxy) carbonate, o,o'-t-butyl-o-(2-ethylhexyl)-monoperoxy carbonate, t-butylperoxy acetate, t-butylperoxy benzoate, di-t-butyldiperoxy azelate, and di-t-butyldiperoxy phthalate, dialkylperoxides, such as dicumyl peroxide, 2,5-dimethyl-2,5-di(t-butylperoxy)hexane, t-butyl cumyl peroxide, di-t-butyl peroxide, and 2,5-dimethyl, 2,5-di(t-butylperoxy)hexyne-3,hydroperoxides, such as 2,5-dihydroperoxy-2,5-dimethyl hexane, cumene hydroperoxide, t-butyl hydroperoxide and t-amyl hydroperoxide, ketone peroxides, such as n-butyl-4,4-bis-(t-butylperoxy)valerate, 1,1-di(t-butylperoxy)-3,3,5-trimethyl cyclohexane, 1,1'-di-t-amyl-peroxy cyclohexane, 2,2-di(t-butylperoxy) butane, ethyl-3,3-di(t-butylperoxy)butyrate, and blend of t-butyl peroctoate, and 1,1-di(t-butylperoxy) cyclohexane. Other thermal initiators are o,o'-t-alkyl-o-alkylmonoperoxy carbonates, such as o,o'-t-butyl-o-isopropylmonoperoxy carbonate, p,p'oxybis(benzene sulfonyl) hydrazide, and accelerated azocarbonamide. For clarity, any reference herein to a thermal radical initiator refers to the chemical substance per se and not to mixtures with other chemical substances for example carrier material, as the latter is explained herein. For example when amounts regarding a thermal radical initiator are mentioned herein these amounts are associated to the chemical substance per se and not to its mixture with any carrier material for example water, if they happen to be provided in a mixture form with a carrier material (as carrier material is disclosed herein).

By the term 'peroxy group' is meant herein the group . . . —O—O— . . .

By the term 'azo group' is meant herein the group . . . C—N=N—C . . . , wherein C may be primary (one neighbouring C), secondary (two neighbouring C) or tertiary (three neighbouring C).

By the term 'thermally liable group' is meant herein a peroxy group and an azo group.

By the term 'dust-free time' (abbreviated as DFT) is meant herein the time reported ($t_{end}$) once the cotton wool test is carried out in order to assess the surface drying rate of a coating; this is further explained in detail in the Examples under Experimental Methods & Techniques.

By the term 'a coating has excellent Koenig hardness' is meant herein that the Koenig hardness (KH)—as this is measured as disclosed herein—is ≥70 seconds, preferably ≥80 seconds, more preferably 90 seconds.

By the term 'a coating has good water resistance' is meant herein that once the coating is subjected to the water resistance test as this is disclosed herein, the coating scores 4.

By the term 'a coating has excellent water resistance' is meant herein that once the coating is subjected to the water resistance test as this is disclosed herein, the coating scores 5.

By the term 'a coating has excellent surface drying rate' is meant herein that the DFT of the coating—as this is measured as disclosed herein—is ≤30 minutes, preferably ≤25 minutes, more preferably ≤20 minutes.

By the term 'a coating has good chemical resistance' is meant herein that the coating withstands at least 30 MEK double rubs as these are measured herein.

By the term 'a coating has poor Koenig hardness' is meant herein that the Koenig hardness (KH)—as this is measured as disclosed herein—is ≤30 seconds.

By the term 'a coating has insufficient Koenig hardness' is meant herein that the Koenig hardness (KH)—as this is measured as disclosed herein—is higher than 30 and at most 40 seconds.

By the term 'a coating has mediocre Koenig hardness' is meant herein that the Koenig hardness (KH)—as this is measured as disclosed herein—is higher than 40 and at most 50 seconds.

By the term 'a coating has good Koenig hardness' is meant herein that the Koenig hardness (KH)—as this is measured as disclosed herein—is higher than 50 and at most 69 seconds.

By the term 'a coating has very poor water resistance' is meant herein that once the coating is subjected to the water resistance test as this is disclosed herein, the coating scores 0.

By the term 'a coating has poor water resistance' is meant herein that once the coating is subjected to the water resistance test as this is disclosed herein, the coating scores 1.

By the term 'a coating has mediocre water resistance' is meant herein that once the coating is subjected to the water resistance test as this is disclosed herein, the coating scores 2.

By the term 'a coating has sufficient water resistance' is meant herein that once the coating is subjected to the water resistance test as this is disclosed herein, the coating scores 3.

By the term 'a coating has poor surface drying rate' is meant herein that the DFT of the coating—as this is measured as disclosed herein—is >30 minutes.

By the term 'a coating has good chemical resistance' is meant herein that the coating withstands at least 30 MEK double rubs as these are measured herein.

By the term 'a coating has poor chemical resistance' is meant herein that the coating withstands at most 29 MEK double rubs as these are measured herein.

By the term 'components of a composition' is meant herein constituent elements, their preferred embodiments and combinations thereof, that constitute part of the composition; said components, their preferred embodiments and combinations thereof, should be construed in view of the whole disclosure. For example the Polymer, the Binder, the constituent A, the constituent B are each a component of the Composition.

By the term 'unit' (or equally 'constitutional unit') (both terms referring to a polymer) is meant herein a group of atoms (with pendant atoms or groups, if any) comprising a part of the essential chemical structure of a polymer.

By the term 'S1' (used interchangeably with the term 'S1 unit') (referring to a Polymer) is meant herein a unit represented by the following formula:

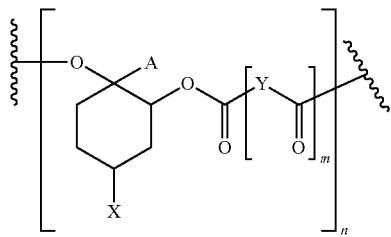

S1 wherein A, X, Y, m and n are as disclosed herein and as described in the claims. The term 'S1' comprises any possible variation of S1 ('S1 in any variation' or 'S1 unit in any variation' also interchangeable with the terms 'S1' and 'S1 unit'), that is any S1 which results from any combination of A, X, Y, m and n including any and all of the preferments of each of A, X, Y, m and n and combinations of said preferments. A Polymer may have more than one S1, each of which reads on formula S1—as the latter is disclosed herein—and each of which may have its own unique set of A, X, Y, m and n variants as A, X, Y, m and n are disclosed herein, said set of A, X, Y, m and n variants being different from one S1 unit to another S1 unit.

By the term 'S2' (used interchangeably with the term 'S2 unit') (referring to a Polymer) is meant herein a unit represented by the following formula:

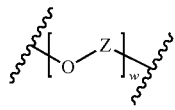

S2 wherein Z and w are as disclosed herein and as described in the claims. The term 'S2' comprises any possible variation of S2 ('S2 in any variation' also interchangeable with the terms 'S2' and 'S2 unit'), that is any S2 which results from any combination of Z and w including any and all of the preferments of each of Z and w and combinations of said preferments. A Polymer may have more than one S2, each of which reads on formula S2—as the latter is disclosed herein—and each of which may have its own unique set of Z and w variants as Z and w are disclosed herein, said set of Z and w variants being different from one S2 unit to another S2 unit.

By the term 'lower than' is meant herein that the relevant maximum boundary value is not included in the range.

By the term 'higher than' is meant herein that the relevant minimum boundary value is not included in the range.

For all upper and lower boundaries of any parameters given herein, the boundary value is included in each range for each parameter. All combinations of minimum and maximum values of the parameters described herein may be used to define the parameter ranges for various embodiments and preferences of the invention.

In the context of the present invention unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying in between the more preferred and the less preferred of said alternatives, is itself preferred to said less preferred value and also to each value lying between said less preferred value and said intermediate value.

By the term 'pph' is meant herein weight parts per hundred weight parts.

By the term 'room temperature' (abbreviated as 'r.t.') is meant herein a temperature of 23±2° C.

By 'standard drying conditions' is meant herein that all of the following conditions are applied: i) relative humidity of 50±10%, ii) room temperature, and iii) air flow of less than or equal to 0.1 m/s.

By the term 'article' is meant herein an individual object or item or element of a class designed to serve a purpose or perform a special function and can stand alone; the article can be in any size, form or shape. A substrate is an example of an article. Preferably, said article is selected from the group consisting of heat-sensitive articles, non-heat sensitive articles and combinations thereof; more preferably said article is selected from the group of non-heat sensitive articles, even more preferably said article is selected from the group consisting of thermoplastic composite, thermoset composite, fibre reinforced composites, sandwich materials e.g. sandwich materials comprising heat sensitive foam core, metal and combinations thereof. Typical examples of non-heat-sensitive articles include glass, ceramic, composite, fiber cement board, or metal, for example aluminum, copper or steel articles, for instance carbon steel, where the main alloying constituent is carbon. Carbon steel usually contains carbon 0.2 and 1.5% w/w based on the total alloy composition and often contains other constituents such as manganese, chromium, nickel, molybdenum, copper, tungsten, cobalt, or silicon, depending on the desired steel properties. Steel has properties similar to iron if the amount of carbon is not too high, for example not more than 1.5% w/w based on the total alloy composition. The steel may be surface treated (treatment with zinc, or zinc phosphate or iron phosphate etc.) or non-surface treated. Heat-sensitive articles for example heat-sensitive substrates, include plastic articles, wood articles for example solid wood, such as for example: hard wood, soft wood, plywood; veneer, particle board, low density fibre board, medium density fibreboard and high density fibreboard, OSB (Oriented Strand Board) wood laminates, chipboard and other articles in which wood is an important constituent, such as for example foil covered wooden articles, engineered wood, plastic modified wood, plastic articles or wood plastic compounds (WPC); articles with cellulosic fibres, for example cardboard or paper articles; textile and leather articles. Examples of plastic articles include unsaturated polyester resin based compositions, ABS (acrylonitrile butadiene styrene), melamineformaldehyde resins, polycarbonate, polyethylene, polypropylene, ethylene-propylene-diene monomer (EPDM), thermoplastic olefin (TPO), polyurethane (PU), polypropylene oxide (PPO), polyethylene oxide (PEO), polyethyleneterephthalate and nylon, for example polyamide 6,6 and combinations thereof, for example polycarbonate-ABS. Other heat-sensitive articles include objects that are a combination of a non-heat-sensitive part such as metal parts with a heat-sensitive part, such as any one of the aforementioned for example plastic hosing with heavy metal parts, strips for example aluminium frames with heat strips etc. The article can be a domestic furniture, such as tables, chairs, cabinets, etc., bedroom and bathroom furniture, office furniture, contract furniture such as school and child furniture, hospital furniture, restaurant and hotel furniture, kitchen cabinets and furniture, (flat) panels for interior design, interior and exterior windows and doors, interior and exterior window frames and door frames, exterior and interior sidings and flooring, articles for automotive applications, such as interior car parts, wheel covers, bumpers, under the hood parts etc., flexible flooring, sporting goods, cosmetics, audiovisual applications, such as TV sets, computer housing, phones, etc., household appliances and satellite dishes.

The term 'water-borne composition' includes any and all of the following: i) water-reducible composition (also known as aqueous dispersion), that is a polymer solution in water, or a polymer dispersion in water, or a polymer dispersion in mixtures of water and cosolvent, ii) latex, that is a dispersion of solid polymer particles in water, and iii) emulsion, that is a dispersion of liquid into liquid, for example liquid into water.

Any characterization of the physical state e.g. liquid, solid, paste, powder, of an entity such as the Polymer, the Binder, the Composition, refers to said physical form as observed at room temperature and at atmospheric pressure. For example if it is said that the Composition is liquid, this means that the Composition is liquid at room temperature and at atmospheric pressure.

By the term 'catalyst A' is meant herein a chemical compound selected from the group consisting of the chemical compounds disclosed in i) to iii) as each of i) to iii) is disclosed below:

i) amino-triphenolate aluminum metal complexes e.g. wherein the metal is Fe or Al (see an example of said metal complex below wherein the metal is Al) with PPN-halogen co-catalyst e.g. wherein the halogen is Cl or Br or I (see an example of said co-catalyst below wherein the halogen is Cl), as disclosed in Peña Carrodeguas, L.; González-Fabra, J.; Castro-Gómez, F.; Bo, C.; Kleij, A. W. Chemistry—A European Journal, 13 Apr. 2015, 21(16):6115-6122).

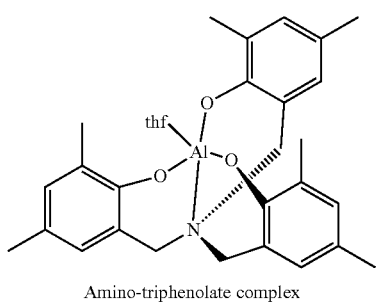

Amino-triphenolate complex

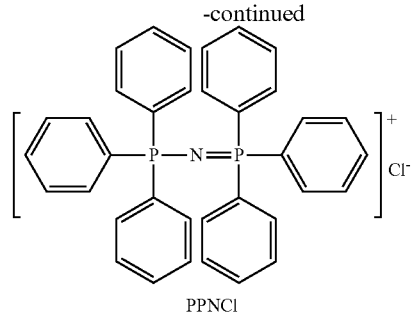

PPNCl ii) β-diketiminato zinc complexes as disclosed in any one and all of the following scientific publications: Ming Cheng, Emil B. Lobkovsky and Geoffrey W. Coates, Journal of the American Chemical Society 1998, 120 (42), 11018-11019; Cheng, M.; Darling, N. A.; Lobkovsky, E. B.; Coates, G. W. Chem. Commun. 2000, 2007-2008.; Ming Cheng, David R. Moore, Joseph J. Reczek, Bradley M. Chamberlain, Emil B. Lobkovsky, and, and Geoffrey W. Coates; Journal of the American Chemical Society 2001, 123 (36), 8738-8749, iii) (Et-BDI)Zn[N(SiMe$_3$)$_2$ is a zinc β-diiminate complex having the following formula:

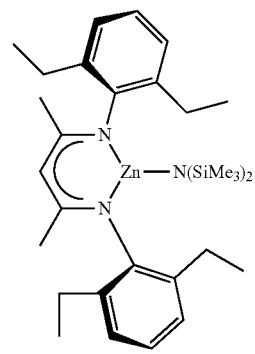

By the term 'catalyst B' is meant herein a chemical compound selected from the group consisting of the chemical compounds disclosed for catalyst A, and the chemical compounds disclosed in any one of i) to xxiii), as each of i) to xxiii) is disclosed below:

i) Phenoxide systems: include any one of the various catalysts described and prepared in any one of: D. J. Darensbourg, M. W. Holtcamp; Macromolecules, 28 (1995), p. 7577; D. J. Darensbourg, M. W. Holtcamp, G. E. Struck, M. S. Zimmer, S. A. Niezgoda, P. Rainey, J. B. Robertson, J. D. Draper, J. H. Reibenspies; J. Am. Chem. Soc., 121 (1999), p. 107; C. Koning, J. Wildeson, R. Parton, B. Plum, P. Steeman, D. J. Darensbourg; Polymer, 42 (2001), p. 3995; D. J. Darensbourg, J. R. Wildeson, J. C. Yarbrough, J. H. Reibenspies; J. Am. Chem. Soc., 122 (2000), p. 12487; D. J. Darensbourg, M. S. Zimmer, P. Rainey, D. L. Larkins; Inorg. Chem., 39 (2000), p. 1578.

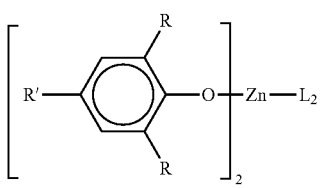

R = Ph, $^t$Bu, $^i$Pr, Me, H, F
R' = Me, H
L = Et$_2$O, THF, Pyridine

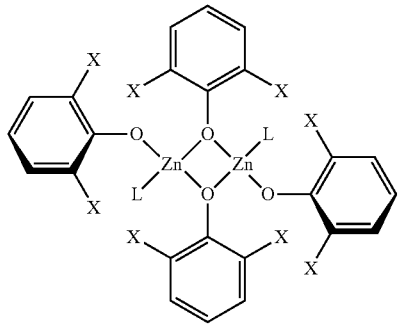

a: X = F, L = THF,
b: X = Cl, L = THF,
c: X = Br, L = THF,
d: X = F, L = PCy$_3$

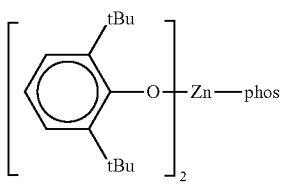

phos = PPh$_2$Me, PCy$_3$ ii) Schiff base zinc complex; mononuclear bis-salicylamidinato zinc catalysts: include any one of the various catalysts described and prepared in any one of: Donald J. Darensbourg, Patrick Rainey, and, and Jason Yarbrough; Inorganic chemistry 2001, 40(5), 986-993; Yonghang Xu, Min Xiao, Shuanjin Wang, Mei Pana and Yuezhong Meng; Polym. Chem. 2014, 5, 3838-3846. A typical example of this type of catalyst has the following formula:

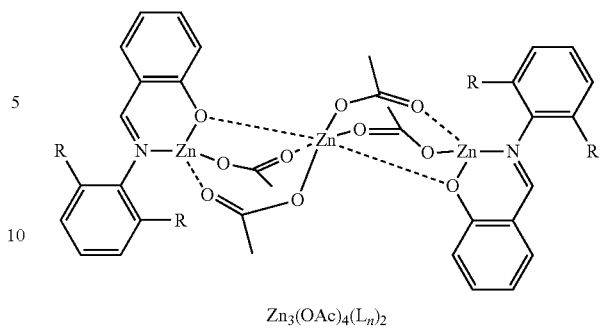

Zn$_3$(OAc)$_4$(L$_n$)$_2$ iii) Porphyrin systems (mononuclear and dinuclear metal complexes): include any one of the various catalysts described and prepared in any one of: Aida, T.; Maekawa, Y.; Asano, S.; Inoue, S. Macromolecules 1988, 21, 1195; Mang, S.; Cooper, A. I.; Colclough, M. E.; Chauhan, N.; Holmes, A. B. Macromolecules 2000, 33, 303.; Darensbourg, D. J.; Yarbrough, J. C.; Ortiz, C.; Fang, C. C. J. Am. Chem. Soc. 2003, 125, 7586.; Qin, Z. Q., Thomas, C. M., Lee, S., Coates, G. W. Angew. Chem. Int. Ed. 2003, 42, 5484.; Paddock, R. L.; Nguyen, S. Macromolecules 2005, 38, 6251.; Sugimoto, H.; Ohshima, H.; Inoue, S. J. Polym. Sci., Part A 2003, 41, 3549.; Anderson, C. E., Vagin, S. I., Hammann, M., Zimmermann, L. and Rieger, B. (2013), Copolymerisation of Propylene Oxide and Carbon Dioxide by Dinuclear Cobalt Porphyrins. ChemCatChem, 5: 3269-3280. A typical example of this type of catalyst has the following formula:

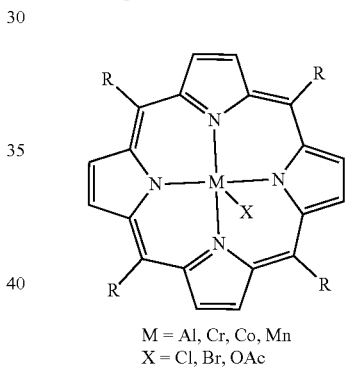

M = Al, Cr, Co, Mn
X = Cl, Br, OAc

These catalysts may be used together with a co-catalyst also described in the above citations. A typical example of a co-catalyst has the following formula:

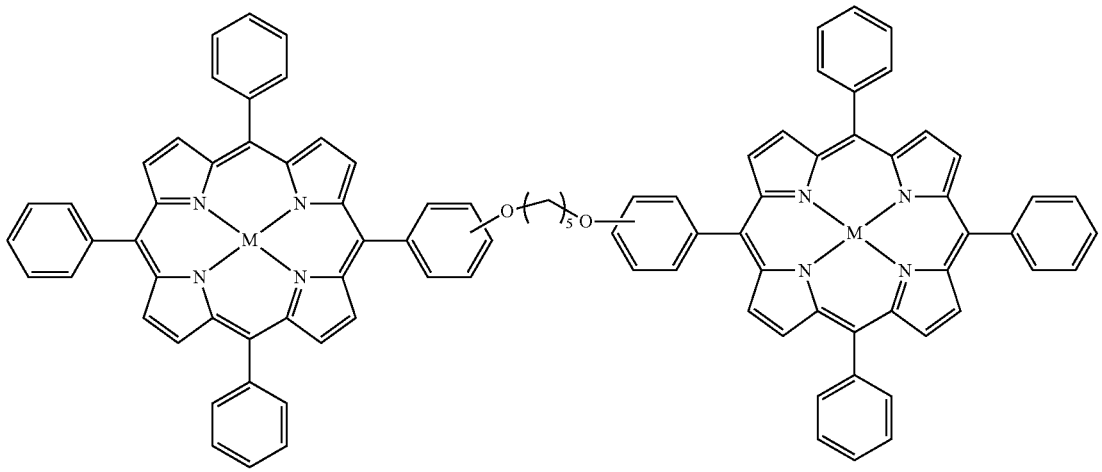

iv) p-oxo-b-diimine (BODDI) systems (potential catalysts): include any one of the various catalysts described and prepared in any one of: Scott D Allen, David R Moore, Emil B Lobkovsky, Geoffrey W Coates, Journal of Organometallic Chemistry, Volume 683, Issue 1, 7 Oct. 2003, pp. 137-148. A typical example of this type of catalyst has the following formula:

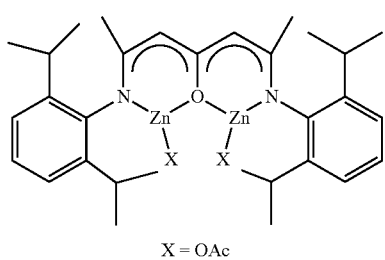

X = OAc v) Trost's intramolecular dinuclear zinc complex: include any one of the various catalysts described and prepared in Y. Xiao, Z. Wang, K. Ding, Chem. Eur. J. (2005), p. 3668. A typical example of this type of catalyst has the following formula:

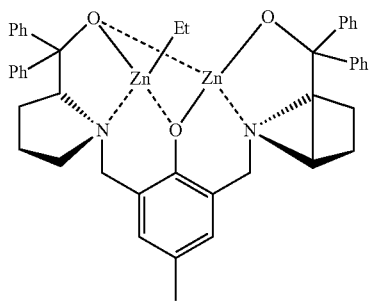

L¹Zn₂Et
(semi-aza-crown)

vi) 'open' anilido-aldimine dinuclear zinc complex: include any one of the various catalysts described and prepared in any one of: B. Y. Lee, H. Y. Kwon, S. Y. Lee, S. J. Na, S. Han, H. Yun, H. Lee, Y.-W. Park; J. Am. Chem. Soc., 127 (2005), p. 3031; T. Bok, H. Yun, B. Y. Lee; Inorg. Chem., 45 (2006), p. 4228. A typical example of this type of catalyst has the following formula:

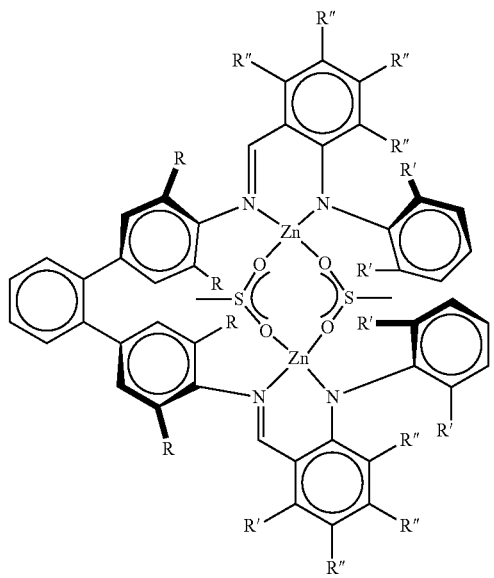

R = Me, Et, iPr
R' = Me, Et, iPr
R" = H, F vii) Dinuclear xanthdim complexes: include any one of the various catalysts described and prepared in M. F. Pilz, C. Limberg, B. B. Lazarov, K. C. Hultzsch, B. Ziemer; Organometallics, 26 (2007), p. 3668. A typical example of this type of catalyst has the following formula:

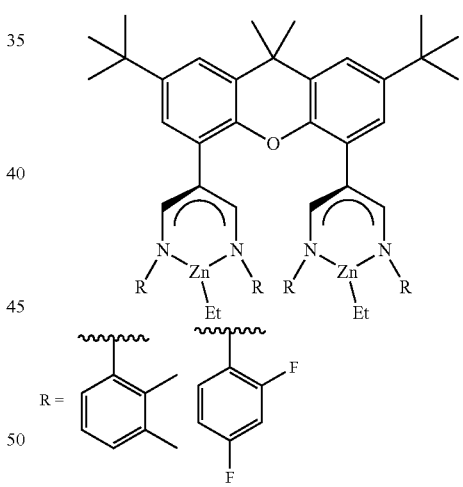

viii) Bridged dinuclear Zn-BDI complexes: include any one of the various catalysts described and prepared in D. Piesik, S. Range, S. Harder; Organometallics, 27 (2008), p. 6178. A typical example of this type of catalyst has the following formula:

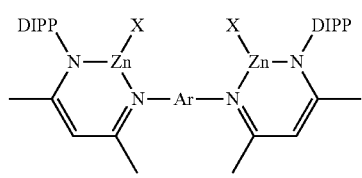

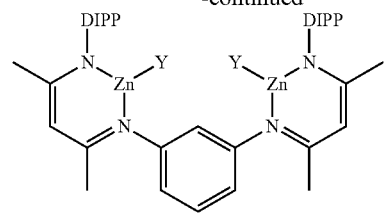

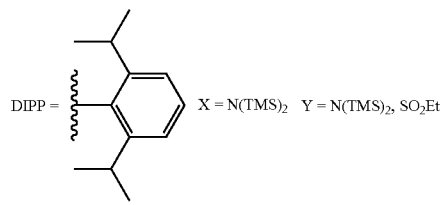

ix) reduced Robson-type dinuclear metal complexes: include any one of the various catalysts described and prepared in any one of: M. R. Kember, P. D. Knight, P. T. Reung, C. K. Williams; Angew. Chem., 121 (2009), p. 949; M. R. Kember, A. J. P. White, C. K. Williams; Inorg. Chem., 48 (2009), p. 9535.; M. R. Kember, A. J. P. White, C. K. Williams; Macromolecules, 43 (2010), p. 2291; A. Buchard, M. R. Kember, K. Sandeman, C. K. Williams, Chem. Commun. 46 (2010); Michael R. Kember and Charlotte K. Williams; Journal of the American Chemical Society 2012 134 (38), 15676-15679. A typical example of this type of catalyst has the following formula:

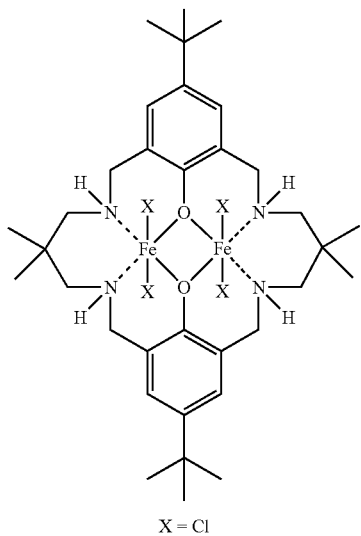

x) Mononuclear tetraamine-iron complex: include any one of the various catalysts described and prepared in J. E. Dengler, M. W. Lehenmeier, S. Klaus, C. E. Anderson, E. Herdtweck, B. Rieger, Eur. J. Inorg. Chem. (2011) pp. 336-343. A typical example of this type of catalyst has the following formula:

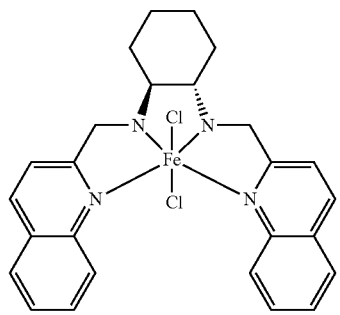

xi) Immobilized salen and BDI systems: include any one of the various catalysts described and prepared in any one of: L. P. C. Nielsen, C. P. Stevenson, D. G. Blackmond, E. N. Jacobsen; J. Am. Chem. Soc., 126 (2004), p. 1360; K. Yu, C. W. Jones; Organornetallics, 22 (2003), p. 2571; M. Alvaro, C. Baleizao, D. Das, E. Carbonell, J. Garcia; J. Catal., 228 (2004), p. 254; M. Alvaro, C. Baleizao, E. Carbonell, M. E. Ghoul, H. Garcia, B. Gigante; Tetrahedron, 61 (2005), p. 12131. A typical example of this type of catalyst has the following formula:

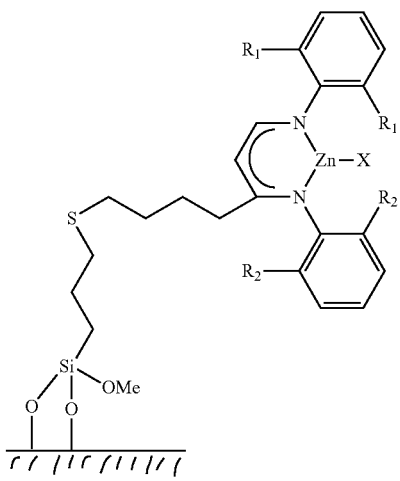

xii) Zn(POSS) family (Polyhedral Oligomeric Silsesquioxane): include any one of the various catalysts described and prepared in any one of: Robbert Duchateau, Wouter J. van Meerendonk, Saskia Huijser, Bastiaan B. P. Staal, Marcus A. van Schilt, Gijsbert Gerritsen, Auke Meetsma, Cor E. Koning, Maartje F. Kemmere, and Jos T. F. Keurentjes; Organometallics 2007 26 (17), 4204-4211. A typical example of this type of catalyst has the following formula:

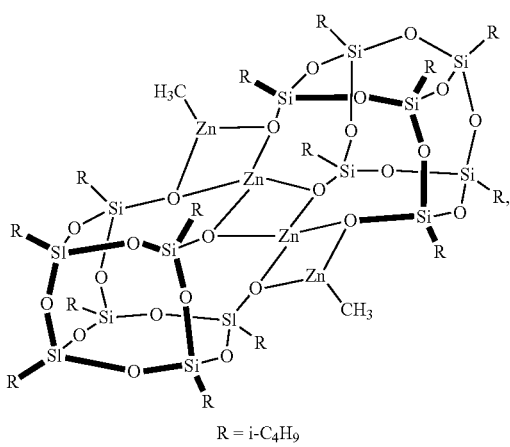

R = i-C₄H₉ xiii) Flexibly Tethered Dinuclear Zinc Complexes: include any one of the various catalysts described and prepared in any one of: Lehenmeier, M. W. Kissling, S., Altenbuchner, P. T., Bruckmeier, C., Deglmann, P., Brym, A-K. and Rieger, B. (2013), 'Flexibly Tethered Dinuclear Zinc Complexes: A Solution to the Entropy Problem in $CO_2$/Epoxide Copolymerization Catalysis?', Angew. Chem. Int. Ed., 52, 9821-9826. A typical example of this type of catalyst has the following formula:

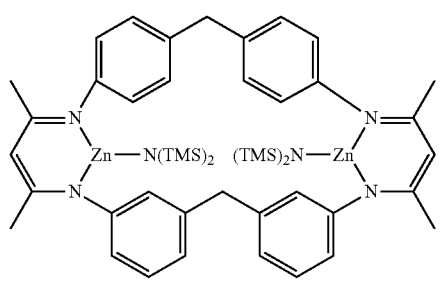

xiv) Metal-[$N_2O_2$] complexes (based on 1,2-phenylene-diimino-2-acrylate ligand): include any one of the various catalysts described and prepared in any one of: Fuchs, M. A., Altesleben, C., Zevaco, T. A. and Dinjus, E. (2013), An Efficient Homogeneous Chloro-Aluminum-[$N_2O_2$] Catalyst for the Coupling of Epoxides with Carbon Dioxide. Eur. J. Inorg. Chem., 2013, 4541-4545.; M. A. Fuchs, S. Staudt, C. Altesleben, O. Walter, T. A. Zevaco and E. Dinjusa, Dalton Trans., 2014, 43, 2344-2347. A typical example of this type of catalyst has the following formula:

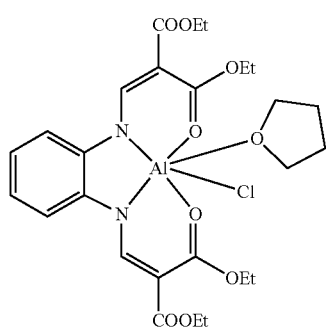

xv) Double metal cyanides: include any one of the various catalysts described and prepared in any one of: Sun, X.-K., Zhang, X.-H., Wei, R.-J., Du, B.-Y., Wang, Q., Fan, Z.-Q. and Qi, G.-R. (2012), J. Polym. Sci. A Polym. Chem., 50, 2924-2934.; Donald J. Darensbourg, M. Jason Adams, Jason C. Yarbrough, and, and Andrea L. Phelps; Inorganic Chemistry 2003, 42 (24), 7809-7818. A typical example of this type of catalyst has the following formula:

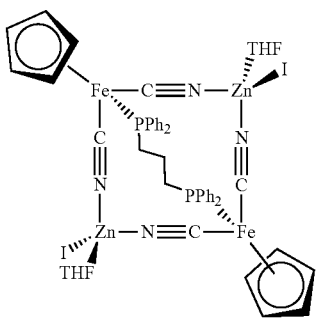

[CpFe(μ-CN)₂ZnI(THF)]₂(μ-dppp)
DMC of iron and zinc

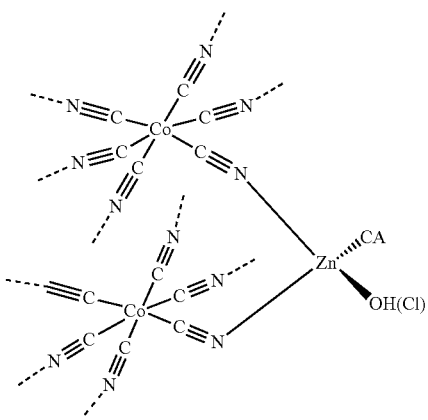

DMC of zinc and cobalt
Zn₃Co(CN)₆* xZnCl₂ * yH₂O * zCA
CA: Complexing agents xvi) Dinuclear (Salen) MX (or Salan, Salophen): include any one of the various catalysts described and prepared in any one of: K. Nakano, S. Hashimotoa, K. Nozaki; Chem. Sci., 1 (2010), p. 369; S. I. Vagin, R. Reichardt, S. Klaus, B. Rieger; J. Am. Chem. Soc., 132 (2010), p. 14367. Typical examples of this type of catalyst have the following formulae:

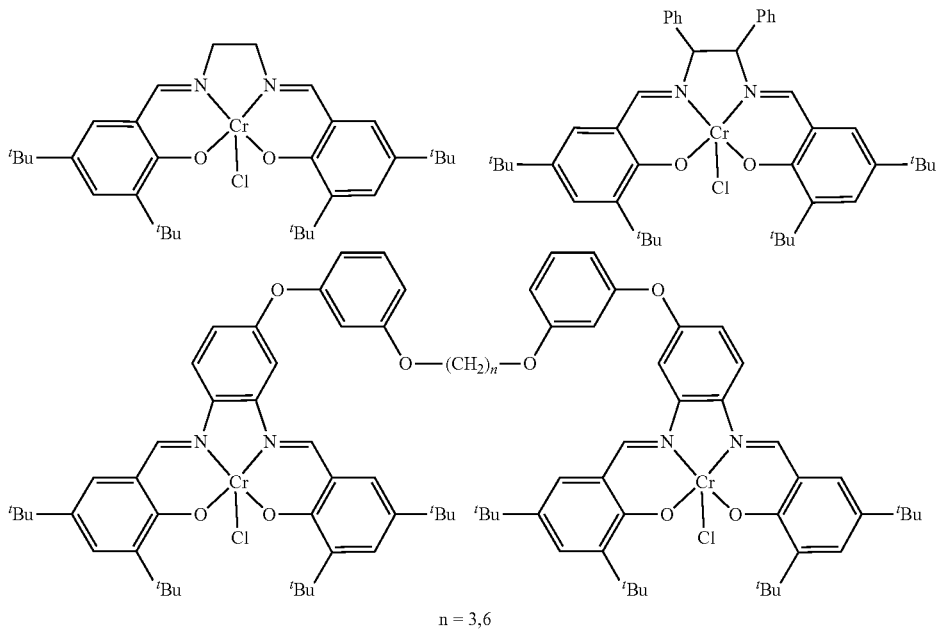

n = 3,6 xvii) zinc dicarboxylates: include any one of the various catalysts described and prepared in U.S. Pat. No. 5,026,676 A. A typical example of this type of catalyst has the following formula:

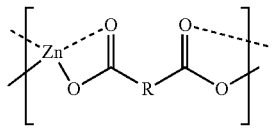

xviii) catalysts described in WO 2009/025850 A2 to G. W. Coates et al.

xix) catalysts described in Shyeni Paul, Yunqing Zhu, Charles Romain, Rachel Brooks, Prabhjot K. Saini and Charlotte K. Williams in Chem. Commun., 2015, 51, 6459.

xx) catalysts described in Jozef Lust and ZdenM Mahdsek, Makromol. Chem. 181,545-555 (1980) 545, (describing i.e. cetyl trimethylammonium bromide).

xxi) catalysts described in Lin Qiang, Guo Zhifang, Pan Lisha and Xiang Xue in Catalysis Communications 64 (2015), pp. 114-118.

xxii) catalysts described in Elham Hosseini Nejad, Anita Paoniasari, Carlo G. W. van Melis, Cor E. Koning, and Rob Duchateau in Macromolecules 2013, 46, 631-637.

xxiii) catalysts described in Xue-Ke Sun, Xing-Hong Zhang, Shang Chen, Bin-Yang Du, Qi Wang, Zhi-Qiang Fan and Guo-Rong Qi in Polymer 51 (2010), pp. 5719-5725.

By the term 'catalyst C' is meant herein a chemical compound selected from the group consisting of the chemical compounds disclosed for catalyst B, and the chemical compounds disclosed in any one of i) to v), as each of i) to v), is disclosed below:

i) tertiary amines e.g. supplied under Armeen®.

ii) ammonium salts e.g. hexadecyltrimethylammonium bromide, tetramethyl ammonium bromide, tetramethyl ammonium fluoride, tetramethyl ammonium acetate, tetramethyl ammonium chloride, cetyltrimethylammonium chloride or cetyltrimethylammonium bromide.

iii) phosphines e.g. triphenylphosphine.

iv) phosphonium salts e.g. triphenyl ethyl ammonium phosphine.

v) potassium acetate and potassium methoxide, potassium stearate, potassium octanoate, sodium chloride, potassium chloride, cesium acetate, sodium acetate, lithium acetate, titanium(IV)isopropoxide, titanium(IV)butoxide, potassium hydroxide, triazabicyclodecene.

Certain moieties, species, groups, units, compounds, polymers, materials, mixtures, compositions and/or formulations which comprise and/or are used in some or all of the invention as described herein may exist as one or more different forms such as any of those in the following non exhaustive list: tautomers e.g. keto and/or enol forms; isomers such as constitutional (structural) isomers, stereoisomers (spatial isomers) such as i) enantiomers, and ii) diastereomers (geometric isomers) such as cis/trans, E/Z and R/S isomers and conformers such as rotamers; tautomers. The invention comprises and/or uses all such forms which are effective as defined herein.

The terms 'suitable for' (for example with reference to any process, use, method, application, preparation, product, material, formulation, compound, composition, monomer, oligomer, polymer precursor, and/or polymers of the present invention and/or described herein as appropriate) will be understood to refer to those features of the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing suitable end products.

It will be understood that the total sum of any quantities expressed herein as percentages cannot (allowing for rounding errors) exceed 100%. However, where a list of monomers used for the preparation of the Polymer or where a list of components of the Binder, or of the Composition is non-exhaustive, the sum of the percentage for each of such components may be less than 100% to allow a certain percentage for additional amount(s) of any additional component(s) that may not be explicitly described herein.

By the 'comprising' is meant herein that the list that immediately follows is non-exhaustive and may or may not include any other additional suitable items, for example one or more further feature(s), component(s) and/or substituent(s) as appropriate. The term 'comprising' will be used interchangeably with the term 'containing'. "Substantially comprising" or 'essentially consisting of' as used herein means a component or list of component(s) is present in a given material in an amount greater than or equal to about 90% w/w, preferably greater than or equal to 95% w/w, more preferably greater than or equal to 98% w/w, even more preferably greater than or equal to 99% w/w of the total amount of the given material.

By the term 'consisting of' (or equally 'consists of') when referring to a composition (of matter) is meant herein that the list that follows is exhaustive and does not include additional items.

By the term a 'polymer consisting of' or equally a 'polymer consists of' (referring to a polymer according to the invention as disclosed herein) is meant herein that the MRQ of said polymer is at least 1 and at most 1.2, preferably at least 1 and at most 1.1, preferably at least 1 and at most 1.08, more preferably at least 1 and at most 1.06, even more preferably at least 1 and at most 1.05, most preferably at least 1 and at most 1.04, especially at least 1 and at most 1.03, more especially at least 1 and at most 1.02, most especially at least 1 and at most 1.01. For example if a 'polymer consists of' one or more S1 units, is meant herein that said polymer comprises one or more S1 units and the MRQ of said polymer is at least 1 and at most 1.1, preferably at least 1 and at most 1.08, more preferably at least 1 and at most 1.06, even more preferably at least 1 and at most 1.05, most preferably at least 1 and at most 1.04, especially at least 1 and at most 1.03, more especially at least 1 and at most 1.02, most especially at least 1 and at most 1.01. For example if a 'polymer consists of': i) one or more S1 units, and ii) one or more S2 units, is meant herein that said polymer comprises: i) one or more S1 units and ii) one or more S2 units and that the MRQ of said polymer is at least 1 and at most 1.1, preferably at least 1 and at most 1.08, more preferably at least 1 and at most 1.06, even more preferably at least 1 and at most 1.05, most preferably at least 1 and at most 1.04, especially at least 1 and at most 1.03, more especially at least 1 and at most 1.02, most especially at least 1 and at most 1.01. Equally, any reference to a Polymer having a MRQ of at least 1 and at most 1.1, preferably at least 1 and at most 1.08, more preferably at least 1 and at most 1.06, even more preferably at least 1 and at most 1.05, most preferably at least 1 and at most 1.04, especially at least 1 and at most 1.03, more especially at least 1 and at most 1.02, most especially at least 1 and at most 1.01, signifies that said Polymer consists of those units to which said Polymer is associated with as the case may be.

By the term 'PolymerCS' is meant herein a Polymer that has a MRQ of at least 1 and at most 1.2, preferably at least 1 and at most 1.1, preferably at least 1 and at most 1.08, more preferably at least 1 and at most 1.06, even more preferably at least 1 and at most 1.05, most preferably at least 1 and at most 1.04, especially at least 1 and at most 1.03, more especially at least 1 and at most 1.02, most especially at least 1 and at most 1.01.

Any feature, element, component, embodiment, range and especially any preferred feature, preferred element, preferred embodiment, preferred range, preferred combination of ranges, preferment described in the Definitions can be combined with each other.

Unless the context clearly indicates otherwise, as used herein plural forms of the terms herein (for example Polymer, Composition, Binder, copolymerizable agent, heteroatom, unsaturation, ethylenic unsaturation, etc.) are to be construed as including the singular form and vice versa.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in the Definitions can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

For clarity, any reference herein to the amounts of organic metal salt, thermal initiator, and photoinitiator refers to the chemical substances per se (neat chemical substance) and not to their mixtures with any carrier material for example water, silica, etc., or their solutions in other chemical substances for example organic solvents, in which they are typically being supplied in the market.

The wavy lines shown in any one the formulae shown in section 1 of the description signify that the molecular structure of the part of the Polymer beyond the point indicated by the wavy line is unimportant and it is not specified.

The decimal separator in numbers (also known as the radix character) is indicated with a comma (','). The group of thousands in a number is indicated with a period('.').

1. Embodiments of the Polymer of the Invention ('Polymer')

Any and all of the polymers disclosed in this section are collectively referred to—in the whole of the application—as the Polymer. By 'Polymer' is meant herein a polymer according to the invention. The term 'Polymer' as used herein includes any and all of its preferments, combinations of its features and ranges as well as combinations of any and all of its preferments with any and all of the combinations of its features and ranges. Thus, any and all of the polymers disclosed in this section includes any and all of their preferments, combinations of their features and ranges as well as combinations of any and all of their preferments with any and all of the combinations of their features and ranges, are collectively referred to—in the whole of the application—as the Polymer.

The Polymer may be solid or liquid.

Preferably the polymer has one or both of: i) functional groups and ii) ionic functional groups. Thus, preferably the Polymer is one or both of: i) a functional polymer and ii) an ionic polymer.

Preferably, the Polymer is able to react with one or both of copolymerizable polymer and copolymerizable agent.

Preferably, the Polymer is able to self-crosslink.

39

1.1 Broadly in accordance with the invention, there is provided a polymer comprising one or more S1 units, wherein each S1 unit is represented by the following formula:

S1

[structure: cyclohexane ring with O-A group and O-C(=O)-[Y-O]$_m$ linkage, and X substituent]

and wherein
i) m is either 0 or 1, and
ii) A is either H or CH$_3$, and
iii) n is an integer equal to or higher than 1, and
iv) X is selected from the group consisting of X1, X2, X3, X4, X5, X6, X7, X10 and X11 as each of X1 to X11 is defined below, and wherein the black bold dot shown in each of the formulae of any one of X1 to X11 represents the attachment point of each of X1 to X11 to the S1, and wherein the attachment point is a carbon atom, X1
[structure: R$_1$'—•—CH$_2$OH with S—R$_2$']

X2
[structure: R$_3$'—•—CH$_2$OH with S—R$_4$' (extended chain)]

X3
[structure: R$_5$'—•—CH$_2$OH with HN—R$_6$']

X4
[structure: R$_7$'—•—CH$_2$OH with NH—R$_8$' (extended chain)]

X5
[structure: R$_9$'—•—CH$_2$OH with O-C(=O)-NH-R$_{10}$']

X6
[structure: R$_{11}$'—•—CH$_2$OH with O-C(=O)-NH-R$_{12}$']

40

-continued

X7
[structure: cyclic carbonate with R$_{13}$']

X10
[structure: R$_{15}$'—•—CH$_2$OH with O-C(=O)-R$_{14}$']

X11
[structure: R$_{17}$'—•—CH$_2$OH with O-C(=O)-R$_{16}$']

wherein
R$_1$', R$_3$', R$_5$', R$_7$', R$_9$', R$_{11}$', R$_{13}$', R$_{15}$', R$_{17}$' is each independently selected from the group consisting of H and CH$_3$, and R$_2$', R$_4$' R$_6$', R$_8$' is each independently selected from the group consisting of H, CH$_3$, and C$_2$-C$_{34}$ optionally-substituted-hydrocarbyl, and R$_{10}$', R$_{12}$', R$_{14}$', R$_{16}$' is each independently selected from the group consisting of CH$_3$, and C$_2$-C$_{34}$ optionally-substituted-hydrocarbyl; preferably R$_{14}$', R$_{16}$' is each independently selected from the group consisting of C$_3$-C$_{34}$ optionally-substituted-hydrocarbyl, more preferably R$_{14}$', R$_{16}$' is each independently selected from the group consisting of C$_7$-C$_{34}$ optionally-substituted-hydrocarbyl, even more preferably R$_{14}$', R$_{16}$' is each independently selected from the group consisting of C$_9$-C$_{34}$ optionally-substituted-hydrocarbyl, especially R$_{14}$', R$_{16}$' is each independently selected from the group consisting of C$_{11}$-C$_{34}$ optionally-substituted-hydrocarbyl, more especially R$_{14}$', R$_{16}$' is each independently selected from the group consisting of C$_{13}$-C$_{34}$ optionally-substituted-hydrocarbyl, most especially R$_{14}$', R$_{16}$' is each independently selected from the group consisting of C$_{11}$-C$_{28}$ optionally-substituted-hydrocarbyl, for example R$_{14}$', R$_{16}$' is each independently selected from the group consisting of C$_3$-C$_{34}$ acyclic-hydrocarbyl, for example R$_{14}$', R$_{16}$' is each independently selected from the group consisting of C$_7$-C$_{34}$ acyclic-hydrocarbyl, for example R$_{14}$', R$_{16}$' is each independently selected from the group consisting of C$_9$-C$_{34}$ acyclic-hydrocarbyl, for example R$_{14}$', R$_{16}$' is each independently selected from the group consisting of C$_{11}$-C$_{34}$ acyclic-hydrocarbyl, for example R$_{14}$', R$_{16}$' is each independently selected from the group consisting of C$_{13}$-C$_{34}$ acyclic-hydrocarbyl, for example R$_{14}$', R$_{16}$' is each independently selected from the group consisting of C$_{11}$-C$_{28}$ acyclic-hydrocarbyl, for example R$_{14}$', R$_{16}$' is each independently selected from the group consisting of C$_3$-C$_{34}$ unsaturated-acyclic-hydrocarbyl, for example R$_{14}$', R$_{16}$' is each independently selected from the group consisting of C$_7$-C$_{34}$ unsaturated-acyclic-hydrocarbyl, for example R$_{14}$', R$_{16}$' is each independently selected from the group consisting of C$_9$-C$_{34}$ unsaturated-acyclic-hydrocarbyl, for example R$_{14}$', R$_{16}$' is each independently selected from the group consisting of C$_{11}$-C$_{34}$ unsaturated-acyclic-hydrocarbyl, for example R$_{14}$', $R_{16}'$ is each independently selected from the group consisting of $C_{13}$-$C_{34}$ unsaturated-acyclic-hydrocarbyl, for example $R_{14}'$, $R_{16}'$ is each independently selected from the group consisting of $C_{11}$-$C_{28}$ unsaturated-acyclic-hydrocarbyl, and v) Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20, as each of Y1 to Y20 is defined below and wherein the black bold dots shown in each of the formulae of any one of Y1 to Y20 represent the attachment points of each of Y1 to Y20 to the S1, wherein each attachment point is a carbon atom,

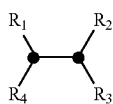

Y1

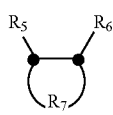

Y2

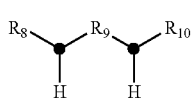

Y3

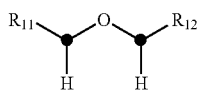

Y4

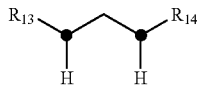

Y5

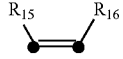

Y6

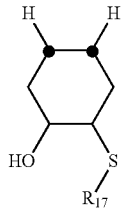

Y7

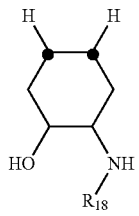

Y8

-continued

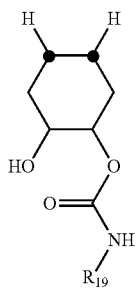

Y9

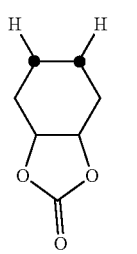

Y10

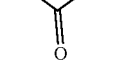

Y11

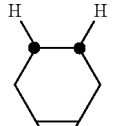

Y12

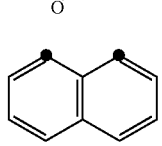

Y13

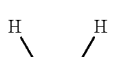

Y14

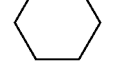

Y15

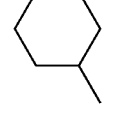

Y16

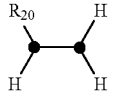

Y17

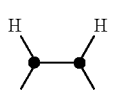

Y18

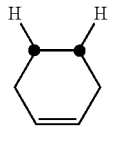

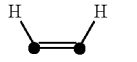

-continued

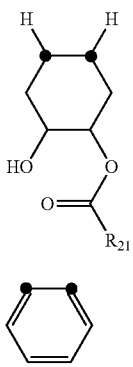

Y19

Y20 wherein
$R_1, R_2, R_3, R_4, R_5, R_6, R_8, R_{10}, R_{11}, R_{12}, R_{13}, R_{14}, R_{15}, R_{16}, R_{18}, R_{19}, R_{21}$ is each independently selected from the group consisting of H, $CH_3$, and $C_2$-$C_{34}$ optionally-substituted-hydrocarbyl, and
$R_7$ is either $CH_2$ or a $C_2$-$C_{34}$ optionally-substituted-hydrocarbylene, and
$R_9$ is a $C_2$-$C_{34}$ optionally-substituted-hydrocarbylene, and
$R_{17}$ is a $CH_3$ or $C_2$-$C_{34}$ optionally-substituted-hydrocarbyl, and
$R_{20}$ is a $C_1$-$C_{34}$ optionally-substituted-hydrocarbyl, and
with the proviso that none of $R_1$ to $R_{21}$ comprises any carboxyl group and none of $R_1$ to $R_{21}$ comprises any anhydride group.

The n is equal to or higher than 1. Preferably the n is at least 2, more preferably at least 3, even more preferably at least 4, most preferably at least 5, especially at least 6, more especially at least 7, even more especially at least 8, most especially at least 10, for example at least 12, for example at least 15, for example at least 20. Preferably the n is at most 30.000, more preferably at most 25.000, even more preferably at most 20.000, most preferably at most 15.000, especially at most 10.000, more especially at most 8.000, even more especially at most 6.000, most especially at most 8, for example at most 5.000, for example at most 4.000, for example at most 3.000, for example at most 2.000, for example at most 1.500, for example at most 1.000, for example at most 800, for example at most 700, for example at most 600, for example at most 500, for example at most 450, for example at most 400, for example at most 350, for example at most 300, for example at most 250 for example at most 200 for example at most 150.

Preferably X is selected from the group consisting of X3, X4, X5, X6, X7, X10 and X11, more preferably X is selected from the group consisting of X5, X6, X7, X10 and X11, even more preferably X is selected from the group consisting of X7, X10 and X11, most preferably X is selected from the group consisting of X10 and X11.

Preferably Y is selected from the group consisting of Y2, Y3, Y4, Y5, Y6, Y7, Y8, Y9, Y10, Y11, Y12, Y13, Y14, Y15, Y16, Y17, Y18, Y19, and Y20, more preferably Y is selected from the group consisting of Y3, Y4, Y5, Y6, Y7, Y8, Y9, Y10, Y11, Y12, Y13, Y14, Y15, Y16, Y17, Y18, Y19, and Y20, even more preferably Y is selected from the group consisting of Y4, Y5, Y6, Y7, Y8, Y9, Y10, Y11, Y12, Y13, Y14, Y15, Y16, Y17, Y18, Y19, and Y20, most preferably Y is selected from the group consisting of Y5, Y6, Y7, Y8, Y9, Y10, Y11, Y12, Y13, Y14, Y15, Y16, Y17, Y18, Y19, and Y20, especially Y is selected from the group consisting of Y6, Y7, Y8, Y9, Y10, Y11, Y12, Y13, Y14, Y15, Y16, Y17, Y18, Y19, and Y20, more especially Y is selected from the group consisting of Y7, Y8, Y9, Y10, Y11, Y12, Y13, Y14, Y15, Y16, Y17, Y18, Y19, and Y20, even more especially Y is selected from the group consisting of Y8, Y9, Y10, Y11, Y12, Y13, Y14, Y15, Y16, Y17, Y18, Y19, and Y20, most especially Y is selected from the group consisting of Y9, Y10, Y11, Y12, Y13, Y14, Y15, Y16, Y17, Y18, Y19, and Y20, for example Y is selected from the group consisting of Y10, Y11, Y12, Y13, Y14, Y15, Y16, Y17, Y18, Y19, and Y20, for example Y is selected from the group consisting of Y11, Y12, Y13, Y14, Y15, Y16, Y17, Y18, Y19, and Y20, for example Y is selected from the group consisting of Y12, Y13, Y14, Y15, Y16, Y17, Y18, Y19, and Y20, for example Y is selected from the group consisting of Y13, Y14, Y15, Y16, Y17, Y18, Y19, and Y20, for example Y is selected from the group consisting of Y14, Y15, Y16, Y17, Y18, Y19, and Y20, for example Y is selected from the group consisting of Y15, Y16, Y17, Y18, Y19, and Y20, for example Y is selected from the group consisting of Y16, Y17, Y18. Y19, and Y20, for example Y17, Y18. Y19, and Y20, for example Y is selected from the group consisting of Y18, Y19, and Y20, for example Y is selected from the group of Y19, and Y20, for example Y is Y20.

Preferably X is selected from the group consisting of X3, X4, X5, X6, X7, X10 and X11, and preferably Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20.

Preferably X is selected from the group consisting of X5, X6, X7, X10 and X11, and preferably Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20.

Preferably X is selected from the group consisting of X7, X10 and X11, and preferably Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20.

Preferably X is selected from the group consisting of X10 and X11, and preferably Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20.

Preferably X is selected from the group consisting of X10 and X11, and preferably Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20.

Preferably X is selected from the group consisting of X1, X2, X3, X4, X5, X6, X7, X10 and X11, and preferably Y is selected from the group consisting of Y2, Y3, Y4, Y5, Y6, Y7, Y8, Y9, Y10, Y11, Y12, Y13, Y14, Y15, Y16, Y17, Y18, Y19, and Y20

Preferably X is selected from the group consisting of X1, X2, X3, X4, X5, X6, X7, X10 and X11, and preferably Y is selected from the group consisting of Y3, Y4, Y5, Y6, Y7, Y8, Y9, Y10, Y11, Y12, Y13, Y14, Y15, Y16, Y17, Y18, Y19, and Y20

Preferably X is selected from the group consisting of X1, X2, X3, X4, X5, X6, X7, X10 and X11, and preferably Y is selected from the group consisting of Y4, Y5, Y6, Y7, Y8, Y9, Y10, Y11, Y12, Y13, Y14, Y15, Y16, Y17, Y18, Y19, and Y20.

Preferably X is selected from the group consisting of X1, X2, X3, X4, X5, X6, X7, X10 and X11, and preferably Y is selected from the group consisting of Y5, Y6, Y7, Y8, Y9, Y10, Y11, Y12, Y13, Y14, Y15, Y16, Y17, Y18, Y19, and Y20.

Preferably X is selected from the group consisting of X1, X2, X3, X4, X5, X6, X7, X10 and X11, and preferably Y is selected from the group consisting of Y6, Y7, Y8, Y9, Y10, Y11, Y12, Y13, Y14, Y15, Y16, Y17, Y18, Y19, and Y20.

Preferably X is selected from the group consisting of X1, X2, X3, X4, X5, X6, X7, X10 and X11, and preferably Y is selected from the group consisting of Y7, Y8, Y9, Y10, Y11. Y12, Y13, Y14, Y15, Y16, Y17, Y18. Y19, and Y20.

Preferably X is selected from the group consisting of X1, X2, X3, X4, X5, X6, X7, X10 and X11, and preferably Y is selected from the group consisting of Y8, Y9, Y10, Y11, Y12, Y13, Y14, Y15, Y16, Y17, Y18, Y19, and Y20.

Preferably X is selected from the group consisting of X1, X2, X3, X4, X5, X6, X7, X10 and X11, and preferably Y is selected from the group consisting of Y9, Y10, Y11, Y12, Y13, Y14, Y15, Y16, Y17, Y18, Y19, and Y20.

Preferably X is selected from the group consisting of X1, X2, X3, X4, X5, X6, X7, X10 and X11, and preferably Y is selected from the group consisting of Y10, Y11, Y12, Y13, Y14, Y15, Y16, Y17, Y18, Y19, and Y20.

Preferably X is selected from the group consisting of X1, X2, X3, X4, X5, X6, X7, X10 and X11, and preferably Y is selected from the group consisting of Y11, Y12, Y13, Y14, Y15, Y16, Y17, Y18, Y19, and Y20.

Preferably X is selected from the group consisting of X1, X2, X3, X4, X5, X6, X7, X10 and X11, and preferably Y is selected from the group consisting of Y12, Y13, Y14, Y15, Y16, Y17, Y18, Y19, and Y20.

Preferably X is selected from the group consisting of X1, X2, X3, X4, X5, X6, X7, X10 and X11, and preferably Y is selected from the group consisting of Y13, Y14, Y15, Y16, Y17, Y18, Y19, and Y20.

Preferably X is selected from the group consisting of X1, X2, X3, X4, X5, X6, X7, X10 and X11, and preferably Y is selected from the group consisting of Y14, Y15, Y16, Y17, Y18, Y19, and Y20.

Preferably X is selected from the group consisting of X1, X2, X3, X4, X5, X6, X7, X10 and X11, and preferably Y is selected from the group consisting of Y15, Y16, Y17, Y18, Y19, and Y20.

Preferably X is selected from the group consisting of X1, X2, X3, X4, X5, X6, X7, X10 and X11, and preferably Y is selected from the group consisting of Y16, Y17, Y18, Y19, and Y20.

Preferably X is selected from the group consisting of X1, X2, X3, X4, X5, X6, X7, X10 and X11, and preferably Y is selected from the group consisting of Y17, Y18, Y19, and Y20.

Preferably X is selected from the group consisting of X1, X2, X3, X4, X5, X6, X7, X10 and X11, and preferably Y is selected from the group consisting of Y18, Y19, and Y20.

Preferably X is selected from the group consisting of X1, X2, X3, X4, X5, X6, X7, X10 and X11, and preferably Y is selected from the group consisting of Y19, and Y20.

Preferably X is selected from the group consisting of X1, X2, X3, X4, X5, X6, X7, X10 and X11, and preferably Y is Y20.

Preferably X is X7, and preferably Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20.

Preferably X is X7, and preferably Y is selected from the group consisting of Y2, Y3, Y4, Y5, Y6, Y7, Y8, Y9, Y10, Y11, Y12, Y13, Y14, Y15, Y16, Y17, Y18, Y19, and Y20.

Preferably X is X7, and preferably Y is selected from the group consisting of Y3, Y4, Y5, Y6, Y7, Y8, Y9, Y10, Y11, Y12, Y13, Y14, Y15, Y16, Y17, Y18, Y19, and Y20.

Preferably X is X7, and preferably Y is selected from the group consisting of Y4, Y5, Y6, Y7, Y8, Y9, Y10, Y11, Y12, Y13, Y14, Y15, Y16, Y17, Y18, Y19, and Y20.

Preferably X is X7, and preferably Y is selected from the group consisting of Y5, Y6, Y7, Y8, Y9, Y10, Y11, Y12, Y13, Y14, Y15, Y16, Y17, Y18, Y19, and Y20.

Preferably X is X7, and preferably Y is selected from the group consisting of Y6, Y7, Y8, Y9, Y10, Y11, Y12, Y13, Y14, Y15, Y16, Y17, Y18, Y19, and Y20.

Preferably X is X7, and preferably Y is selected from the group consisting of Y7, Y8, Y9, Y10, Y11, Y12, Y13, Y14, Y15, Y16, Y17, Y18, Y19, and Y20.

Preferably X is X7, and preferably Y is selected from the group consisting of Y8, Y9, Y10, Y11, Y12, Y13, Y14, Y15, Y16, Y17, Y18, Y19, and Y20.

Preferably X is X7, and preferably Y is selected from the group consisting of Y9, Y10, Y11, Y12, Y13, Y14, Y15, Y16, Y17, Y18, Y19, and Y20.

Preferably X is X7, and preferably Y is selected from the group consisting of Y10, Y11, Y12, Y13, Y14, Y15, Y16, Y17, Y18, Y19, and Y20.

Preferably X is X7, and preferably Y is selected from the group consisting of Y11, Y12, Y13, Y14, Y15, Y16, Y17, Y18, Y19, and Y20.

Preferably X is X7, and preferably Y is selected from the group consisting of Y12, Y13, Y14, Y15, Y16, Y17, Y18, Y19, and Y20.

Preferably X is X7, and preferably Y is selected from the group consisting of Y13, Y14, Y15, Y16, Y17, Y18, Y19, and Y20.

Preferably X is X7, and preferably Y is selected from the group consisting of Y14, Y15, Y16, Y17, Y18, Y19, and Y20.

Preferably X is X7, and preferably Y is selected from the group consisting of Y15, Y16, Y17, Y18, Y19, and Y20.

Preferably X is X7, and preferably Y is selected from the group consisting of Y16, Y17, Y18. Y19, and Y20.

Preferably X is X7, and preferably Y is selected from the group consisting of Y17, Y18, Y19, and Y20.

Preferably X is X7, and preferably Y is selected from the group consisting of Y18, Y19, and Y20.

Preferably X is X7, and preferably Y is selected from the group consisting of Y19, and Y20.

Preferably X is X7, and preferably Y is Y20.

Preferably X is X7, and preferably Y is selected from the group consisting of Y10, Y11, Y18, and Y20.

Preferably X is X7 with the proviso that m=1, and preferably Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20.

Preferably X is X7 with the proviso that m=1, and preferably Y is selected from the group consisting of Y2, Y3, Y4, Y5, Y6, Y7, Y8, Y9, Y10, Y11, Y12, Y13, Y14, Y15, Y16, Y17, Y18, Y19, and Y20.

Preferably X is X7 with the proviso that m=1, and preferably Y is selected from the group consisting of Y3, Y4, Y5, Y6, Y7, Y8, Y9, Y10, Y11, Y12, Y13, Y14, Y15, Y16, Y17, Y18, Y19, and Y20.

Preferably X is X7 with the proviso that when m=1, and preferably Y is selected from the group consisting of Y4, Y5, Y6, Y7, Y8, Y9, Y10, Y11, Y12, Y13, Y14, Y15, Y16, Y17, Y18, Y19, and Y20.

Preferably X is X7 with the proviso that m=1, and preferably Y is selected from the group consisting of Y5, Y6, Y7, Y8, Y9, Y10, Y11, Y12, Y13, Y14, Y15, Y16, Y17, Y18, Y19, and Y20.

Preferably X is X7 with the proviso that m=1, and preferably Y is selected from the group consisting of Y6, Y7, Y8, Y9, Y10, Y11, Y12, Y13, Y14, Y15, Y16, Y17, Y18, Y19, and Y20.

Preferably X is X7 with the proviso that m=1, and preferably Y is selected from the group consisting of Y7, Y8, Y9, Y10, Y11, Y12, Y13, Y14, Y15, Y16, Y17, Y18, Y19, and Y20.

Preferably X is X7 with the proviso that m=1, and preferably Y is selected from the group consisting of Y8, Y9, Y10, Y11, Y12, Y13, Y14, Y15, Y16, Y17, Y18, Y19, and Y20.

Preferably X is X7 with the proviso that m=1, and preferably Y is selected from the group consisting of Y9, Y10, Y11, Y12, Y13, Y14, Y15, Y16, Y17, Y18, Y19, and Y20.

Preferably X is X7 with the proviso that m=1, and preferably Y is selected from the group consisting of Y10, Y11, Y12, Y13, Y14, Y15, Y16, Y17, Y18, Y19, and Y20.

Preferably X is X7 with the proviso that m=1, and preferably Y is selected from the group consisting of Y11, Y12, Y13, Y14, Y15, Y16, Y17, Y18, Y19, and Y20.

Preferably X is X7 with the proviso that m=1, and preferably Y is selected from the group consisting of Y12, Y13, Y14, Y15, Y16, Y17, Y18, Y19, and Y20.

Preferably X is X7 with the proviso that m=1, and preferably Y is selected from the group consisting of Y13, Y14, Y15, Y16, Y17, Y18, Y19, and Y20.

Preferably X is X7 with the proviso that m=1, and preferably Y is selected from the group consisting of Y14, Y15, Y16, Y17, Y18, Y19, and Y20.

Preferably X is X7 with the proviso that m=1, and preferably Y is selected from the group consisting of Y15, Y16, Y17, Y18, Y19, and Y20.

Preferably X is X7 with the proviso that m=1, and preferably Y is selected from the group consisting of Y16, Y17, Y18, Y19, and Y20.

Preferably X is X7 with the proviso that m=1, and preferably Y is selected from the group consisting of Y17, Y18, Y19, and Y20.

Preferably X is X7 with the proviso that m=1, and preferably Y is selected from the group consisting of Y18, Y19, and Y20.

Preferably X is X7 with the proviso that m=1, and preferably Y is selected from the group consisting of Y19, and Y20.

Preferably X is X7 with the proviso that m=1, and preferably Y is Y20.

Preferably X is X7 with the proviso that m=1, and preferably Y is selected from the group consisting of Y10, Y11, Y18, and Y20.

Preferably X is selected from the group consisting of X10 and X11, and preferably Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20.

Preferably X is selected from the group consisting of X10 and X11, and preferably Y is selected from the group consisting of Y2, Y3, Y4, Y5, Y6, Y7, Y8, Y9, Y10, Y11, Y12, Y13, Y14, Y15, Y16, Y17, Y18, Y19, and Y20.

Preferably X is selected from the group consisting of X10 and X11, and preferably Y is selected from the group consisting of Y3, Y4, Y5, Y6, Y7, Y8, Y9, Y10, Y11, Y12, Y13, Y14, Y15, Y16, Y17, Y18, Y19, and Y20.

Preferably X is selected from the group consisting of X10 and X11, and preferably Y is selected from the group consisting of Y4, Y5, Y6, Y7, Y8, Y9, Y10, Y11, Y12, Y13, Y14, Y15, Y16, Y17, Y18, Y19, and Y20.

Preferably X is selected from the group consisting of X10 and X11, and preferably Y is selected from the group consisting of Y5, Y6, Y7, Y8, Y9, Y10, Y11, Y12, Y13, Y14, Y15, Y16, Y17, Y18, Y19, and Y20.

Preferably X is selected from the group consisting of X10 and X11, and preferably Y is selected from the group consisting of Y6, Y7, Y8, Y9, Y10, Y11, Y12, Y13, Y14, Y15, Y16, Y17, Y18, Y19, and Y20.

Preferably X is selected from the group consisting of X10 and X11, and preferably Y is selected from the group consisting of Y7, Y8, Y9, Y10, Y11, Y12, Y13, Y14, Y15, Y16, Y17, Y18, Y19, and Y20.

Preferably X is selected from the group consisting of X10 and X11, and preferably Y is selected from the group consisting of Y8, Y9, Y10, Y11, Y12, Y13, Y14, Y15, Y16, Y17, Y18, Y19, and Y20.

Preferably X is selected from the group consisting of X10 and X11, and preferably Y is selected from the group consisting of Y9, Y10, Y11, Y12, Y13, Y14, Y15, Y16, Y17, Y18, Y19, and Y20.

Preferably X is selected from the group consisting of X10 and X11, and preferably Y is selected from the group consisting of Y10, Y11, Y12, Y13, Y14, Y15, Y16, Y17, Y18, Y19, and Y20.

Preferably X is selected from the group consisting of X10 and X11, and preferably Y is selected from the group consisting of Y11, Y12, Y13, Y14, Y15, Y16, Y17, Y18, Y19, and Y20.

Preferably X is selected from the group consisting of X10 and X11, and preferably Y is selected from the group consisting of Y12, Y13, Y14, Y15, Y16, Y17, Y18, Y19, and Y20.

Preferably X is selected from the group consisting of X10 and X11, and preferably Y is selected from the group consisting of Y13, Y14, Y15, Y16, Y17, Y18, Y19, and Y20.

Preferably X is selected from the group consisting of X10 and X11, and preferably Y is selected from the group consisting of Y14, Y15, Y16, Y17, Y18, Y19, and Y20.

Preferably X is selected from the group consisting of X10 and X11, and preferably Y is selected from the group consisting of Y15, Y16, Y17, Y18, Y19, and Y20.

Preferably X is selected from the group consisting of X10 and X11, and preferably Y is selected from the group consisting of Y16, Y17, Y18, Y19, and Y20.

Preferably X is selected from the group consisting of X10 and X11, and preferably Y is selected from the group consisting of Y17, Y18, Y19, and Y20.

Preferably X is selected from the group consisting of X10 and X11, and preferably Y is selected from the group consisting of Y18, Y19, and Y20.

Preferably X is selected from the group consisting of X10 and X11, and preferably Y is selected from the group consisting of Y19, and Y20.

Preferably X is selected from the group consisting of X10 and X11, and preferably Y is Y20.

Preferably Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20, and preferably X is selected from the group consisting of X10 and X11 wherein $R_{15}'$, $R_{17}'$ is each independently selected from the group consisting of H and $CH_3$, and $R_{14}'$, $R_{16}'$ is each independently selected from the group consisting of $C_3$-$C_{34}$ acyclic-hydrocarbyl, for example $R_{14}'$, $R_{16}'$ is each independently selected from the group consisting of $C_7$-$C_{34}$ acyclic-hydrocarbyl, for example $R_{14}'$, $R_{16}'$ is each independently selected from the group consisting of $C_9$-$C_{34}$ acyclic-hydrocarbyl, for example $R_{14}'$, $R_{16}'$ is each independently selected from the group consisting of $C_{11}$-$C_{34}$ acyclic-hydrocarbyl, for example $R_{14}'$, $R_{16}'$ is each independently selected from the group consisting of $C_{13}$-$C_{34}$ acyclic-hydrocarbyl, for example $R_{14}'$, $R_{16}'$ is each independently selected from the group consisting of $C_{1}$-$C_{28}$ acyclic-hydrocarbyl, for example $R_{14}'$, $R_{16}'$ is each independently selected from the group consisting of $C_{3}$-$C_{34}$ unsaturated-acyclic-hydrocarbyl, for example $R_{14}'$, $R_{16}'$ is each independently selected from the group consisting of $C_{7}$-$C_{34}$ unsaturated-acyclic-hydrocarbyl, for example $R_{14}'$, $R_{16}'$ is each independently selected from the group consisting of $C_{9}$-$C_{34}$ unsaturated-acyclic-hydrocarbyl, for example $R_{14}'$, $R_{16}'$ is each independently selected from the group consisting of $C_{11}$-$C_{34}$ unsaturated-acyclic-hydrocarbyl, for example $R_{14}'$, $R_{16}'$ is each independently selected from the group consisting of $C_{13}$-$C_{34}$ unsaturated-acyclic-hydrocarbyl, for example $R_{14}'$, $R_{16}'$ is each independently selected from the group consisting of $C_{11}$-$C_{28}$ unsaturated-acyclic-hydrocarbyl.

Preferably Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20, and preferably X is selected from the group consisting of X10 and X11 wherein $R_{15}'$, $R_{17}'$ is each $CH_3$, and $R_{14}'$, $R_{16}'$ is each independently selected from the group consisting of $C_{3}$-$C_{34}$ acyclic-hydrocarbyl, for example $R_{14}'$, $R_{16}'$ is each independently selected from the group consisting of $C_{7}$-$C_{34}$ acyclic-hydrocarbyl, for example $R_{14}'$, $R_{16}'$ is each independently selected from the group consisting of $C_{9}$-$C_{34}$ acyclic-hydrocarbyl, for example $R_{14}'$, $R_{16}'$ is each independently selected from the group consisting of $C_{11}$-$C_{34}$ acyclic-hydrocarbyl, for example $R_{14}'$, $R_{16}'$ is each independently selected from the group consisting of $C_{13}$-$C_{34}$ acyclic-hydrocarbyl, for example $R_{14}'$, $R_{16}'$ is each independently selected from the group consisting of $C_{11}$-$C_{28}$ acyclic-hydrocarbyl, for example $R_{14}'$, $R_{16}'$ is each independently selected from the group consisting of $C_{3}$-$C_{34}$ unsaturated-acyclic-hydrocarbyl, for example $R_{14}'$, $R_{16}'$ is each independently selected from the group consisting of $C_{7}$-$C_{34}$ unsaturated-acyclic-hydrocarbyl, for example $R_{14}'$, $R_{16}'$ is each independently selected from the group consisting of $C_{9}$-$C_{34}$ unsaturated-acyclic-hydrocarbyl, for example $R_{14}'$, $R_{16}'$ is each independently selected from the group consisting of $C_{11}$-$C_{34}$ unsaturated-acyclic-hydrocarbyl, for example $R_{14}'$, $R_{16}'$ is each independently selected from the group consisting of $C_{13}$-$C_{34}$ unsaturated-acyclic-hydrocarbyl, for example $R_{14}'$, $R_{16}'$ is each independently selected from the group consisting of $C_{11}$-$C_{28}$ unsaturated-acyclic-hydrocarbyl.

Preferably Y is selected from the group consisting of Y19 and Y20, and preferably X is selected from the group consisting of X10 and X11 wherein $R_{15}'$, $R_{17}'$ is each independently selected from the group consisting of H and $CH_3$, and $R_{14}'$, $R_{16}'$ is each independently selected from the group consisting of $C_{3}$-$C_{34}$ acyclic-hydrocarbyl, for example $R_{14}'$, $R_{16}'$ is each independently selected from the group consisting of $C_{7}$-$C_{34}$ acyclic-hydrocarbyl, for example $R_{14}'$, $R_{16}'$ is each independently selected from the group consisting of $C_{9}$-$C_{34}$ acyclic-hydrocarbyl, for example $R_{14}'$, $R_{16}'$ is each independently selected from the group consisting of $C_{11}$-$C_{34}$ acyclic-hydrocarbyl, for example $R_{14}'$, $R_{16}'$ is each independently selected from the group consisting of $C_{13}$-$C_{34}$ acyclic-hydrocarbyl, for example $R_{14}'$, $R_{16}'$ is each independently selected from the group consisting of $C_{11}$-$C_{28}$ acyclic-hydrocarbyl, for example $R_{14}'$, $R_{16}'$ is each independently selected from the group consisting of $C_{3}$-$C_{34}$ unsaturated-acyclic-hydrocarbyl, for example $R_{14}'$, $R_{16}'$ is each independently selected from the group consisting of $C_{9}$-$C_{34}$ unsaturated-acyclic-hydrocarbyl, for example $R_{14}'$, $R_{16}'$ is each independently selected from the group consisting of $C_{11}$-$C_{34}$ unsaturated-acyclic-hydrocarbyl, for example $R_{14}'$, $R_{16}'$ is each independently selected from the group consisting of $C_{13}$-$C_{34}$ unsaturated-acyclic-hydrocarbyl, for example $R_{14}'$, $R_{16}'$ is each independently selected from the group consisting of $C_{11}$-$C_{28}$ unsaturated-acyclic-hydrocarbyl.

Preferably Y is selected from the group consisting of Y19 and Y20, and preferably X is selected from the group consisting of X10 and X11 wherein $R_{15}'$, $R_{17}'$ is each $CH_3$, and $R_{14}'$, $R_{16}'$ is each independently selected from the group consisting of $C_{3}$-$C_{34}$ acyclic-hydrocarbyl, for example $R_{14}'$, $R_{16}'$ is each independently selected from the group consisting of $C_{7}$-$C_{34}$ acyclic-hydrocarbyl, for example $R_{14}'$, $R_{16}'$ is each independently selected from the group consisting of $C_{9}$-$C_{34}$ acyclic-hydrocarbyl, for example $R_{14}'$, $R_{16}'$ is each independently selected from the group consisting of $C_{11}$-$C_{34}$ acyclic-hydrocarbyl, for example $R_{14}'$, $R_{16}'$ is each independently selected from the group consisting of $C_{13}$-$C_{34}$ acyclic-hydrocarbyl, for example $R_{14}'$, $R_{16}'$ is each independently selected from the group consisting of $C_{11}$-$C_{28}$ acyclic-hydrocarbyl, for example $R_{14}'$, $R_{16}'$ is each independently selected from the group consisting of $C_{3}$-$C_{34}$ unsaturated-acyclic-hydrocarbyl, for example $R_{14}'$, $R_{16}'$ is each independently selected from the group consisting of $C_{7}$-$C_{34}$ unsaturated-acyclic-hydrocarbyl, for example $R_{14}'$, $R_{16}'$ is each independently selected from the group consisting of $C_{9}$-$C_{34}$ unsaturated-acyclic-hydrocarbyl, for example $R_{14}'$, $R_{16}'$ is each independently selected from the group consisting of $C_{11}$-$C_{34}$ unsaturated-acyclic-hydrocarbyl, for example $R_{14}'$, $R_{1}'$ is each independently selected from the group consisting of $C_{13}$-$C_{34}$ unsaturatedacyclic-hydrocarbyl, for example $R_{14}'$, $R_{16}'$ is each independently selected from the group consisting of $C_{11}$-$C_{28}$ unsaturated-acyclic-hydrocarbyl.

Preferably Y is selected from the group consisting of Y19 and Y20, and preferably X is selected from the group consisting of X10 and X11 wherein $R_{15}'$, $R_{17}'$ is each independently selected from the group consisting of H and $CH_3$, and $R_{14}'$, $R_{16}'$ is each independently selected from the group consisting of $C_{11}$-$C_{28}$ unsaturated-acyclic-hydrocarbyl.

Preferably Y is selected from the group consisting of Y19 and Y20, and preferably X is selected from the group consisting of X10 and X11 wherein $R_{15}'$, $R_{17}'$ is each $CH_3$, and $R_{14}'$, $R_{16}'$ is each independently selected from the group consisting of $C_{11}$-$C_{28}$ unsaturated-acyclic-hydrocarbyl.

For convenience the [—Y—C(=O)—] group shown in S1 (and anywhere in the description where S1 is mentioned or depicted) is referred herein to as YO.

1.2 Preferably the polymer comprises: i) one or more S1 units wherein each S1 unit is as disclosed in paragraph 1.1, and ii) one or more S2 units, wherein each S2 unit is represented by the following formula:

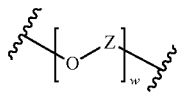

S2 and wherein
S1 and S2 may or may not be directly connected to each other along the polymer's backbone, and
w is an integer equal to or higher than 1, and
Z is selected from the group consisting of Z1, Z2, Z3 and Z4 as each of Z1 to Z4 is defined below, and wherein the black bold dots shown in the formulae of any one of Z1 to Z4 represent the attachment points of each of Z1 to Z4 to the S2, wherein the attachment point is a carbon atom, with the proviso that the O of the [—O—Z—], group is connected to the a-carbon atom in any one of Z1 to Z4,

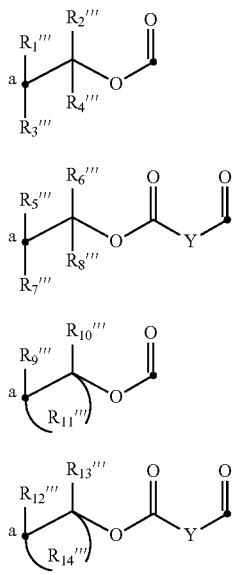

Z1

Z2

Z3

Z4 wherein
$R_1'''$, $R_2'''$, $R_3'''$, $R_4'''$, $R_5'''$, $R_6'''$, $R_7'''$, $R_8'''$, is each independently selected from the group consisting of H, $CH_3$, and $C_2$-$C_{202}$ optionally-substituted-hydrocarbyl, preferably a $C_2$-$C_{36}$ optionally-substituted-hydrocarbyl, and
$R_9'''$, $R_{10}'''$, $R_{12}'''$, $R_{13}'''$ is each independently selected from the group consisting of H, $CH_3$, and $C_2$-$C_{34}$ optionally-substituted-hydrocarbyl, and
$R_{11}'''$, $R_{14}'''$ is each independently selected from a $C_1$-$C_{34}$ optionally-substituted-hydrocarbylene.

The w is an integer equal to or higher than 1. Preferably the w is at least 2, more preferably at least 3, even more preferably at least 4, most preferably at least 5, especially at least 6, more especially at least 7, even more especially at least 8, most especially at least 10, for example at least 12, for example at least 15, for example at least 20. Preferably the w is at most 30.000, more preferably at most 25.000, even more preferably at most 20.000, most preferably at most 15.000, especially at most 10.000, more especially at most 8.000, even more especially at most 6.000, most especially at most 8, for example at most 5.000, for example at most 4.000, for example at most 3.000, for example at most 2.000, for example at most 1.500, for example at most 1.000, for example at most 800, for example at most 700, for example at most 600, for example at most 500, for example at most 450, for example at most 400, for example at most 350, for example at most 300, for example at most 250 for example at most 200 for example at most 150.

Preferably Z is selected from the group consisting of Z2, Z3 and Z4, more preferably Z is selected from the group consisting of Z1, Z3 and Z4, even more preferably Z is selected from the group consisting of Z3 and Z4, most preferably Z is selected from the group consisting of Z2 and Z4, especially Z is selected from the group consisting of Z1 and Z4, more especially Z is selected from the group consisting of Z1 and Z2, even more especially Z is selected from the group consisting of Z2 and Z3, most especially Z is Z1, for example Z is Z2, for example Z is Z3, for example Z is Z4.

Any one of the preferments disclosed for S1 in paragraph 1.1 may be combined with any one of the preferments disclosed for S2 in paragraph 1.2.

1.3 Preferably the polymer comprises: i) one or more S1 units wherein each S1 unit is as disclosed in paragraph 1.1, and ii) one or more S2 units wherein each S2 unit is as disclosed in paragraph 1.2, and wherein at least one S1 unit and at least one S2 unit are directly connected to each other as shown below:

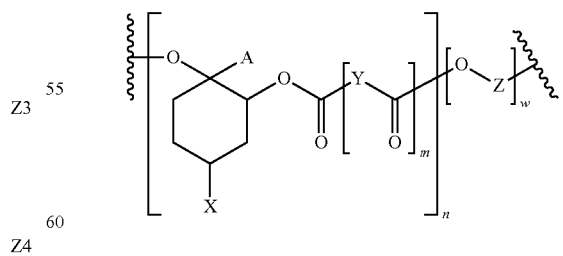

Any one of the preferments disclosed for S1 in paragraph 1.1 may be combined with any one of the preferments disclosed for S2 paragraph 1.2.

1.4 Preferably the polymer comprises: i) one or more S1 units wherein each S1 unit is as disclosed in paragraph 1.1, and ii) one or more S2 units wherein each S2 unit is as disclosed in paragraph 1.2, and wherein at least one S1 unit and at least one S2 unit are directly connected to each other as shown below:

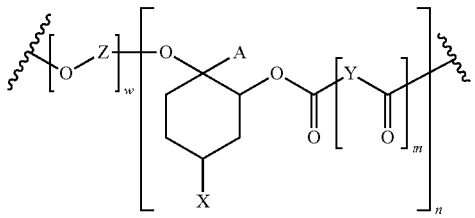

Any one of the preferments disclosed for S1 in paragraph 1.1 may be combined with any one of the preferments disclosed for S2 paragraph 1.2.

1.5 Preferably the polymer comprises: i) one or more S1 units wherein each S1 unit is as disclosed in paragraph 1.1, and ii) one or more S2 units wherein each S2 unit is as disclosed in paragraph 1.2, and wherein at least one S1 unit and at least one S2 unit are directly connected to each other as shown below:

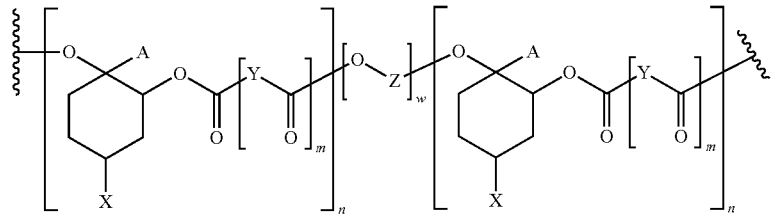

Any one of the preferments disclosed for S1 in paragraph 1.1 may be combined with any one of the preferments disclosed for S2 paragraph 1.2.

1.6 Preferably the polymer is as disclosed in any one of paragraphs 1.1 to 1.5, wherein the polymer has a MRQ of at least 1 and at most 1.000.

1.7 Preferably the polymer is as disclosed in any one of paragraphs 1.1 to 1.5, wherein the polymer has a MRQ of at least 1 and at most 200.

1.8 Preferably the polymer is as disclosed in any one of paragraphs 1.1 to 1.5, wherein the polymer has a MRQ of at least 1 and at most 100.

1.9 Preferably the polymer is as disclosed in any one of paragraphs 1.1 to 1.5, wherein the polymer has a MRQ of at least 1 and at most 25.

1.10 Preferably the polymer is as disclosed in any one of paragraphs 1.1 to 1.5, wherein the polymer has a MRQ of at least 1 and at most 22.

1.11 Preferably the polymer is as disclosed in any one of paragraphs 1.1 to 1.5, wherein the polymer has a MRQ of at least 1 and at most 17.

1.12 Preferably the polymer is as disclosed in any one of paragraphs 1.1 to 1.5, wherein the polymer has a MRQ of at least 1 and at most 15.

1.13 Preferably the polymer is as disclosed in any one of paragraphs 1.1 to 1.5, wherein the polymer has a MRQ of at least 1 and at most 13.

1.14 Preferably the polymer is as disclosed in any one of paragraphs 1.1 to 1.5, wherein the polymer has a MRQ of at least 1 and at most 11.

1.15 Preferably the polymer is as disclosed in any one of paragraphs 1.1 to 1.5, wherein the polymer has a MRQ of at least 1 and at most 9.

1.16 Preferably the polymer is as disclosed in any one of paragraphs 1.1 to 1.5, wherein the polymer has a MRQ of at least 1 and at most 7.5.

1.17 Preferably the polymer is as disclosed in any one of paragraphs 1.1 to 1.5, wherein the polymer has a MRQ of at least 1 and at most 6.

1.18 Preferably the polymer is as disclosed in any one of paragraphs 1.1 to 1.5, wherein the polymer has a MRQ of at least 1 and at most 5.

1.19 Preferably the polymer is as disclosed in any one of paragraphs 1.1 to 1.5, wherein the polymer has a MRQ of at least 1 and at most 4.3.

1.20 Preferably the polymer is as disclosed in any one of paragraphs 1.1 to 1.5, wherein the polymer has a MRQ of at least 1 and at most 3.8.

1.21 Preferably the polymer is as disclosed in any one of paragraphs 1.1 to 1.5, wherein the polymer has a MRQ of at least 1 and at most 3.5.

1.22 Preferably the polymer is as disclosed in any one of paragraphs 1.1 to 1.5, wherein the polymer has a MRQ of at least 1 and at most 3.2.

1.23 Preferably the polymer is as disclosed in any one of paragraphs 1.1 to 1.5, wherein the polymer has a MRQ of at least 1 and at most 2.5.

1.24 Preferably the polymer is as disclosed in any one of paragraphs 1.1 to 1.5, wherein the polymer has a MRQ of at least 1 and at most 2.

1.25 Preferably the polymer is as disclosed in any one of paragraphs 1.1 to 1.5, wherein the polymer has a MRQ of at least 1 and at most 1.7, preferably at most 1.5, preferably at most 1.4.

1.26 Preferably the polymer is as disclosed in any one of paragraphs 1.1 to 1.5, wherein the polymer has a MRQ of at least 1 and at most 1.3.

1.27 Preferably the polymer is as disclosed in any one of paragraphs 1.1 to 1.5, wherein the polymer has a MRQ of at least 1 and at most 1.2.

1.28 Preferably the polymer is as disclosed in any one of paragraphs 1.1 to 1.5, wherein the polymer has a MRQ of at least 1 and at most 1.1, preferably at most 1.08.

1.29 Preferably the polymer is as disclosed in any one of paragraphs 1.1 to 1.5, wherein the polymer has a MRQ of at least 1 and at most 1.05, preferably at most 1.03.

1.30 Preferably the polymer is as disclosed in any one of paragraphs 1.1 to 1.5, wherein the polymer has a MRQ of at least 1 and at most 1.02.

1.31 Preferably the polymer is as disclosed in any one of paragraphs 1.1 to 1.5, wherein the polymer has a MRQ of at least 1 and at most 1.01.

1.32 Preferably the polymer is as disclosed in any one of paragraphs 1.1 to 1.5, wherein the polymer has a MRQ equal to 1.

1.33 Preferably the polymer is as disclosed in any one of paragraphs 1.1 to 1.32 wherein preferably m=0.

1.34 Preferably the polymer is as disclosed in any one of paragraphs 1.1 to 1.32 wherein preferably m=1.

1.35 Preferably the polymer is as disclosed in any one of paragraphs 1.1 to 1.32 wherein preferably A is $CH_3$.

1.36 Preferably the polymer is as disclosed in any one of paragraphs 1.1 to 1.32 wherein preferably A is H.

1.37 Preferably the polymer is as disclosed in any one of paragraphs 1.1 to 1.32 wherein preferably m=0 and A is $CH_3$.

1.38 Preferably the polymer is as disclosed in any one of paragraphs 1.1 to 1.32 wherein preferably m=1 and A is $CH_3$.

1.39 Preferably the polymer is as disclosed in any one of paragraphs 1.1 to 1.32 wherein preferably m=0 and A is H.

1.40 Preferably the polymer is as disclosed in any one of paragraphs 1.1 to 1.32 wherein preferably m=1 and A is H.

1.41 Preferably the polymer is as disclosed in any one of paragraphs 1.1 and 1.6 to 1.40, wherein the polymer consists of one or more S1 units.

1.42 Preferably the polymer is as disclosed in any one of paragraphs 1.2 to 1.40, wherein the polymer consists of: i) one or more S1 units, and ii) one or more S2 units.

1.43 Preferably the polymer is as disclosed in any one of paragraphs 1.1 to 1.42, wherein preferably Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20, and preferably X is selected from the group consisting of X10 and X11 wherein $R_{15}'$, $R_{17}'$ is each independently selected from the group consisting of H and $CH_3$, and $R_{14}'$, $R_{16}'$ is each independently selected from the group consisting of $C_3$-$C_{34}$ acyclic-hydrocarbyl, for example $R_{14}'$, $R_{16}'$ is each independently selected from the group consisting of $C_7$-$C_{34}$ acyclic-hydrocarbyl, for example $R_{14}'$, $R_{16}'$ is each independently selected from the group consisting of $C_9$-$C_{34}$ acyclic-hydrocarbyl, for example $R_{14}'$, $R_{16}'$ is each independently selected from the group consisting of $C_{11}$-$C_{34}$ acyclic-hydrocarbyl, for example $R_{14}'$, $R_{16}'$ is each independently selected from the group consisting of $C_{13}$-$C_{34}$ acyclic-hydrocarbyl, for example $R_{14}'$, $R_{16}'$ is each independently selected from the group consisting of $C_1$-$C_{28}$ acyclic-hydrocarbyl, for example $R_{14}'$, $R_{16}'$ is each independently selected from the group consisting of $C_3$-$C_{34}$ unsaturated-acyclic-hydrocarbyl, for example $R_{14}'$, $R_{16}'$ is each independently selected from the group consisting of $C_7$-$C_{34}$ unsaturated-acyclic-hydrocarbyl, for example $R_{14}'$, $R_{16}'$ is each independently selected from the group consisting of $C_9$-$C_{34}$ unsaturated-acyclic-hydrocarbyl, for example $R_{14}'$, $R_{16}'$ is each independently selected from the group consisting of $C_{11}$-$C_{34}$ unsaturated-acyclic-hydrocarbyl, for example $R_{14}'$, $R_{16}'$ is each independently selected from the group consisting of $C_{13}$-$C_{34}$ unsaturated-acyclic-hydrocarbyl, for example $R_{14}'$, $R_{16}'$ is each independently selected from the group consisting of $C_{11}$-$C_{28}$ unsaturated-acyclic-hydrocarbyl.

1.44 Preferably the polymer is as disclosed in any one of paragraphs 1.1 to 1.42, wherein preferably Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20, and preferably X is selected from the group consisting of X10 and X11 wherein $R_{15}'$, $R_{17}'$ is each $CH_3$, and $R_{14}'$, $R_{16}'$ is each independently selected from the group consisting of $C_3$-$C_{34}$ acyclic-hydrocarbyl, for example $R_{14}'$, $R_{16}'$ is each independently selected from the group consisting of $C_7$-$C_{34}$ acyclic-hydrocarbyl, for example $R_{14}'$, $R_{16}'$ is each independently selected from the group consisting of $C_9$-$C_{34}$ acyclic-hydrocarbyl, for example $R_{14}'$, $R_{16}'$ is each independently selected from the group consisting of $C_{11}$-$C_{34}$ acyclic-hydrocarbyl, for example $R_{14}'$, $R_{16}'$ is each independently selected from the group consisting of $C_{13}$-$C_{34}$ acyclic-hydrocarbyl, for example $R_{14}'$, $R_{16}'$ is each independently selected from the group consisting of $C_{11}$-$C_{28}$ acyclic-hydrocarbyl, for example $R_{14}'$, $R_{16}'$ is each independently selected from the group consisting of $C_3$-$C_{34}$ unsaturated-acyclic-hydrocarbyl, for example $R_{14}'$, $R_{16}'$ is each independently selected from the group consisting of $C_7$-$C_{34}$ unsaturated-acyclic-hydrocarbyl, for example $R_{14}'$, $R_{16}'$ is each independently selected from the group consisting of $C_9$-$C_{34}$ unsaturated-acyclic-hydrocarbyl, for example $R_{14}'$, $R_{16}'$ is each independently selected from the group consisting of $C_{11}$-$C_{34}$ unsaturated-acyclic-hydrocarbyl, for example $R_{14}'$, $R_{16}'$ is each independently selected from the group consisting of $C_{13}$-$C_{34}$ unsaturated-acyclic-hydrocarbyl, for example $R_{14}'$, $R_{16}'$ is each independently selected from the group consisting of $C_{11}$-$C_{28}$ unsaturated-acyclic-hydrocarbyl.

1.45 Preferably the polymer is as disclosed in any one of paragraphs 1.1 to 1.42, wherein preferably Y is selected from the group consisting of Y19 and Y20, and preferably X is selected from the group consisting of X10 and X11 wherein $R_{15}'$, $R_{17}'$ is each independently selected from the group consisting of H and $CH_3$, and $R_{14}'$, $R_{16}'$ is each independently selected from the group consisting of $C_3$-$C_{34}$ acyclic-hydrocarbyl, for example $R_{14}'$, $R_{16}'$ is each independently selected from the group consisting of $C_7$-$C_{34}$ acyclic-hydrocarbyl, for example $R_{14}'$, $R_{16}'$ is each independently selected from the group consisting of $C_9$-$C_{34}$ acyclic-hydrocarbyl, for example $R_{14}'$, $R_{16}'$ is each independently selected from the group consisting of $C_{11}$-$C_{34}$ acyclic-hydrocarbyl, for example $R_{14}'$, $R_{16}'$ is each independently selected from the group consisting of $C_{13}$-$C_{34}$ acyclic-hydrocarbyl, for example $R_{14}'$, $R_{16}'$ is each independently selected from the group consisting of $C_1$-$C_{28}$ acyclic-hydrocarbyl, for example $R_{14}'$, $R_{16}'$ is each independently selected from the group consisting of $C_3$-$C_{34}$ unsaturated-acyclic-hydrocarbyl, for example $R_{14}'$, $R_{16}'$ is each independently selected from the group consisting of $C_7$-$C_{34}$ unsaturated-acyclic-hydrocarbyl, for example $R_{14}'$, $R_{16}'$ is each independently selected from the group consisting of $C_9$-$C_{34}$ unsaturated-acyclic-hydrocarbyl, for example $R_{14}'$, $R_{16}'$ is each independently selected from the group consisting of $C_{11}$-$C_{34}$ unsaturated-acyclic-hydrocarbyl, for example $R_{14}'$, $R_{16}'$ is each independently selected from the group consisting of $C_{13}$-$C_{34}$ unsaturated-acyclic-hydrocarbyl, for example $R_{14}'$, $R_{16}'$ is each independently selected from the group consisting of $C_{11}$-$C_{28}$ unsaturated-acyclic-hydrocarbyl.

1.46 Preferably the polymer is as disclosed in any one of paragraphs 1.1 to 1.42, wherein preferably Y is selected from the group consisting of Y19 and Y20, and preferably X is selected from the group consisting of X10 and X11 wherein $R_{15}'$, $R_{17}'$ is each $CH_3$, and $R_{14}'$, $R_{16}'$ is each independently selected from the group consisting of $C_3$-$C_{34}$ acyclic-hydrocarbyl, for example $R_{14}'$, $R_{16}'$ is each independently selected from the group consisting of $C_7$-$C_{34}$ acyclic-hydrocarbyl, for example $R_{14}'$, $R_{16}'$ is each independently selected from the group consisting of $C_9$-$C_{34}$ acyclic-hydrocarbyl, for example $R_{14}'$, $R_{16}'$ is each independently selected from the group consisting of $C_{11}$-$C_{34}$ acyclic-hydrocarbyl, for example $R_{14}'$, $R_{16}'$ is each independently selected from the group consisting of $C_{13}$-$C_{34}$ acyclic-hydrocarbyl, for example $R_{14}'$, $R_{16}'$ is each independently selected from the group consisting of $C_{11}$-$C_{28}$ acyclic-hydrocarbyl, for example $R_{14}'$, $R_{16}'$ is each independently selected from the group consisting of $C_3$-$C_{34}$ unsaturated-acyclic-hydrocarbyl, for example $R_{14}'$, $R_{16}'$ is each independently selected from the group consisting of $C_7$-$C_{34}$ unsaturated-acyclic-hydrocarbyl, for example $R_{14}'$, $R_{16}'$ is each independently selected from the group consisting of $C_9$-$C_{34}$ unsaturated-acyclic-hydrocarbyl, for example $R_{14}'$, $R_{16}'$ is each independently selected from the group consisting of $C_{11}$-$C_{34}$ unsaturated-acyclic-hydrocarbyl, for example $R_{14}'$, $R_{16}'$ is each independently selected from the group consisting of $C_{13}$-$C_{34}$ unsaturated-acyclic-hydrocarbyl, for example $R_{14}'$, $R_{16}'$ is each independently selected from the group consisting of $C_{11}$-$C_{28}$ unsaturated-acyclic-hydrocarbyl.

1.47 Preferably the polymer is as disclosed in any one of paragraphs 1.1 to 1.42, wherein preferably Y is selected from the group consisting of Y19 and Y20, and preferably X is selected from the group consisting of X10 and X11 wherein $R_{15}'$, $R_{17}'$ is each independently selected from the group consisting of H and $CH_3$, and $R_{14}'$, $R_{16}'$ is each independently selected from the group consisting of $C_3$-$C_{34}$ unsaturated-acyclic-hydrocarbyl, for example $R_{14}'$, $R_{16}'$ is each independently selected from the group consisting of $C_7$-$C_{34}$ unsaturated-acyclic-hydrocarbyl, for example $R_{14}'$, $R_{16}'$ is each independently selected from the group consisting of $C_9$-$C_{34}$ unsaturated-acyclic-hydrocarbyl, for example $R_{14}'$, $R_{16}'$ is each independently selected from the group consisting of $C_{11}$-$C_{34}$ unsaturated-acyclic-hydrocarbyl, for example $R_{14}'$, $R_{16}'$ is each independently selected from the group consisting of $C_{13}$-$C_{34}$ unsaturated-acyclic-hydrocarbyl, for example $R_{14}'$, $R_{16}'$ is each independently selected from the group consisting of $C_{11}$-$C_{28}$ unsaturated-acyclic-hydrocarbyl.

1.48 Preferably the polymer is as disclosed in any one of paragraphs 1.1 to 1.42, wherein preferably Y is selected from the group consisting of Y19 and Y20, and preferably X is selected from the group consisting of X10 and X11 wherein $R_{15}'$, $R_{17}'$ is each $CH_3$, and $R_{14}'$, $R_{16}'$ is each independently selected from the group consisting of $C_3$-$C_{34}$ unsaturated-acyclic-hydrocarbyl, for example $R_{14}'$, $R_{16}'$ is each independently selected from the group consisting of $C_7$-$C_{34}$ unsaturated-acyclic-hydrocarbyl, for example $R_{14}'$, $R_{16}'$ is each independently selected from the group consisting of $C_9$-$C_{34}$ unsaturated-acyclic-hydrocarbyl, for example $R_{14}'$, $R_{16}'$ is each independently selected from the group consisting of $C_{11}$-$C_{34}$ unsaturated-acyclic-hydrocarbyl, for example $R_{14}'$, $R_1'$ is each independently selected from the group consisting of $C_{13}$-$C_{34}$ unsaturated-acyclic-hydrocarbyl, for example $R_{14}'$, $R_{16}'$ is each independently selected from the group consisting of $C_{11}$-$C_{28}$ unsaturated-acyclic-hydrocarbyl.

1.49 Preferably the polymer is as disclosed in any one of paragraphs 1.1 to 1.42, wherein preferably Y is selected from the group consisting of Y19 and Y20, and preferably X is selected from the group consisting of X10 and X11 wherein $R_{15}'$, $R_{17}'$ is each independently selected from the group consisting of H and $CH_3$, and $R_{14}'$, $R_{16}'$ is each independently selected from the group consisting of $C_{11}$-$C_{28}$ unsaturated-acyclic-hydrocarbyl.

1.50 Preferably the polymer is as disclosed in any one of paragraphs 1.1 to 1.42, wherein preferably Y is selected from the group consisting of Y19 and Y20, and preferably X is selected from the group consisting of X10 and X11 wherein $R_{15}'$, $R_{17}'$ is each $CH_3$, and $R_{14}'$, $R_{16}'$ is each independently selected from the group consisting of $C_1$-$C_{28}$ unsaturated-acyclic-hydrocarbyl.

1.51 Preferably the polymer is as disclosed in any one of paragraphs 1.1 to 1.42, wherein preferably Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20, and preferably X is selected from the group consisting of X10 and X11 wherein $R_{15}'$, $R_{17}'$ is each independently selected from the group consisting of H and $CH_3$, and $R_{14}'$, $R_{16}'$ is each independently selected from the group consisting of $C_3$-$C_{34}$ acyclic-hydrocarbyl, for example $R_{14}'$, $R_{16}'$ is each independently selected from the group consisting of $C_7$-$C_{34}$ acyclic-hydrocarbyl, for example $R_{14}'$, $R_{16}'$ is each independently selected from the group consisting of $C_9$-$C_{34}$ acyclic-hydrocarbyl, for example $R_{14}'$, $R_{16}'$ is each independently selected from the group consisting of $C_{11}$-$C_{34}$ acyclic-hydrocarbyl, for example $R_{14}'$, $R_{16}'$ is each independently selected from the group consisting of $C_{13}$-$C_{34}$ acyclic-hydrocarbyl, for example $R_{14}'$, $R_{16}'$ is each independently selected from the group consisting of $C_1$-$C_{28}$ acyclic-hydrocarbyl, for example $R_{14}'$, $R_{16}'$ is each independently selected from the group consisting of $C_3$-$C_{34}$ unsaturated-acyclic-hydrocarbyl, for example $R_{14}'$, $R_{16}'$ is each independently selected from the group consisting of $C_7$-$C_{34}$ unsaturated-acyclic-hydrocarbyl, for example $R_{14}'$, $R_{16}'$ is each independently selected from the group consisting of $C_9$-$C_{34}$ unsaturated-acyclic-hydrocarbyl, for example $R_{14}'$, $R_{16}'$ is each independently selected from the group consisting of $C_{11}$-$C_{34}$ unsaturated-acyclic-hydrocarbyl, for example $R_{14}'$, $R_{16}'$ is each independently selected from the group consisting of $C_{13}$-$C_{34}$ unsaturated-acyclic-hydrocarbyl, for example $R_{14}'$, $R_{16}'$ is each independently selected from the group consisting of $C_{11}$-$C_{28}$ unsaturated-acyclic-hydrocarbyl.

1.52 Preferably the polymer is as disclosed in any one of paragraphs 1.1 to 1.42, wherein preferably Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20, and preferably X is selected from the group consisting of X10 and X11 wherein $R_{15}'$, $R_{17}'$ is each $CH_3$, and $R_{14}'$, $R_{16}'$ is each independently selected from the group consisting of $C_3$-$C_{34}$ acyclic-hydrocarbyl, for example $R_{14}'$, $R_{16}'$ is each independently selected from the group consisting of $C_7$-$C_{34}$ acyclic-hydrocarbyl, for example $R_{14}'$, $R_{16}'$ is each independently selected from the group consisting of $C_9$-$C_{34}$ acyclic-hydrocarbyl, for example $R_{14}'$, $R_{16}'$ is each independently selected from the group consisting of $C_{11}$-$C_{34}$ acyclic-hydrocarbyl, for example $R_{14}'$, $R_{16}'$ is each independently selected from the group consisting of $C_{13}$-$C_{34}$ acyclic-hydrocarbyl, for example $R_{14}'$, $R_{16}'$ is each independently selected from the group consisting of $C_{11}$-$C_{28}$ acyclic-hydrocarbyl, for example $R_{14}'$, $R_{16}'$ is each independently selected from the group consisting of $C_3$-$C_{34}$ unsaturated-acyclic-hydrocarbyl, for example $R_{14}'$, $R_{16}'$ is each independently selected from the group consisting of $C_7$-$C_{34}$ unsaturated-acyclic-hydrocarbyl, for example $R_{14}'$, $R_{16}'$ is each independently selected from the group consisting of $C_9$-$C_{34}$ unsaturated-acyclic-hydrocarbyl, for example $R_{14}'$, $R_{16}'$ is each independently selected from the group consisting of $C_{11}$-$C_{34}$ unsaturated-acyclic-hydrocarbyl, for example $R_{14}'$, $R_{16}'$ is each independently selected from the group consisting of $C_{13}$-$C_{34}$ unsaturated-acyclic-hydrocarbyl, for example $R_{14}'$, $R_{16}'$ is each independently selected from the group consisting of $C_1$-$C_{28}$ unsaturated-acyclic-hydrocarbyl.

1.53 Preferably the polymer is as disclosed in any one of paragraphs 1.1 to 1.42, wherein preferably Y is selected from the group consisting of Y19 and Y20, and preferably X is selected from the group consisting of X10 and X11 wherein $R_{15}'$, $R_{17}'$ is each independently selected from the group consisting of H and $CH_3$, and $R_{14}'$, $R_{16}'$ is each independently selected from the group consisting of $C_3$-$C_{34}$ acyclic-hydrocarbyl, for example $R_{14}'$, $R_{16}'$ is each independently selected from the group consisting of $C_7$-$C_{34}$ acyclic-hydrocarbyl, for example $R_{14}'$, $R_{16}'$ is each independently selected from the group consisting of $C_9$-$C_{34}$ acyclic-hydrocarbyl, for example $R_{14}'$, $R_{16}'$ is each independently selected from the group consisting of $C_{11}$-$C_{34}$ acyclic-hydrocarbyl, for example $R_{14}'$, $R_{16}'$ is each independently selected from the group consisting of $C_{13}$-$C_{34}$ acyclic-hydrocarbyl, for example $R_{14}'$, $R_{16}'$ is each independently selected from the group consisting of $C_1$-$C_{28}$ acyclic-hydrocarbyl, for example $R_{14}'$, $R_{16}'$ is each independently selected from the group consisting of $C_3$-$C_{34}$ unsaturated-acyclic-hydrocarbyl, for example $R_{14}'$, $R_{16}'$ is each independently selected from the group consisting of $C_7$-$C_{34}$ unsaturated-acyclic-hydrocarbyl, for example $R_{14}'$, $R_{16}'$ is each independently selected from the group consisting of $C_9$-$C_{34}$ unsaturated-acyclic-hydrocarbyl, for example $R_{14}'$, $R_{16}'$ is each independently selected from the group consisting of $C_{11}$-$C_{34}$ unsaturated-acyclic-hydrocarbyl, for example $R_{14}'$, $R_{16}'$ is each independently selected from the group consisting of $C_{13}$-$C_{34}$ unsaturated-acyclic-hydrocarbyl, for example $R_{14}'$, $R_{16}'$ is each independently selected from the group consisting of $C_{11}$-$C_{28}$ unsaturated-acyclic-hydrocarbyl.

1.54 Preferably the polymer is as disclosed in any one of paragraphs 1.1 to 1.42, wherein preferably Y is selected from the group consisting of Y19 and Y20, and preferably X is selected from the group consisting of X10 and X11 wherein $R_{15}'$, $R_{17}'$ is each $CH_3$, and $R_{14}'$, $R_{16}'$ is each independently selected from the group consisting of $C_3$-$C_{34}$ acyclic-hydrocarbyl, for example $R_{14}'$, $R_{16}'$ is each independently selected from the group consisting of $C_7$-$C_{34}$ acyclic-hydrocarbyl, for example $R_{14}'$, $R_{16}'$ is each independently selected from the group consisting of $C_9$-$C_{34}$ acyclic-hydrocarbyl, for example $R_{14}'$, $R_{16}'$ is each independently selected from the group consisting of $C_{11}$-$C_{34}$ acyclic-hydrocarbyl, for example $R_{14}'$, $R_{16}'$ is each independently selected from the group consisting of $C_{13}$-$C_{34}$ acyclic-hydrocarbyl, for example $R_{14}'$, $R_{16}'$ is each independently selected from the group consisting of $C_{11}$-$C_{28}$ acyclic-hydrocarbyl, for example $R_{14}'$, $R_{16}'$ is each independently selected from the group consisting of $C_3$-$C_{34}$ unsaturated-acyclic-hydrocarbyl, for example $R_{14}'$, $R_{16}'$ is each independently selected from the group consisting of $C_7$-$C_{34}$ unsaturated-acyclic-hydrocarbyl, for example $R_{14}'$, $R_{16}'$ is each independently selected from the group consisting of $C_9$-$C_{34}$ unsaturated-acyclic-hydrocarbyl, for example $R_{14}'$, $R_{16}'$ is each independently selected from the group consisting of $C_{11}$-$C_{34}$ unsaturated-acyclic-hydrocarbyl, for example $R_{14}'$, $R_{16}'$ is each independently selected from the group consisting of $C_{13}$-$C_{34}$ unsaturated-acyclic-hydrocarbyl, for example $R_{14}'$, $R_{16}'$ is each independently selected from the group consisting of $C_{11}$-$C_{28}$ unsaturated-acyclic-hydrocarbyl.

1.55 Preferably the polymer is as disclosed in any one of paragraphs 1.1 to 1.42, wherein preferably Y is selected from the group consisting of Y19 and Y20, and preferably X is selected from the group consisting of X10 and X11 wherein $R_{15}'$, $R_{17}'$ is each independently selected from the group consisting of H and $CH_3$, and $R_{14}'$, $R_{16}'$ is each independently selected from the group consisting of $C_3$-$C_{34}$ unsaturated-acyclic-hydrocarbyl, for example $R_{14}'$, $R_{16}'$ is each independently selected from the group consisting of $C_7$-$C_{34}$ unsaturated-acyclic-hydrocarbyl, for example $R_{14}'$, $R_{16}'$ is each independently selected from the group consisting of $C_9$-$C_{34}$ unsaturated-acyclic-hydrocarbyl, for example $R_{14}'$, $R_{16}'$ is each independently selected from the group consisting of $C_{11}$-$C_{34}$ unsaturated-acyclic-hydrocarbyl, for example $R_{14}'$, $R_{16}'$ is each independently selected from the group consisting of $C_{13}$-$C_{34}$ unsaturated-acyclic-hydrocarbyl, for example $R_{14}'$, $R_{16}'$ is each independently selected from the group consisting of $C_{11}$-$C_{28}$ unsaturated-acyclic-hydrocarbyl.

1.56 Preferably the polymer is as disclosed in any one of paragraphs 1.1 to 1.42, wherein preferably Y is selected from the group consisting of Y19 and Y20, and preferably X is selected from the group consisting of X10 and X11 wherein $R_{15}'$, $R_{17}'$ is each $CH_3$, and $R_{14}'$, $R_{16}'$ is each independently selected from the group consisting of $C_3$-$C_{34}$ unsaturated-acyclic-hydrocarbyl, for example $R_{14}'$, $R_{16}'$ is each independently selected from the group consisting of $C_7$-$C_{34}$ unsaturated-acyclic-hydrocarbyl, for example $R_{14}'$, $R_{16}'$ is each independently selected from the group consisting of $C_9$-$C_{34}$ unsaturated-acyclic-hydrocarbyl, for example $R_{14}'$, $R_{16}'$ is each independently selected from the group consisting of $C_{11}$-$C_{34}$ unsaturated-acyclic-hydrocarbyl, for example $R_{14}'$, $R_{16}'$ is each independently selected from the group consisting of $C_{13}$-$C_{34}$ unsaturated-acyclic-hydrocarbyl, for example $R_{14}'$, $R_{16}'$ is each independently selected from the group consisting of $C_{11}$-$C_{28}$ unsaturated-acyclic-hydrocarbyl.

1.57 Preferably the polymer is as disclosed in any one of paragraphs 1.1 to 1.42, wherein preferably Y is selected from the group consisting of Y19 and Y20, and preferably X is selected from the group consisting of X10 and X11 wherein $R_{15}'$, $R_{17}'$ is each independently selected from the group consisting of H and $CH_3$, and $R_{14}'$, $R_{16}'$ is each independently selected from the group consisting of $C_{11}$-$C_{28}$ unsaturated-acyclic-hydrocarbyl.

1.58 Preferably the polymer is as disclosed in any one of paragraphs 1.1 to 1.42, wherein preferably Y is selected from the group consisting of Y19 and Y20, and preferably X is selected from the group consisting of X10 and X11 wherein $R_{15}'$, $R_{17}'$ is each $CH_3$, and $R_{14}'$, $R_{16}'$ is each independently selected from the group consisting of $C_{11}$-$C_{28}$ unsaturated-acyclic-hydrocarbyl.

1.59 Preferably the polymer is as disclosed in any one of paragraphs 1.43 to 1.50 wherein preferably A is $CH_3$.

1.60 Preferably the polymer is as disclosed in any one of paragraphs 1.51 to 1.58 wherein preferably A is $CH_3$.

1.61 Preferably the polymer is as disclosed in any one of paragraphs 1.43 to 1.50 wherein preferably A is H.

1.62 Preferably the polymer is as disclosed in any one of paragraphs 1.51 to 1.58 wherein preferably A is H.

1.63 Preferably the polymer is as disclosed in any one of paragraphs 1.43 to 1.50 wherein preferably m=0 and A is $CH_3$.

1.64 Preferably the polymer is as disclosed in any one of paragraphs 1.51 to 1.58 wherein preferably m=1 and A is $CH_3$.

1.65 Preferably the polymer is as disclosed in any one of paragraphs 1.43 to 1.50 wherein preferably m=0 and A is H.

1.66 Preferably the polymer is as disclosed in any one of paragraphs 1.51 to 1.58 wherein preferably m=1 and A is H.

1.68 Preferably the polymer is as disclosed in any one of paragraphs 1.1 to 1.58 wherein X is selected from the group consisting of X10 and X11.

1.73 Preferably the polymer is as disclosed in any one of paragraphs 1.1 to 1.58 wherein m=0, A is $CH_3$ and X is selected from the group consisting of X10 and X11.

1.74 Preferably the polymer is as disclosed in any one of paragraphs 1.1 to 1.58 wherein m=1, A is $CH_3$ and X is selected from the group consisting of X10 and X11.

1.75 Preferably the polymer is as disclosed in any one of paragraphs 1.1 to 1.58 wherein m=0, A is H and X is selected from the group consisting of X10 and X11.

1.76 Preferably the polymer is as disclosed in any one of paragraphs 1.1 to 1.58 wherein m=1, A is H and X is selected from the group consisting of X10 and X11.

1.77 Preferably the polymer is as disclosed in any one of paragraphs 1.1 to 1.42 wherein X is X7, and preferably Y is selected from the group consisting of Y10, Y11, Y18, and Y20.

1.78 Preferably the polymer is as disclosed in any one of paragraphs 1.1 to 1.42 wherein X is X7 with the proviso that m=1, and preferably Y is selected from the group consisting of Y10, Y11, Y18, and Y20.

1.79 Preferably the polymer is as disclosed in any one of paragraphs 1.43 to 1.76 wherein the polymer has:
i) a $M_n$ of at least $10^3$ and at most $4\times10^4$, more preferably of at least $3\times10^3$ and at most $2\times10^4$ Da, and
ii) a D of at least 1.2 and at most 14, and
iii) a $T_g$ of at least −10 and at most 150, preferably at least 0 and at most 130° C., more preferably at least 5 and at most 110, most preferably at least 10 and at most 90, especially at least 10 and at most 60° C., and
iv) an AV of at most 10, preferably of at most 5 mg KOH/g, and
v) an OHV of at least 10 and at most 250, preferably at most 150 mg KOH/g, and
vi) a f of at least 0.2 and at most 50, and preferably the polymer has a MRQ of at least 1 and at most 1.2.

1.80 Preferably the polymer is as disclosed in paragraph 1.79 wherein X is selected from the group consisting of X10 and X11.

1.81 Preferably the polymer is as disclosed in paragraph 1.80 wherein preferably Y is selected from the group consisting of Y19 and Y20.

1.82 Preferably the polymer is as disclosed in paragraph 1.81 wherein the polymer is ionic.

1.83 Preferably the polymer is as disclosed in any one of paragraphs 1.77 to 1.78 wherein the polymer has:
i) a $M_n$ of at least $8\times10^2$ and at most $10^4$, more preferably of at least $10^3$ and at most $6\times10^3$ Da, and
ii) a D of at least 1.1 and at most 4, more preferably of at least 1.2 and at most 2.5, and
iii) a $T_g$ of at least 20 and at most 150, preferably at least 25 and at most 140, more preferably at least 30 and at most 120, most preferably at least 40 and at most 110, especially at least 45 and at most 100° C., and
iv) an AV of at least 0 and at most 250, preferably at least 0.01 and at most 200 mg KOH/g, more preferably at least 2 and at most 80 mg KOH/g and
v) an OHV lower than 100, preferably lower than 80, more preferably lower than 50, most preferably lower than 30, especially lower than 14 mg KOH/g, and
vi) an f of at least 3 and at most 20, preferably of at least 5 and at most 10, and preferably the polymer has a MRQ of at least 1 and at most 1.2.

1.84 Preferably the polymer is as disclosed in paragraph 1.83 wherein the polymer is ionic.

1.85 Preferably the polymer is as disclosed in any one of paragraphs 1.43 to 1.76, and 1.79 to 1.82 wherein the polymer consists of one or more S1 units.

1.86 Preferably the polymer is as disclosed in any one of paragraphs 1.43 to 1.76, and 1.79 to 1.82, wherein the polymer consists of: i) one or more S1 units, and ii) one or more S2 units.

1.87 Preferably the polymer is as disclosed in any one of paragraphs 1.77 to 1.78, and 1.83 to 1.84 wherein the polymer consists of one or more S1 units.

1.88 Preferably the polymer is as disclosed in any one of paragraphs 1.77 to 1.78, and 1.83 to 1.84, wherein the polymer consists of: i) one or more S1 units, and ii) one or more S2 units.

1.89 Preferably the polymer is as disclosed in any one of paragraphs 1.1 to 1.82, wherein the polymer consists of one or more S1 units.

1.90 Preferably the polymer is as disclosed in any one of paragraphs 1.1 to 1.82, wherein the polymer consists of: i) one or more S1 units, and ii) one or more S2 units.

1.91 Preferably the polymer is as disclosed in any one of paragraphs 1.43 to 1.76, and 1.79 to 1.82 wherein the polymer consists of one or more S1 units and one or more ionic monomers which form part of the Polymer's structure.

1.92 Preferably the polymer is as disclosed in any one of paragraphs 1.43 to 1.76, and 1.79 to 1.82 wherein the polymer consists of: i) one or more S1 units, and ii) one or more S2 units, and iii) ionic monomers which form part of the Polymer's structure.

1.93 Preferably the polymer is as disclosed in any one of paragraphs 1.77 to 1.78, and 1.83 to 1.84 wherein the polymer consists of one or more S1 units and ionic monomers which form part of the Polymer's structure.

1.94 Preferably the polymer is as disclosed in any one of paragraphs 1.77 to 1.78, and 1.83 to 1.84 wherein the polymer consists of: i) one or more S1 units, and ii) one or more S2 units, and iii) ionic monomers which form part of the Polymer's structure.

1.95 Preferably the polymer is as disclosed in any one of paragraphs 1.1 to 1.94.

The Polymer may be ionic (ionic Polymer or equally the Polymer may be an ionic polymer), that is the Polymer comprising pendant ionic functional groups in its macromolecular structure. An ionic Polymer may be prepared by any one of the following ways or any combination thereof:

i) neutralizing at least some of the functional groups of the Polymer e.g. carboxyl groups, with amines or other organic or inorganic bases, or ii) reacting or interacting at least some of the functional groups of the Polymer with an emulsifying agent (also known as emulsifier) as the latter is commonly known in the art, or iii) polymerizing at least the monomers making up one or both of S1 and S2, with at least an ionic monomer—as the latter is disclosed herein—that is able to polymerize with the monomers making up one or both of S1 and S2, preferably said ionic monomer is a dicarboxylic aromatic sulfonic acid alkali metal salt e.g. 5-sulfoisophtalic acid sodium salt, said polymerization may be carried out as disclosed herein in any one of the processes disclosed for the preparation of the Polymer; for example the polymerization of an ionic monomer preferably said ionic monomer is a dicarboxylic aromatic sulfonic acid alkali metal salt e.g. 5-sulfoisophtalic acid sodium salt, together with at least the monomers making up one or both of S1 and S2 is particularly preferred when the Polymer is prepared according to any one of processes concerning the Polymer comprising one or both of X10 and X11; for example the polymerization of an ionic monomer preferably said ionic monomer is a dicarboxylic aromatic sulfonic acid alkali metal salt e.g. 5-sulfoisophtalic acid sodium salt, together with at least the monomers making up one or both of S1 and S2 is particularly preferred when the Polymer is prepared according to any one of processes concerning the Polymer comprising one or both of X10 and X11 and especially wherein $R_{14}$ and $R_{16}$ are as disclosed in any one of the paragraphs 1.1 to 1.95 and in particular in any one of the paragraphs 1.79 to 1.82. Thus, preferably an ionic Polymer comprises in its structure an ionic monomer, preferably a dicarboxylic aromatic sulfonic acid alkali metal salt e.g. 5-sulfoisophtalic acid sodium salt (see formula below)

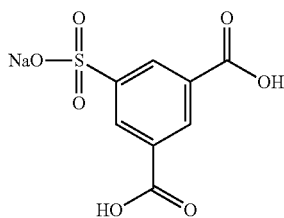

Emulsifying agents are compounds that have both a hydrophilic and a lipophilic part in the chemical structure and are typically classified according to their: a) chemical structure e.g. ionic, non-ionic, or other sub-classification indicative of its origin or chemical make-up, or b) mechanism of action e.g. monomolecular, multi-molecular, etc. Exemplary emulsifiers include but are not limited to tragacanth, sodium lauryl sulfate, sodium dioctyl sulfosuccinate, and sorbitan esters and their ethoxylates under the trademarks Span® and Tween®.

The Polymer may have a linear, or branched, or dendritic macromolecular structure. A Polymer having a linear macromolecular structure is referred herein as a 'linear Polymer'. A Polymer having a branched macromolecular structure is referred herein as a 'branched Polymer'. A Polymer having a dendritic macromolecular structure is referred herein as a 'dendritic Polymer'. Linear and branched types of polymers are as described in A. Rudin, P. Choi 'The Elements of Polymer Science and Engineering', J. Wiley & Sons, $3^{rd}$ edition, 2013, Ch. 1, paragraph 1.6, whilst dendritic polymers are as described in C. Gao, D. Yan 'Hyperbranched polymers: from synthesis to applications', Prog. Polym. Sci., 29 (2004) 183-275. According to C. Gao and D. Yan in their above mentioned publication the class of dendritic macromolecular structures consists of six subclasses: a) dendrons and dendrimers, b) linear-dendritic hybrids, c) dendri-grafts or dendronized polymers, d) hyperbranched polymers, e) multi-arm star polymers, hypergrafts of hypergrafted polymers. The term 'dendritic' (referring to a polymer or macromolecular structure) as used herein encompasses collectively any and all of the above mentioned subclasses a) to e). Preferably, the Polymer does not have a dendritic macromolecular structure, thus preferably the Polymer is not a dendritic Polymer. More preferably the Polymer is linear or branched, even more preferably the Polymer is branched. Here, it is emphasized that linear or branched Polymers are mostly preferred for use in the Binder and in the Composition.

The Polymer may have a functionality of 0. Preferably the Polymer has a functionality of at least 0,0001; preferably the Polymer has a functionality of at most 100. Preferably the Polymer has a functionality of at most 90, more preferably at most 80, even more preferably at most 70, most preferably at most 60, especially at most 50, more especially at most 40, even more especially at most 30, most especially at most 25, for example at most 20, for example at most 18, for example at most 16, for example at most 15, for example at most 14, for example at most 12, for example at most 10 for example at most 9, for example at most 8, for example at most 7, for example at most 6, for example at most 5. Preferably the Polymer has a functionality of at least 0,0005, more preferably at least 0.001, even more preferably at least 0.01, most preferably at least 0.1, especially at least 0.2, more especially at least 0.3, even more especially at least 0.4, most especially at least 0.5, for example at least 0.6, for example at least 0.7, for example at least 0.8, for example at least 0.9, for example at least 1, for example at least 1.01, for example at least 1.03, for example at least 1.04, for example at least 1.05, for example at least 1.06, for example at least 1.07, for example at least 1.08, for example at least 1.09, for example at least 1.1, for example at least 1.12, for example at least 1.15, for example at least 1.17, for example at least 1.19, for example at least 1.2 for example at least 1.4, for example at least 1.6, for example at least 1.8, for example at least 2. Preferably the Polymer has a functionality of at least 0 and at most 5, more preferably the Polymer has a functionality of at least 0 and at most 7, even more preferably the Polymer has a functionality of at least 0,0001 and at most 5, most preferably the Polymer has a functionality of at least 0,0001 and at most 7, especially the Polymer has a functionality of at least 1 and at most 5, more especially the Polymer has a functionality of at least 1 and at most 7.

The Polymer has a MRQ of at least 1. Preferably the Polymer has a MRQ of at most 100.000. Preferably the Polymer has a MRQ of at least 1 and at most 100.000. More preferably the Polymer has a MRQ of at most 10.000, even more preferably at most 1.000, most preferably at most 200, especially at most 100, more especially at most 25, even more especially at most 22, most especially at most 17, for example at most 15, for example at most 13, for example at most 11, for example at most 9, for example at most 7.5, for example at most 6, for example at most 5, for example at most 4.3, for example at most 3.8, for example at most 3.5, for example at most 3.2, for example at most 3.2, for example at most 3.2, for example at most 3.2, for example at most 3, for example at most 2.8, for example at most 2.6, for example at most 2.5, for example at most 2.4, for example at most 2.3, for example at most 2.2, for example at most 2.1, for example at most 2, for example at most 1.9, for example at most 1.8, for example at most 1.7, for example at most 1.6, for example at most 1.5, for example at most 1.4, for example at most 1.3, for example at most 1.2, for example at most 1.1, for example at most 1.08, for example at most 1.05, for example at most 1.03, for example at most 1.02, for example at most 1.01, for example the MRQ is 1. Preferably the Polymer has a MRQ of at least 1 and at most 15, more preferably of at least 1 and at most 10, even more preferably of at least 1 and at most 8, most preferably of at least 1 and at most 6, especially of at least 1 and at most 5, more especially of at least 1 and at most 3, even more especially of at least 1 and at most 2.5, most especially of at least 1 and at most 2, for example of at least 1 and at most 1.5, for example of at least 1 and at most 1.1, for example of at least 1 and at most 1.08, for example of at least 1 and at most 1.05, for example of at least 1 and at most 1.03, for example of at least 1 and at most 1.02, for example of at least 1 and at most 1.01.

Preferably the Polymer has a $M_n$ of at least $3.5 \times 10^2$ Da; preferably the Polymer has a $M_n$ of at most 107 Da. Preferably the Polymer has a $M_n$ of at least $3.5 \times 10^2$ at most 107 Da. Preferably the Polymer has a $M_n$ of at most $5 \times 10^6$, more preferably at most $4 \times 10^6$, even more preferably at most $3 \times 10^6$, most preferably at most $2 \times 10^6$, especially at most $10^6$, more especially at most $7 \times 10^5$, even more especially at most $6 \times 10^5$, most especially at most $5 \times 10^5$, for example at most $4 \times 10^5$, for example at most $3 \times 10^5$, for example at most $2 \times 10^5$, for example at most $1.5 \times 10^5$, for example at most $10^5$, for example at most $9 \times 10^4$, for example at most $8 \times 10^4$ for example at most $7 \times 10^4$, for example at most $6.5 \times 10^4$, for example at most $6 \times 10^4$, for example at most $5 \times 10^4$, for example at most $4 \times 10^4$, for example at most $3.5 \times 10^4$, for example at most $3 \times 10^4$ Da. Preferably the Polymer has a $M_n$ of at least $4 \times 10^2$, more preferably at least 5×10², even more preferably at least 6×10², most preferably at least 7×10², especially at least 8×10², more especially at least 9×10², even more especially at least 10³, most especially at least 1.1×10³, for example at least 1.2×10³, for example at least 1.3×10³, for example at least 1.4×10³, for example at least 1.5×10³, for example at least 1.6×10³, for example at least 1.7×10³, for example at least 1.8×10³ for example at least 1.9×10³, for example at least 2×10³, for example at least 2.1×0, for example at least 2.2×10³ Da.

The Polymer has a polydispersity (D) of at least 1. Preferably the Polymer has a polydispersity of at most 40. Preferably the Polymer has a D of at most 20, more preferably at most 15, even more preferably at most 12, most preferably at most 10, especially at most 9.5, more especially at most 9, even more especially at most 8.5, most especially at most 8, for example at most 7.8, for example at most 7.5, for example at most 7.2, for example at most 7, for example at most 6.8, for example at most 6.6, for example at most 6.5 for example at most 6.4, for example at most 6.3, for example at most 6.2, for example at most 6.1, for example at most 6, for example at most 5.9, for example at most 5.8 for example at most 5.7 for example at most 5.6. Preferably the Polymer has a D of at least 1.01, more preferably at least 1.02, even more preferably at least 1.03, most preferably at least 1.04, especially at least 1.05, more especially at least 1.06, even more especially at least 1.07, most especially at least 1.08, for example at least 1.09, for example at least 1.1, for example at least 1.12, for example at least 1.15, for example at least 1.17, for example at least 1.19, for example at least 1.2. Preferably the polymer has a polydispersity of at least 1.05 and at most 5, more preferably at least 1.05 and at most 4, even more preferably at least 1.05 and at most 3, most preferably at least 1.05 and at most 2.

Preferably the Polymer has a $T_g$ of at least −70° C.; preferably the Polymer has a $T_g$ of at most 250° C. Preferably the Polymer has a $T_g$ of at least −70 and at most 250° C. Preferably the Polymer has a $T_g$ of at most 220, more preferably at most 200, even more preferably at most 190, most preferably at most 180, especially at most 170, more especially at most 160, even more especially at most 155, most especially at most 150, for example at most 140° C. Preferably the Polymer has a $T_g$ of at least −60, more preferably at least −50, even more preferably at least −40, most preferably at least −30, especially at least −20, more especially at least −10, even more especially at least 0, most especially at least 5, for example at least 8, for example at least 10, for example at least 20, for example at least 25, for example at least 30, for example at least 35, for example at least 40, for example at least 45, for example at least 48, for example at least 50° C.

The Polymer may have an AV of 0. Preferably the Polymer has an AV of at least 0,001 mg KOH/g. Preferably the Polymer has an AV of at least 0.01 mg KOH/g. Preferably the Polymer has an AV of at most 300 mg KOH/g. Preferably the Polymer has an AV of at least 0 at most 300 mg KOH/g. Preferably the Polymer has an AV of at least 0.01 at most 300 mg KOH/g. Preferably the Polymer has an AV of at most 250, more preferably at most 200, even more preferably at most 180, most preferably at most 160, especially at most 140, more especially at most 120, even more especially at most 100, most especially at most 90, for example at most 80, for example at most 60, for example at most 50 for example at most 40, for example at most 30, for example at most 20, for example at most 13, for example at most 12, for example at most 10, for example at most 8, for example at most 6, for example at most 5, for example at most 4, for example at most 3, for example at most 2, for example at most 1 mg KOH/g. Preferably the Polymer has an AV of at least 0.1, more preferably at least 0.5, even more preferably at least 0.7, most preferably at least 0.8, especially at least 1 mg KOH/g. Preferably, the Polymer has an AV of at least 0 and at most 13, more preferably at least 0.001 and at most 13.

The Polymer may have an OHV of 0. Preferably the Polymer has an OHV of at least 0.01 mg KOH/g. Preferably the Polymer has an AV of at most 500 mg KOH/g. Preferably the Polymer has an OHV of at least 0.01 at most 500 mg KOH/g. Preferably the Polymer has an AV of at most 480, more preferably at most 460, even more preferably at most 440, most preferably at most 420, especially at most 400, more especially at most 380, even more especially at most 360, most especially at most 340, for example at most 320, for example at most 300, for example at most 280 for example at most 260, for example at most 240, for example at most 220, for example at most 200, for example at most 180, for example at most 160, for example at most 140, for example at most 120, for example at most 100, for example at most 90, for example at most 80 mg KOH/g. Preferably the Polymer has an OHV of at least 0.1, more preferably at least 0.5, even more preferably at least 0.7, most preferably at least 0.8, especially at least 1, more especially at least 1.2, even more especially at least 1.5, most especially at least 1.8, for example at least 2, for example at least 2.5, for example at least 3, for example at least 3.5, for example at least 4, for example at least 5, for example at least 7, for example at least 8, for example at least 9, for example at least 10, for example at least 15, for example at least 18, for example at least 20, for example at least 25, for example at least 30, for example at least 35, for example at least 40, for example at least 45, for example at least 50, for example at least 55, for example at least 60, for example at least 65, for example at least 70, for example at least 75, for example at least 80, for example at least 85, for example at least 90, for example at least 95, for example at least 100, for example at least 120, for example at least 120, for example at least 150 mg KOH/g. Preferably, the Polymer has an OHV of at least 20 and at most 200. Preferably, the Polymer has an OHV of at least 50 and at most 150.

Preferably the Polymer is hydroxyl-functional. Preferably the hydroxyl-functional Polymer has an AV lower than 14 mg KOH/g, and an OHV of at least 14, even more preferably at least 18, most preferably at least 20, especially at least 25, more especially at least 30, most especially at least 35, for example at least 40, for example at least 45, for example at least 50, for example at least 55, for example at least 60, for example at least 65, for example at least 70, for example at least 75, for example at least 80, for example at least 85, for example at least 90, for example at least 95, for example at least 100, for example at least 120, for example at least 120, for example at least 150 mg KOH/g. Preferably the hydroxyl-functional Polymer has an AV lower than 14 mg KOH/g and an OHV of at most 500, more preferably at most 480, even more preferably at most 460, most preferably at most 440, especially at most 420, more especially at most 400, most especially at most 380, for example at most 360, for example at most 340, for example at most 320, for example at most 300, for example at most 280 for example at most 260, for example at most 240, for example at most 220, for example at most 200, for example at most 180, for example at most 160, for example at most 140, for example at most 120, for example at most 100, for example at most 90, for example at most 80 mg KOH/g.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 1 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

2. Processes for Making the Polymer

The Polymer may be prepared via a variety of processes as explained in this section. The processes disclosed in section 2 are not meant to be exhaustive. NMR spectroscopy may be employed to follow the progress of any one of the steps disclosed in the processes disclosed below and in particular the the conversion of carbon-carbon double bonds into oxirane groups, or the consumption of the oxirane groups when the latter participate and are consumed during a reaction.

2.2a The polymer as defined in paragraph 1.1 wherein m=0, A is $CH_3$ and X is selected from the group consisting of X1, X2, X3, X4, X5, X6, X7, X10 and X11 may be prepared according to the following general process, said process comprising the steps of:

a) providing carbon dioxide ($CO_2$), limonene dioxide (LDO), and a catalyst A, and b) charging a reactor vessel with the LDO and the catalyst A, and c) pressurizing the reactor vessel with the $CO_2$ so that the pressure is between 0.1 and 50 MPa, preferably between 0.2 and 20 MPa, more preferably between 0.3 and 10 MPa, most preferably between 0.5 and 6 MPa, and d) reacting and polymerizing the mixture of $CO_2$ and LDO at a temperature of at least 0 and at most 100° C., preferably of at least 5 and at most 80° C., more preferably at least 10 and at most 60° C., most preferably at least 10 and at most 50° C., especially at least 10 and at most 35° C. for a time period ranging from 0.5 up to 100 hours, preferably from 1 up to 48 hours, more preferably from 2 up to 22, most preferably from 2 up to 20 hours, especially from 2 up to 18 hours, more especially from 2 up to 16 hours, most especially from 2 up to 12 hours, for example from 2 up to 6 hours, for example from 2 up to 4 hours, for examples from 2 up to 3 hours, to afford a polymer comprising the following unit (herein 'polymer-2.2a'):

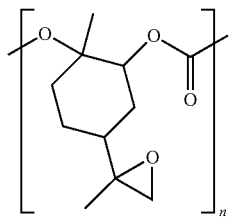

e) reacting the oxirane groups of the polymer produced in step d) (polymer-2.2a) with a reagent preferably in the presence of a catalyst (the reagent, catalyst and reaction conditions are as specified below depending on the desired type of X group) and preferably in a solution in an organic solvent to afford the polymer as defined in paragraph 1.1 wherein m=0 and X is selected from the group consisting of X1, X2, X3, X4, X5, X6, X7, X10 and X11, and f) discharging the polymer thus produced in step e) from the reactor vessel.

Preferably the catalyst A to be used in the above process is selected from the group consisting of (Et-BDI)Zn[N(SiMe$_3$)$_2$], and amino-triphenolate aluminum metal complexes, the latter in the optional presence of PPN-halogen co-catalysts. Features such as the selectivity, region-/stereo-chemistry, $M_n$, $M_w$, polydispersity, composition and type of end— groups may be controlled by the selection of the catalyst. Preferably, the amount of catalyst A ranges from 0.01 to 5, more preferably from 0.03 to 4, even more preferably from 0.05 to 3, most preferably from 0.075 to 2, especially from 0.1 to 1.5 mol % relevant to the amount of oxirane groups. The process disclosed above for the preparation of the polymer-2.2a [process steps a) to d)] is schematically represented as follows:

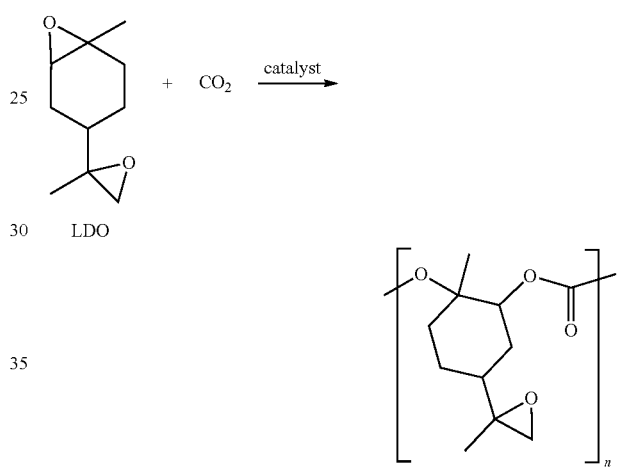

When the polymerization reaction of the LDO (which may be biorenewable, or obtained from fossil fuel) with the carbon dioxide takes place in the presence of (Et-BDI)Zn[N(SiMe$_3$)$_2$] as catalyst A, this results in the alternating copolymerization of the LDO with carbon dioxide. The process described in steps a) to d) may also be chemo-selective resulting effectively in a linear amorphous polymer-2.2a having pendant methyloxirane groups and having high glass transition temperatures ($T_g$) e.g. 135° C. or higher, and relatively narrow polydispersities e.g. lower than 2.

2.2b Alternatively the polymer as defined in paragraph 1.1 wherein m=0 and X is selected from the group consisting of X1, X2, X3, X4, X5, X6, X7, X10 and X11 may be prepared according to the following general process:

a) providing directly a polymer as the one produced at the end of step d) of paragraph 2.2a ['directly' has the meaning that said polymer has been sourced from a party other than the one who is to perform the following step b)], and b) reacting the oxirane groups of the polymer of a) just above with a reagent preferably in the presence of a catalyst (the reagent, catalyst and reaction conditions are as specified below depending on the desired type of X group) and preferably in a solution in an organic solvent, to afford the polymer as defined in paragraph 1.1 wherein m=0 and X is selected from the group consisting of X1, X2, X3, X4, X5, X6, X7, X10 and X11, and c) discharging the polymer thus produced in step b) from the reactor vessel.

2.3 Alternatively the polymer as defined in paragraph 1.1 wherein m=0 and X is selected from the group consisting of X1, X2, X3, X4, X5, X6, X7, X10 and X11 may be prepared according to the following general process:

a) providing carbon dioxide ($CO_2$), CEPOX-1 and a catalyst A, and b) charging a reactor vessel with the CEPOX-1 and the catalyst A, and c) pressurizing the reactor vessel with the $CO_2$ so that the pressure is between 0.1 and 50 MPa, preferably between 0.2 and 20 MPa, more preferably between 0.3 and 10 MPa, most preferably between 0.5 and 6 MPa, and d) reacting and polymerizing the mixture of $CO_2$ and CEPOX-1 at a temperature of at least 0 and at most 150° C., preferably of at least 20 and at most 100° C., more preferably at least 25 and at most 80° C., even more preferably at least 25 and at most 60, most preferably at least 25 and at most 50, especially at least 25 and at most 45° C., for a time period ranging from 0.5 up to 100 hours, preferably from 1 up to 50 hours, more preferably from 2 up to 22, most preferably from 2 up to 20 hours, to afford a polymer which has pendant unreacted carbon-carbon double bonds, and subsequently e) converting the carbon-carbon double bonds of the polymer produced in step d) into oxirane groups (epoxidation of carbon-carbon double bonds into oxirane groups) by reacting said carbon-carbon double bonds with methods well-known in the art (some of which are detailed below), to afford a polymer comprising pendant oxirane groups, and f) reacting the oxirane groups of the polymer produced in step e) with a reagent preferably in the presence of a catalyst and preferably in a solution in an organic solvent to afford the polymer as defined in paragraph 1.1 wherein m=0 and X is selected from the group consisting of X1, X2, X3, X4, X5, X6, X7, X10 and X11, and g) discharging the polymer thus produced in step d) from the reactor vessel.

The epoxidation of the carbon-carbon double bonds into oxirane groups (step e) in the process of paragraph 2.3 may be performed by methods well-known in the art. Preferably this step e) is performed by using any one of the following methods:

i) hydrogen peroxide and either formic acid or acetic acid according to the publication of M. Worzakowska, "Chemical Modification of Unsaturated Polyesters Influence of Polyester's Structure on Thermal and Viscoelastic Properties of Low Styrene Content Copolymers," Journal of Applied Polymer Science, vol. 114, no. 2, p. 720-731, 2009.], or or ii) hydrogen peroxide, acetic acid and specific enzymes such as Novozym® 435, according to the publication of M. Klaas and S. Warwel, "Complete and partial epoxidation of plant oils by lipase-catalyzed perhydrolysis," Industrial Crops and Products, vol. 9, no. 2, pp. 125-132, 1999, or iii) hydrogen peroxide, acetic acid and an ion exchange resin such as Amberlite IR-120 according to the publication of S. Sinadinovid-Fiser, M. Jankovid and Z. S. Petrovid, "Kinetics of in situ Epoxidation of Soybean Oil in Bulk Catalyzed by Ion Exchange Resin," Journal of the American Oil Chemists' Society, vol. 78, no. 7, pp. 725-731, 2001; (the ion exchange resin and the enzyme function as catalysts for the formation of peracetic acid), or iv) with mCPBA according to the publication of M. Leemhuis, N. Akeroyd, J. Kruijtzer, C. van Nostrum and W. Hennink, "Synthesis and characterization of allyl functionalized poly(α-hydroxy)acids and their further dihydroxylation and epoxidation" European Polymer Journal, vol. 44, no. 2, pp. 308-317, 2008.

(for convenience the above methods i) to iv) associated to step e) of the process of this paragraph are referred herein as ei) to eiv) respectively).

The epoxidation of the carbon-carbon double bonds into oxirane groups (step e) may be performed in the presence of organic solvents such as dichloromethane, toluene, xylene and methyl cyclohexane. Preferably the step e) in the process of paragraph 2.3 is performed at a temperature of at least 35 and at most 80° C., more preferably of at least 40 and at most 75° C., for a time period of at least 2 and at most 20 hours, more preferably of at least 3 and at most 15 hours, most preferably of at least 3 and at most 12 hours, especially of at least 3 and at most 10 hours, more especially at least 3 and at most 8 hours, most especially at least 4 and at most 8 hours.

A typical example of carrying out step e) in the process of paragraph 2.3 is as follows:

e-1) providing a polymer comprising pendant carbon-carbon double bonds, an aqueous hydrogen peroxide solution (35%), formic acid (FoA) and a suitable solvent, for example dichloromethane, and e-2) charging and mixing a reactor vessel with the polymer comprising pendant carbon-carbon double bonds, the formic acid (FoA) and the solvent to form a solution, and e-3) heating the solution up at a temperature of at least 35 and at most 80° C., more preferably of at least 40 and at most 75° C., and e-4) dosing the aqueous hydrogen peroxide solution (35%) into the solution to form a reaction mixture, and e-5) maintaining the heating at the selected temperature for a time period of at least 2 and at most 20 hours, more preferably of at least 3 and at most 15 hours, most preferably of at least 3 and at most 12 hours, especially of at least 3 and at most 10 hours, more especially at least 3 and at most 8 hours, most especially at least 4 and at most 8 hours, to afford the polymer comprising pendant oxirane groups and e-6) optionally, purifying the polymer comprising pendant oxirane groups obtained in step e-5 from any catalyst, unreacted monomers, and other impurities by for example transferring the reaction mixture into a separation funnel and wash once with a 5% bicarbonate solution, once with a 5% NaCl solution and once with demineralized water; the solvent layer containing the purified polymer comprising pendant oxirane groups was dried with $MgSO_4$, and e-7) optionally evaporating the solvent, and e-8) collecting the polymer comprising pendant oxirane groups.

2.4 Alternatively the polymer as defined in paragraph 1.1 wherein m=0 and X is selected from the group consisting of X1, X2, X3, X4, X5, X6, X7, X10 and X11 may be prepared according to the process of paragraph 2.3, wherein instead of CEPOX-1, CEPOX-2 is used and instead of catalyst A, catalyst B is used.

2.5 The polymer as defined in paragraph 1.1 wherein m=0 and X is selected from the group consisting of X5, X6 may be prepared according to any one of processes disclosed in paragraphs 2.2a, or 2.2b, or 2.3, or 2.4, wherein each of step e) in the process of paragraph 2.2a
and
step b) in the process of paragraph 2.2b
and
step f) in the process of paragraph 2.3 or paragraph 2.4
may be carried out at room temperature (r.t.) by reacting the oxirane groups of the polymer comprising pendant oxirane groups with a thiol in a solution in THF and in the presence of lithium hydroxide (LiOH) as catalyst which is typically in an amount of from 2 to 8, preferably 3 to 7, more preferably 4 to 6, most preferably 5 mol % relevant to the amount of oxirane groups. The result of this reaction is the formation of thioether moieties. The following reaction scheme is a schematic illustration of an example of the reaction described by the process of this paragraph.

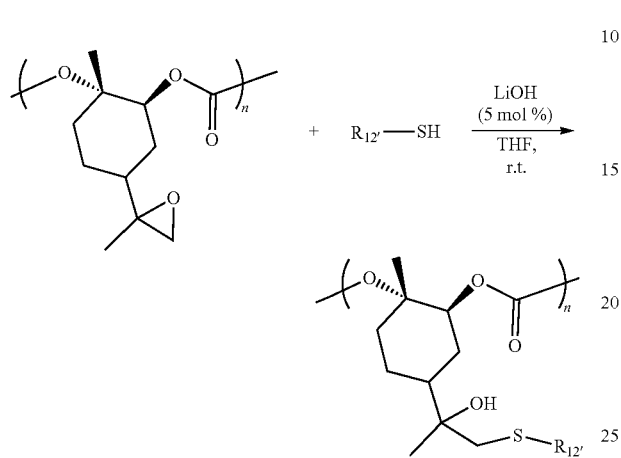

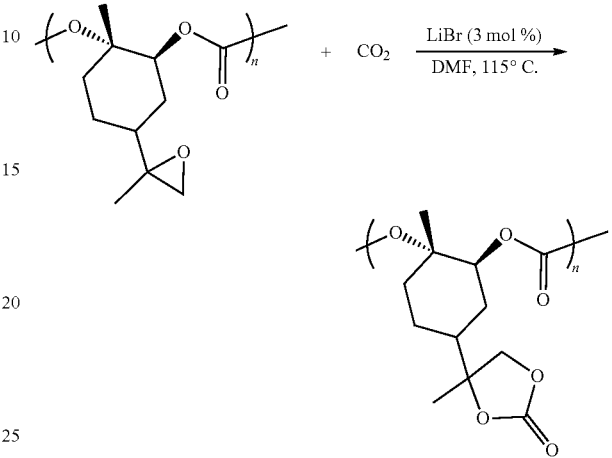

2.6 The polymer as defined in paragraph 1.1 wherein m=0 and X is selected from the group consisting of X1, X2 may be prepared according to any one of processes disclosed in paragraphs 2.2a, or 2.2b, or 2.3, or 2.4, wherein each of
step e) in the process of paragraph 2.2a
and
step b) in the process of paragraph 2.2b
and
step f) in the process of paragraph 2.3 or paragraph 2.4 may be carried out at relatively low temperatures, for example temperatures in the range of from 20 up to 100, more preferably from 25 up to 80, even more preferably from 25 up to 40, most preferably from 25 up to 30° C., by reacting the oxirane groups of the polymer comprising pendant oxirane groups with an amine e.g. aliphatic amine in a solution in DMF (dimethyl formamide), or xylene or toluene and in the presence of a catalyst such as zinc(II) perchlorate hexahydrate, trimethylamine, 4-dimethylaminopyridine, lithium trifluoromethanesulfonate and iron(III) perchlorate hydrate, typically in an amount of 0.5-8, more preferably in an amount of 1-7, even more preferably 2-4 mol % relevant to the amount of oxirane groups.

2.7 The polymer as defined in paragraph 1.1 wherein m=0 and X is selected from the group consisting of X7 may be prepared according to any one of processes disclosed in paragraphs 2.2a, or 2.2b, or 2.3, or 2.4, wherein each of
step e) in the process of paragraph 2.2a
and
step b) in the process of paragraph 2.2b
and
step f) in the process of paragraph 2.3 or paragraph 2.4 may be carried out at elevated temperatures for example temperatures in the range of from 80 up to 150° C., preferably from 100 up to 120° C., more preferably at 115° C., by reacting the oxirane groups of the polymer comprising pendant oxirane groups with $CO_2$ preferably under pressure higher than atmospheric, preferably a pressure of at most 50 MPa, more preferably at most 30 MPa, even more preferably at most 10 MPa, most preferably at most 5, especially at most 4 MPa, in a solution in DMF and in the presence of lithium bromide (LiBr) as catalyst which is typically in an amount of from 1 to 8, more preferably from 2 to 6, even more preferably from 2.5 to 4, most preferably 3 mol % relevant to the amount of oxirane groups. The following reaction scheme is a schematic illustration of an example of the reaction described by the process of this paragraph.

2.8 The polymer as defined in paragraph 1.1 wherein m=0 and X is selected from the group consisting of X3, X4 may be prepared according to any one of processes disclosed in paragraphs 2.2a, or 2.2b, or 2.3, or 2.4, wherein each of
step e) in the process of paragraph 2.2a
and
step b) in the process of paragraph 2.2b
and
step f) in the process of paragraph 2.3 or paragraph 2.4 are carried out according to the process described in 2.7, thus producing the polymer obtainable by the process of paragraph 2.7, and then further reacting the pendant cyclocarbonate groups of said polymer with an amine e.g. aliphatic amine in a solution in DMF (dimethyl formamide), or xylene or toluene and in the presence of a catalyst such as zinc(II) perchlorate hexahydrate, trimethylamine, 4-dimethylaminopyridine, lithium trifluoromethanesulfonate and iron(III) perchlorate hydrate, typically in an amount of 0.5-8, more preferably in an amount of 1-7, even more preferably 2-4 mol % relevant to the amount of the cyclocarbonate groups, at relatively low temperatures, for example temperatures in the range of from 20 up to 100, more preferably from 25 up to 80, even more preferably from 25 up to 40, most preferably from 25 up to 30° C.

2.9 The polymer as defined in paragraph 1.1 wherein m=0 and X is selected from the group consisting of X10, X11 may be prepared according to any one of processes disclosed in paragraphs 2.2a, or 2.2b, or 2.3, or 2.4, wherein each of
step e) in the process of paragraph 2.2a
and
step b) in the process of paragraph 2.2b
and
step f) in the process of paragraph 2.3 or paragraph 2.4 may be carried out at elevated temperatures for example temperatures in the range of from 80 up to 150° C., preferably from 100 up to 140° C., more preferably from 115 up to 130° C., by reacting the oxirane groups of the polymer comprising pendant oxirane groups with a reagent that comprises at least one carboxyl group e.g. acrylic acid, fatty acid e.g. isostearic acid, soya oil fatty acid, hexanoic acid, in a solution in xylene and in the presence of tetrabutylphosphonium bromide (TBPB) as catalyst which is typically in an amount of 0.2-15, preferably 0.5-13 mol % relevant to the amount of oxirane groups. The following reaction scheme is a schematic illustration of an example of the reaction described by the process of this paragraph.

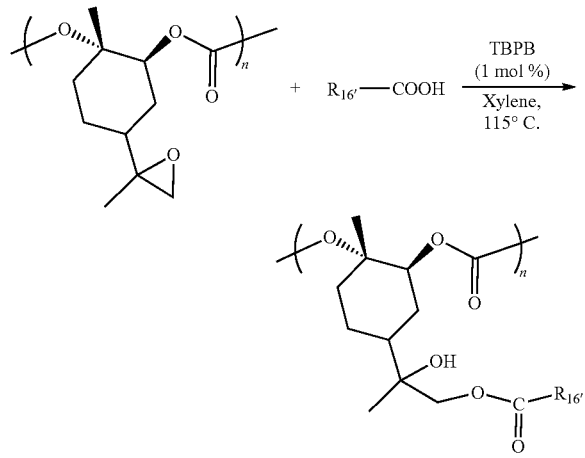

2.10 The polymer as defined in any one of paragraphs 1.2 to 1.5 wherein m=0 and X is selected from the group consisting of X10, X11 may be prepared according to any one of processes disclosed in paragraphs 2.2a, or 2.3 or 2.4, wherein
step a) in the process of paragraph 2.2a
and
step a) in the process of paragraph 2.3
also a mono-epoxide is provided
and wherein in
step b) in the process of paragraph 2.2a
and
step b) in the process of paragraph 2.3, or paragraph 2.4
also a mono-epoxide is charged
and wherein in
step d) in the process of paragraph 2.2a
and
step d) in the process of paragraph 2.3 or paragraph 2.4
also a mono-epoxide is reacted and polymerized,
and wherein
step e) in the process of paragraph 2.2a
and
step f) in the process of paragraph 2.3, or paragraph 2.4
may be carried out at relatively low temperatures, for example temperatures in the range of from 70 up to 150, more preferably from 80 up to 130° C., by reacting the oxirane groups of the polymer comprising pendant oxirane groups with a reagent that comprises at least one carboxyl group e.g. acrylic acid, fatty acid e.g. isostearic acid, soya oil fatty acid, hexanoic acid, in a solution in xylene and in the presence of tetrabutylphosphonium bromide (TBPB) as catalyst which is typically in an amount of 0.2-15, preferably 0.5-13 mol % relevant to the amount of oxirane groups.

2.11b The polymer as defined in paragraph 1.1 wherein m=1 and X is selected from the group consisting of X1, X2, X3, X4, X5, X6, X7, X10 and X11, and Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20, may be prepared according to the following general process, said process comprising the steps of:

a) providing an anhydride A, cyclo-epoxide (CEPOX), and a catalyst C, and
b) charging a reactor vessel with the anhydride A, the CEPOX and the catalyst C, and
c) reacting and polymerizing the mixture of anhydride A and CEPOX at a temperature of at least 0 and at most 200° C., preferably of at least 20 and at most 180° C., more preferably at least 40 and at most 170° C., even more preferably at least 60 and at most 160, most preferably at least 70 and at most 150, for a time period ranging from 0.5 up to 100 hours, preferably from 1 up to 50 hours, more preferably from 2 up to 22, most preferably from 2 up to 20 hours, to afford a polymer which has pendant unreacted carbon-carbon double bonds, and subsequently
d) converting the carbon-carbon double bonds of the polymer produced in step c) into oxirane groups (epoxidation of carbon-carbon double bonds into oxirane groups) by reacting said carbon-carbon double bonds with methods well-known in the art, for example any one of methods ei) to eiv) as disclosed for step e) of the process described in paragraph 2.3, to afford a polymer comprising pendant oxirane groups, and
e) reacting the oxirane groups of the polymer produced in step d) with a reagent preferably in the presence of a catalyst (the reagent, catalyst and reaction conditions are as specified in paragraphs 2.5 to 2.9 depending on the desired type of X group) and preferably in a solution in an organic solvent to afford the polymer as defined in paragraph 1.1 wherein m=1 and X is selected from the group consisting of X1, X2, X3, X4, X5, X6, X7, X10 and X11 and Y being anything.
f) discharging the polymer thus produced in step e) from the reactor vessel.

2.11c The polymer as defined in paragraph 1.1 wherein m=1 and X is selected from the group consisting of X10, X11, and Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20, may be prepared according to any one of the processes disclosed in paragraphs 2.11b, wherein
step e) in the process of paragraph 2.11b
may be carried out at elevated temperatures for example temperatures in the range of from 80 up to 150° C., preferably from 100 up to 140° C., more preferably from 115 up to 130° C., by reacting the oxirane groups of the polymer comprising pendant oxirane groups with a reagent that comprises at least one carboxyl group e.g. acrylic acid, fatty acid e.g. isostearic acid, soya oil fatty acid, hexanoic acid, in a solution in xylene and in the presence of tetrabutylphosphonium bromide (TBPB) as catalyst which is typically in an amount of 0.2-15, preferably 0.5-13 mol % relevant to the amount of oxirane groups.

2.12b The polymer as defined in any one of paragraphs 1.2 to 1.5, wherein m=1 and X is selected from the group consisting of X1, X2, X3, X4, X5, X6, X7, X10 and X11, and Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20, may be prepared according to the following general process, said process comprising the steps of:
a) providing an anhydride A, a CEPOX and a mono-epoxide and a catalyst C, and
b) charging a reactor vessel with the anhydride A, the CEPOX, the mono-epoxide and the catalyst C, and
c) reacting and polymerizing the mixture of anhydride A, CEPOX and the mono-epoxide at a temperature of at least 0 and at most 200° C., preferably of at least 20 and at most 180° C., more preferably at least 40 and at most 170° C., even more preferably at least 60 and at most 160, most preferably at least 70 and at most 150, for a time period ranging from 0.5 up to 100 hours, preferably from 1 up to 50 hours, more preferably from 2 up to 22, most preferably from 2 up to 20 hours, to afford a polymer which has pendant unreacted carbon-carbon double bonds, and subsequently d) converting the carbon-carbon double bonds of the polymer produced in step c) into oxirane groups (epoxidation of carbon-carbon double bonds into oxirane groups) by reacting said carbon-carbon double bonds with methods well-known in the art for example any one of methods ei) to eiv) as disclosed for step e) of the process described in paragraph 2.3, to afford a polymer comprising pendant oxirane groups, and e) reacting the oxirane groups of the polymer produced in step d) with a reagent preferably in the presence of a catalyst (the reagent, catalyst and reaction conditions are as specified in any one of paragraphs 2.5 to 2.9 depending on the desired type of X group) and preferably in a solution in an organic solvent to afford the polymer as defined in paragraph 1.1 wherein m=1 and X is selected from the group consisting of X1, X2, X3, X4, X5, X6, X7, X10 and X11 and Y being anything.

f) discharging the polymer thus produced in step e) from the reactor vessel.

2.12c The polymer as defined in any one of paragraphs 1.2 to 1.5, wherein m=1 and X is selected from the group consisting of X10 and X11, and Y is selected from the group consisting of Y1, Y2, Y3, Y4, Y5, Y6, Y7, Y8, Y9, Y10, Y11, Y12, Y13, Y14, Y15, Y16, Y17, Y18, Y19, and Y20, may be prepared according to the process disclosed in paragraph 2.12b, wherein step e) in the process of paragraph 2.12b may be carried out at elevated temperatures for example temperatures in the range of from 80 up to 150° C., preferably from 100 up to 140° C., more preferably from 115 up to 130° C., by reacting the oxirane groups of the polymer comprising pendant oxirane groups with a reagent that comprises at least one carboxyl group e.g. acrylic acid, fatty acid e.g. isostearic acid, soya oil fatty acid, hexanoic acid, in a solution in xylene and in the presence of tetrabutylphosphonium bromide (TBPB) as catalyst which is typically in an amount of 0.2-15, preferably 0.5-13 mol % relevant to the amount of oxirane groups.

2.13 Preferably the process is as disclosed in any one of paragraphs 2.2a to 2.12c.

If desired, the Polymer prepared by any one of the processes disclosed in any one of paragraphs 2.2a to 2.12c, may be purified by washing it with a suitable non-solvent e.g. methanol, to remove the catalyst and/or any unreacted monomers and the Polymer may be subsequently dried under vacuum before the Polymer is discharged from the reaction vessel.

If desired, additives such anti-oxidants, flow additives, tribo additives can be added to the polymer obtained by the process as disclosed in any one of paragraphs 2.2a to 2.12c whilst the polymer is in the reaction vessel and prior the polymer is discharged as mentioned herein; this addition typically takes place at temperatures in the range of 0-210° C. or in the range of 40–195° C. If said additives are mixed within the polymer, a reasonable amount of time to ensure proper mixing of the additive into the polymer is carried out; for example the mixing can last from 15 to 60 min at temperatures in the range of 40-195° C.; subsequently, the polymer is ready for being discharged and collected.

Broadly in accordance with the invention there is provided a polymer obtained by any one of the processes disclosed in this section, thus any one of processes disclosed in any one of paragraphs 2.2a to 2.13.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

3. Compositions which Embody the Invention ('Composition')

The composition of the invention ('Composition') comprises the binder of the invention ('Binder') and may optionally comprise a constituent B. Thus, the Binder and the constituent B—when the latter is present—are components of the Composition.

The Composition may be liquid or solid. When the Composition is liquid, then the Composition is preferably water-borne (water-borne Composition) or solvent-borne (solvent-borne Composition), more preferably the Composition is water-borne, even more preferably the Composition is a water reducible composition, or a latex composition or an emulsion most preferably the Composition is a water reducible composition or an emulsion, especially the Composition is a water reducible composition. When the Composition is solid, then the Composition is preferably in the form of distinct particles (particulate composition) or a paste, more preferably is a powder or a paste, more preferably is a powder.

By 'Binder' is meant herein the total of functional polymers and the total of constituent A contained in a Composition; the Binder is obviously a component of the component of the Composition.

By 'constituent A' is meant herein a component of the Composition wherein said component is selected from the group consisting of organic metal salt, thermal initiator, photoinitiator, copolymerizable agent and mixtures thereof. In other words the constituent A is selected from the group consisting of organic metal salt, thermal initiator, photoinitiator, copolymerizable agent and mixtures thereof.

Preferably the Composition comprises the Binder in an amount of at least 1 and at most 100 pph Composition. Preferably, the Composition comprises the Binder in an amount of at least 5, more preferably at least 10, even more preferably at least 20, most preferably at least 30, especially at least 40, more especially at least 45, even more especially at least 50, most especially at least 60, for example at least 70, for example at least 75, for example at least 80, for example at least 85, for example at least 90, for example at least 92, for example at least 94, for example at least 96, for example at least 97, for example at least 98, for example at least 99 pph Composition. Preferably the Composition comprises the Binder in an amount of at most 100, more preferably at most 98, even more preferably at most 97, most preferably at most 96, especially at most 94, more especially at most 92, even more especially at most 90, most especially at most 85, for example at most 80, for example at most 75, for example at most 70, for example at most 60, for example at most 50, for example at most 45, for example at most 40, for example at most 35, for example at most 30, for example at most 20, for example at most 15 pph Composition. Preferably the Composition is the Binder.

The Binder may be liquid or solid. When the Binder is liquid, then the Binder is preferably water-borne or solvent-borne, more preferably the Binder is a water reducible Binder, or a latex Binder or an emulsion. When the Binder is solid, then the Binder is preferably in the form of distinct particles (particulate Binder) or a paste, more preferably is a powder or a paste, more preferably is a powder. When the Composition is liquid, then the Binder is preferably water-borne or solvent-borne, more preferably the Binder is a water reducible Binder, or a latex, or an emulsion. When the Composition is solid, then the Binder is preferably in the form of distinct particles (particulate Binder) or a paste, more preferably is a powder or a paste, more preferably is a powder.

Preferably, the Binder comprises the Polymer in an amount of at least 1 and at most 99,999 pph Binder. Preferably, the Binder comprises the Polymer in an amount of at least 5, more preferably at least 10, even more preferably at least 20, most preferably at least 30, especially at least 40, more especially at least 45, even more especially at least 50, most especially at least 60, for example at least 70, for example at least 75, for example at least 80, for example at least 85, for example at least 90, for example at least 92, for example at least 94, for example at least 96, for example at least 97, for example at least 98, for example at least 99 pph Binder. Preferably the Binder comprises the Polymer in an amount of at most 99, more preferably at most 98, even more preferably at most 97, most preferably at most 96, especially at most 94, more especially at most 92, even more especially at most 90, most especially at most 85, for example at most 80, for example at most 75, for example at most 70, for example at most 60, for example at most 50, for example at most 45, for example at most 40, for example at most 35, for example at most 30, for example at most 20, for example at most 15 pph Binder.

Preferably, the Binder comprises the constituent A in an amount of at least 0.001 and at most 90 pph Binder. Preferably, the Binder comprises the constituent A in an amount of at least 0.05, more preferably at least 1, even more preferably at least 2, most preferably at least 3, especially at least 4, more especially at least 5, even more especially at least 6, most especially at least 7, for example at least 8, for example at least 9, for example at least 10, for example at least 15, for example at least 20, for example at least 22, for example at least 25, for example at least 30, for example at least 35, for example at least 40, for example at least 45 pph Binder. Preferably the Binder comprises the constituent A in an amount of at most 90, more preferably at most 85, even more preferably at most 80, most preferably at most 75, especially at most 70, more especially at most 65, even more especially at most 60, most especially at most 55, for example at most 50, for example at most 45, for example at most 40, for example at most 35, for example at most 30, for example at most 25, for example at most 20, for example at most 15, for example at most 12, for example at most 9, for example at most 10 pph Binder.

Preferably, the Binder comprises an organic metal salt in an amount of at least 0,0005 and at most 5 pph Binder. Preferably, the Binder comprises an organic metal salt in an amount of at least 0.001, and at most 4 pph Binder, more preferably at least 0.002 and at most 3 pph Binder, even more preferably at least 0.003 and at most 2 pph Binder, most preferably at least 0.004 and at most 1 pph Binder, especially at least 0.005 and at most 0.5 pph Binder.

Preferably, the Binder comprises a photoinitiator in an amount of at least 0.001 and at most 15 pph Binder. Preferably, the Binder comprises a photoinitiator in an amount of at least 0.1, and at most 10 pph Binder, more preferably at least 0.5 and at most 5 pph Binder.

Preferably, the Binder comprises a thermal initiator in an amount of least 0.001 and at most 20 pph Binder. Preferably, the Binder comprises a thermal initiator in an amount of at least 0.1, and at most 15 pph Binder, more preferably at least 0.5 and at most 12 pph Binder, even more preferably of at least 1 and at most 10 pph Binder.

Preferably, the Binder comprises a copolymerizable agent in an amount of at least 0.01 and at most 90 pph Binder. Preferably, the Binder comprises a copolymerizable agent in an amount of at least 0.5, more preferably at least 1, even more preferably at least 2, most preferably at least 3, especially at least 4, more especially at least 5, even more especially at least 6, most especially at least 7, for example at least 8, for example at least 9, for example at least 10, for example at least 15, for example at least 20, for example at least 22, for example at least 25, for example at least 30, for example at least 35, for example at least 40, for example at least 45 pph Binder. Preferably the Binder comprises a copolymerizable agent in an amount of at most 90, more preferably at most 85, even more preferably at most 80, most preferably at most 75, especially at most 70, more especially at most 65, even more especially at most 60, most especially at most 55, for example at most 50, for example at most 45, for example at most 40, for example at most 35, for example at most 30, for example at most 25, for example at most 20, for example at most 15, for example at most 10, for example at most 9, for example at most 8 pph Binder.

The Binder maybe liquid or solid. When the Binder is liquid, then the Binder is preferably an emulsion, or an aqueous solution, or an aqueous dispersion, or a solution in an organic solvent, or a dispersion in an organic solvent, or an aqueous solution containing an organic cosolvent, or an aqueous dispersion containing an organic cosolvent. When the Binder is solid, then the Binder is preferably in the form of distinct particles (particulate Binder) or a paste, more preferably is a powder or a paste, more preferably is a powder.

Preferably the Composition comprises the Binder in an amount of at least 1 and at most 100 pph Composition, and wherein the Binder comprises:

a) a Polymer in an amount of at least 1 and at most 99.999 pph Binder, and b) a constituent A in an amount of at least 0.001 and at most 90 pph.

Preferably the Composition comprises the Binder in an amount of at least 1 and at most 100 pph Composition, and wherein the Binder comprises:

a) a Polymer in an amount of at least 1 and at most 99 pph Binder, and b) a copolymerizable agent in an amount of at least 1 and at most 80 pph Binder.

Preferably the Composition comprises the Binder in an amount of at least 1 and at most 100 pph Composition, and wherein the Binder comprises:

a) a Polymer in an amount of at least 1 and at most 99.999 pph Binder, and b) an organic metal salt in an amount of at least 0.001 and at most 5 pph Binder.

Preferably the Composition comprises the Binder in an amount of at least 1 and at most 100 pph Composition, and wherein the Binder comprises:

a) a Polymer in an amount of at least 1 and at most 99.999 pph Binder, and b) a thermal initiator in an amount of at least 0.001 and at most 20 pph Binder.

Preferably the Composition comprises the Binder in an amount of at least 1 and at most 100 pph Composition, and wherein the Binder comprises:

a) a Polymer in an amount of at least 1 and at most 99.999 pph Binder, and b) a photoinitiator in an amount of at least 0.001 and at most 15 pph Binder.

Preferably the Composition comprises the Binder in an amount of at least 1 and at most 100 pph Composition, and wherein the Binder comprises:

a) a Polymer as disclosed in any one of paragraphs 1.79 to 1.82, in an amount of at least 1 and at most 99,999 pph Binder, and b) the constituent A in an amount of at least 0.001 and at most 90 pph.

Preferably the Composition comprises the Binder in an amount of at least 1 and at most 100 pph Composition, and wherein the Binder comprises:

a) a Polymer as disclosed in paragraph 1.83, in an amount of at least 1 and at most 99.999 pph Binder, and b) the constituent A in an amount of at least 0.001 and at most 90 pph.

Preferably the Composition comprises the Binder in an amount of at least 1 and at most 100 pph Composition, and wherein the Binder comprises:

a) a Polymer as disclosed in any one of paragraphs 1.79 to 1.82, in an amount of at least 1 and at most 99.999 pph Binder, and b) an organic metal salt in an amount of at least 0.001 and at most 5 pph Binder.

Preferably the Composition is liquid and comprises the Binder in an amount of at least 1 and at most 100 pph Composition, and wherein the Binder comprises:

a) a Polymer as disclosed in any one of paragraphs 1.79 to 1.82, in an amount of at least 1 and at most 99.999 pph Binder, and b) an organic metal salt in an amount of at least 0.001 and at most 5 pph Binder.

Preferably the water-borne Composition comprises the Binder in an amount of at least 1 and at most 100 pph Composition, and wherein the Binder comprises:

a) a Polymer as disclosed in any one of paragraphs 1.79 to 1.82, in an amount of at least 1 and at most 99.999 pph Binder, and b) an organic metal salt in an amount of at least 0.001 and at most 5 pph Binder.

Preferably the water-reducible Composition comprises the Binder in an amount of at least 1 and at most 100 pph Composition, and wherein the Binder comprises:

a) a Polymer as disclosed in any one of paragraphs 1.79 to 1.82, in an amount of at least 1 and at most 99.999 pph Binder, and b) an organic metal salt in an amount of at least 0.001 and at most 5 pph Binder.

Preferably the Composition is an emulsion and comprises the Binder in an amount of at least 1 and at most 100 pph Composition, and wherein the Binder comprises:

a) a Polymer as disclosed in any one of paragraphs 1.79 to 1.82, in an amount of at least 1 and at most 99.999 pph Binder, and b) an organic metal salt in an amount of at least 0.001 and at most 5 pph Binder.

Preferably the solvent-borne Composition comprises the Binder in an amount of at least 1 and at most 100 pph Composition, and wherein the Binder comprises:

a) a Polymer as disclosed in any one of paragraphs 1.79 to 1.82, in an amount of at least 1 and at most 99.999 pph Binder, and b) an organic metal salt in an amount of at least 0.001 and at most 5 pph Binder.

Preferably the Composition is a powder composition and comprises the Binder in an amount of at least 1 and at most 100 pph Composition, and wherein the Binder comprises:

a) a Polymer as disclosed in paragraph 1.83, in an amount of at least 1 and at most 99 pph Binder, and b) a copolymerizable agent in an amount of at least 1 and at most 80 pph Binder.

Preferably the Composition is a heat-curable powder composition and comprises the Binder in an amount of at least 1 and at most 100 pph Composition, and wherein the Binder comprises:

a) a Polymer as disclosed in paragraph 1.83, in an amount of at least 1 and at most 99 pph Binder, and b) a copolymerizable agent in an amount of at least 1 and at most 80 pph Binder.

Preferably the Composition is a heat-curable powder coating composition and comprises the Binder in an amount of at least 1 and at most 100 pph Composition, and wherein the Binder comprises:

a) a Polymer as disclosed in paragraph 1.83 in an amount of at least 1 and at most 99 pph Binder, and b) a copolymerizable agent in an amount of at least 1 and at most 80 pph Binder.

The Composition may optionally comprise a constituent B.

The constituent B is selected from the group consisting of pigment, dye, additive and mixtures thereof. In general, the amount of constituent B in the Composition may be at least 0.1 and at most 100 pph Binder, preferably at least 0.1 and at most 60 pph Binder.

Pigments are insoluble, fine particle size materials (typical particle ranges from 0.01 to 100 micron) that are mainly used to provide color and reduce cost. In general the amount of pigment in the Composition may be at least 0.1 and at most 100 pph Binder, preferably at least 0.1 and at most 60 pph Binder. Pigments are divided into four broad classes: white, colour, inert, and functional pigments. Exemplary pigments include but are not limited to carbon black, shepard black No. 1, titanium dioxide white, chromium oxide green, zinc oxide, iron oxide yellows, reds, browns and blacks, such as ferrite yellow oxide, ferric oxides, raw sienna and burnt sienna, lead chromate, copper phthalonitrile blue, phthalocyanine blues and greens, ultramarine blue, toluidine red, parachlor red, cadmium reds and yellows, phthaloorganamine blues and greens, iron blues, organic maroons, anatase titanium dioxide, zinc sulfide, and the mixed metal oxide pigments, such as manganese ferrite black, chromium green black hematite, cobalt aluminate blue spinel, copper chromite black spinel, and sodium alumina sulfosilicate, metallics made with aluminum, mica, or brass. Fillers are inert pigments typically used to occupy volume in the coating and reduce the coating's cost. Exemplary fillers include but are not limited to silica, such as fumed silica, glass frit, flour, calcium carbonate, barium sulfate, mica, ammonium chloride, ammonium bromide, boric acid, antimony trioxide, fumed alumina, clays such as kaolin, china clay, talc, lithopone, zinc sulfide, lead titanate, zirconium oxide, white lead, barium oxide, calcium oxide or hydroxide, magnesium oxide or hydroxide, chalk, asbestos, ceramic, hollow glass, resin microspheres, pearl essence, barytes, diatomaceous earth, aluminum trihydrate, onyx flour, calcium silicate, mixed silicates.

Dyes are soluble colored substances used to impart color to a coating. In general, the amount of dyes in the Composition may be at least 0.01 and at most 7 pph Binder, preferably at least 0.1 and at most 5 pph Binder. Exemplary dyes include but are not limited to metal complex dyes, anionic dyes, and azo dyes. Metal complex dyes consist of a metal atom (generally Cr, Cu, Co, Ni) which is coordinated with chelating ligands mainly azo dyes via O and N atoms. Anionic dyes (known also as acid dyes) are azo dyes containing one or more sulphonic groups. Pararosanil, methyl violet, crystal violet, methyl green are typical examples of dyes.

Additives are substances added to a composition in small quantities (typically from 0.1 to 8 pph Binder) in order to impart specific properties to the composition or to the coating produced from the composition. Exemplary additives include but are not limited to gloss control aids, flow aids, thixotropic agents, leveling agents, wetting and dispersing agents, anti-cratering agents, light stabilizers, biocides, surface active additives. Exemplary gloss control agents are polyethylene waxes, oxidized polyethylenes, polyamides. Exemplary flow aids include but are not limited to acrylic or silicone flow aids, which are composed of acrylic or silicone resins, respectively. The acrylic resins are generally liquids which have been converted to powder form by absorption onto silica-type materials. Examples of acrylic flow aids are Resiflow® P67 which is a 2-propenoic acid, ethyl ester polymer BYK® 352 and BYK® 300. Anti-cratering aids can be used in these formulations to reduce or eliminate bubbles or trapped gas from the substrate or coating. Typical anti-cratering agents include, benzoin (2-hydroxy-1,2-diphenylethanone) and its analogs, and plasticizers, such as low molecular weight phenoxies and phthalates.

If the Composition is liquid then it may or may not comprise an organic solvent. Exemplary organic solvents include but are not limited mineral spirits, benzene, xylene, naphtha type solvents, toluene, n-butyl acetate, isobutyl acetate, t-butyl acetate, ethyl acetate, n-propyl acetate, iso-propyl acetate, ethyl acetate, methyl acetate, trimethylpentanediol mono-isobutyrate, ethylene glycol mono-octyl ether, diacetone alcohol, ester alcohols e.g. those available by Eastman under the trade name Texanol™ alcohol ethers, alcohol ether acetates, ethyl diglycol, ethyl glycol acetate, butyl glycol, butyl glycol acetate, butyl diglycol, butyl diglycol acetate, and methoxypropylene glycol acetate, methyl ethyl ketone, acetone, methyl isobutyl ketone, methyl isoamyl ketone, methyl amyl ketone, hydrocarbons e.g. aliphatic hydrocarbons, cycloaliphatic hydrocarbons, aromatic hydrocarbons, some of them available by Shell under the trade name ShellSol® e.g. ShellSol® H, ShellSol® K, AB, ShellSol® T, some others available by Esso under the trade names Solvesso™ and Exxsol™ e.g. Solvesso™ 150, Exxsol™ D30, Exxsol™ D40, Exxsol™ D60, and any combination of any one of the above mentioned in this paragraph. If the Composition comprises an organic solvent, then the preferably the Composition comprises organic solvent in an amount of at most 40, more preferably at most 30, even more preferably at most 20, most preferably at most 10, especially at most 5, more especially at most 2, most especially at most 1 pph Composition.

If the Composition is liquid, then it may or may not comprise an organic cosolvent. If the Composition comprises an organic cosolvent, then the preferably the Composition comprises organic cosolvent in an amount of at most 15 Composition, more preferably at most 10, even more preferably at most 8, most preferably at most 5, especially at most 3, more especially at most 2, most especially at most 1 pph Composition.

Each of the Polymer, the Binder and the Composition is particularly suitable for paints and coatings. Paints include water-borne, solvent-borne and powder paints. Hence, Compositions that are suitable for paints and coatings are herein called coating Compositions. Preferably the Composition is a coating composition, more preferably the Composition is a coating composition selected from the group consisting of water-borne coating composition, solvent-borne coating composition, and powder coating composition.

Preferably the Composition is a water-borne coating composition (or equally water-borne coating Composition). Water-borne coating compositions include: a) water-reducible coating compositions, b) latex coating compositions, and c) emulsions. Thus, the water-borne coating compositions of the invention may be water-reducible coating compositions (also known as aqueous dispersions), latex coating compositions or emulsions. The water-borne coating compositions may comprise organic cosolvent as this and its amount was disclosed above. Z. W. Wicks, Jr., F. N. Jones, S. P. Pappas, in 'Organic Coatings—Science & Technology', J. Wiley & Sons, 1999, $2^{nd}$ edition, Ch. 8, pp. 143-161, Ch. 25, pp. 467-476, explain the terminology used in the art of water-borne coating compositions and provide ways and methods for their preparation and further literature on this matter.

Preferably the Composition is a solvent-borne coating composition, (or equally solvent-borne coating Composition) more preferably the Composition is a high-solids solvent-borne coating composition (or equally high-solids coating Composition). The solvent-borne coating compositions of the invention may comprise organic solvent as this and its amount was disclosed above. Z. W. Wicks, Jr., F. N. Jones, S. P. Pappas, in 'Organic Coatings—Science & Technology', J. Wiley & Sons, 1999, $2^{nd}$ edition, Ch. 24, pp. 453-466, explain the terminology used in the art of solvent-borne coating compositions and provide ways and methods for their preparation and further literature on this matter. Preferably the Composition is a solvent-borne coating composition comprising Preferably, the Composition is a heat-curable powder composition (or equally heat-curable powder Composition). Preferably, the Composition is a 1K heat-curable powder composition (or equally 1K heat-curable powder Composition).

Preferably the Composition is a heat-curable powder coating composition (or equally heat-curable powder coating Composition, or equally HCPCC). Preferably the Composition is a 1K heat-curable powder coating composition (or equally 1K heat-curable powder coating Composition, or equally 1K-HCPCC). A Composition in the form of a powder suitable for being used to powder coat articles is a powder coating composition. Any preferments, combination of preferments disclosed in the entire application as to a heat-curable powder coating Composition apply equally for a heat-curable powder composition, 1K heat-curable powder composition, 1K heat-curable powder coating composition. Z. W. Wicks, Jr., F. N. Jones, S. P. Pappas, in 'Organic Coatings—Science & Technology', John Wiley & Sons, 1999, $2^{nd}$ edition, Ch. 27, pp. 486-507, and T. A. Misev in 'Powder Coatings—Chemistry & Technology', John Wiley & Sons, 1991, Ch. 2-6, pp. 9-360 (especially Ch. 3, pp. 42-173 for heat-curable powder coating compositions) explain the terminology used in the art of powder coating compositions and provide ways and methods for their preparation and further literature on this matter. If the Composition is a powder coating composition, then the Binder and the Polymer must each be solid. Preferably the Binder in a powder coating composition e.g. heat-curable powder coating composition, according to the invention has a $T_g$ of at least 20 and at most 160, more preferably at least 25 and at most 140, most preferably at least 30 and at most 120, especially at least 35 and at most 100, more especially at least 40 and at most 90° C.

Preferably the powder coating Composition comprises the Binder in an amount of at least 1 and at most 100 pph Composition, and wherein the Binder comprises:
 a) the Polymer in an amount of at least 1 and at most 99 pph Binder, and
 b) a copolymerizable agent in an amount of at least 1 and at most 80 pph Binder, and wherein the Binder has a $T_g$ of at least 20 and at most 160° C.

Preferably the powder coating Composition comprises the Binder in an amount of at least 30 and at most 100 pph Composition, and wherein the Binder comprises:
 a) the Polymer in an amount of at least 1 and at most 99 pph Binder, and
 b) a copolymerizable agent in an amount of at least 1 and at most 60 pph Binder, and wherein the Binder has a $T_g$ of at least 20 and at most 160° C.

Preferably the heat-curable powder coating Composition comprises the Binder in an amount of at least 1 and at most 100 pph Composition, and wherein the Binder comprises:
 a) the Polymer in an amount of at least 1 and at most 99 pph Binder, and
 b) a copolymerizable agent in an amount of at least 1 and at most 80 pph Binder, and wherein the Binder has a $T_g$ of at least 25 and at most 90° C.

Preferably the heat-curable powder coating Composition comprises the Binder in an amount of at least 30 and at most 100 pph Composition, and wherein the Binder comprises:
 a) the Polymer in an amount of at least 1 and at most 99 pph Binder, and
 b) a copolymerizable agent in an amount of at least 1 and at most 60 pph Binder, and wherein the Binder has a $T_g$ of at least 30 and at most 90° C.

Preferably the powder coating Composition comprises the Binder in an amount of at least 1 and at most 100 pph Composition, and wherein the Binder comprises:
 a) a Polymer as disclosed in paragraph 1.83, in an amount of at least 1 and at most 99 pph Binder, and
 b) a copolymerizable agent in an amount of at least 1 and at most 80 pph Binder, and wherein the Binder has a $T_g$ of at least 20 and at most 160° C.

Preferably the powder coating Composition comprises the Binder in an amount of at least 30 and at most 100 pph Composition, and wherein the Binder comprises:
 a) a Polymer as disclosed in paragraph 1.83, in an amount of at least 1 and at most 99 pph Binder, and
 b) a copolymerizable agent in an amount of at least 1 and at most 60 pph Binder, and wherein the Binder has a $T_g$ of at least 20 and at most 160° C.

Preferably the heat-curable powder coating Composition comprises the Binder in an amount of at least 1 and at most 100 pph Composition, and wherein the Binder comprises:
 a) a Polymer as disclosed in paragraph 1.83, in an amount of at least 1 and at most 99 pph Binder, and
 b) a copolymerizable agent in an amount of at least 1 and at most 80 pph Binder, and wherein the Binder has a $T_g$ of at least 25 and at most 90° C.

Preferably the heat-curable powder coating Composition comprises the Binder in an amount of at least 30 and at most 100 pph Composition, and wherein the Binder comprises:
 a) a Polymer as disclosed in paragraph 1.83, in an amount of at least 1 and at most 99 pph Binder, and
 b) a copolymerizable agent in an amount of at least 1 and at most 60 pph Binder, and wherein the Binder has a $T_g$ of at least 30 and at most 90° C.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 3 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

4. Other Aspects of the Invention

The invention further relates to methods for coating articles having the Compositions coated thereon, to methods for coating articles having the coating Compositions coated thereon, methods for coating articles having the water-borne Compositions coated thereon, methods for coating articles having the solvent-borne coating Compositions coated thereon, methods for coating articles having the high-solids Compositions coated thereon, and to methods for coating articles having the powder coating Compositions coated thereon. Any one of the coating Compositions mentioned in this paragraph may be applied to an article by any conventional and well-known paint (coating) application methods taking into account their perhaps different physical forms (liquid vs. powder); exemplary paint application methods include but are not limited to brushing, dipping, autodeposition, flow coating, spraying, deposition, electro-deposition, electrostatic spray, rolling, roll-to-roll, web-based coating, curtain coating, slot die coating. Wire-wound rod coating, screen printing, rotary screen coating, flexography, ink-jet printing, sputtering, embossing, in-mould finish, fluidized bed, electrostatic fluidized bed, flame spray. Some of these methods are particularly suited for certain types of coating Compositions mainly depending on the physical form said compositions are available. One skilled in the art knows well what paint application to use for a particular coating Composition. Details as to these methods are also available by A. A. Tracton in 'Coatings Technology Handbook' CRC Taylor & Francis Group, 2005, $3^{rd}$ edition, Ch. II, from 18-1 to 45-1, and also in Z. W. Wicks, Jr., F. N. Jones, S. P. Pappas, in 'Organic Coatings—Science & Technology', John Wiley & Sons, 1999, $2^{nd}$ edition, Ch. 22, pp. 417-432, as well as in the literature cited above and concerned the water-borne, solvent-borne and powder coatings.

Broadly in accordance with the invention there is provided a process for preparing an article having a Composition coated thereon, said process comprising the steps of:
i) providing a Composition and an article; and
ii) depositing the Composition onto the article via any one of the following ways: brushing, dipping, autodeposition, flow coating, spraying, vapour deposition, deposition, electro-deposition, electrostatic spray, rolling, roll-to-roll, web-based coating, curtain coating, slot die coating, wire-wound rod coating, screen printing, rotary screen coating, flexography, ink-jet printing, sputtering, embossing, in-mould coating, fluidized bed, electrostatic fluidized bed, flame spray, to obtain the article having the Composition coated thereon.

The Compositions may be one or multiple of curable, heat-curable, radiation curable, heat/radiation in any combination. Preferably the Compositions are curable. Preferably the Compositions are heat-curable. Preferably the Compositions are radiation curable. Preferably the Compositions are heat/radiation curable. The coating Compositions may be one or multiple of curable, heat-curable, radiation curable, heat/radiation curable in any combination. Preferably the coating Compositions are curable. Preferably the coating Compositions are heat-curable. Preferably the coating Compositions are radiation curable. Preferably the Compositions are heat/radiation curable. The water-borne coating Compositions may be one or multiple of curable, heat-curable and radiation curable, in any combination. Preferably the water-borne coating Compositions are curable. Preferably the water-borne coating Compositions are heat-curable. Preferably the water-borne coating Compositions are radiation curable. Preferably the water-borne coating Compositions are heat/radiation curable. The solvent-borne coating Compositions may be one or multiple of curable, heat-curable and radiation curable, in any combination. Preferably the solvent-borne coating Compositions are curable. Preferably the solvent-borne coating Compositions are heat-curable. Preferably the solvent-borne coating Compositions are radiation curable. Preferably the solvent-borne coating Compositions are heat/radiation curable. The powder coating Compositions may be one or multiple of curable, heat-curable and radiation curable, in any combination. Preferably the powder coating Compositions are curable. Preferably the powder coating Compositions are heat-curable. Preferably the powder coating Compositions are radiation curable. Preferably the powder coating Compositions are heat/radiation curable.

Once the Compositions are cured they may form an object. The object is thus derived upon, and/or obtainable by and/or obtained by, and/or resulting from partial or full curing of a Composition; in other words, a cured Composition is a cross-linked Composition; said curing may be effected with or without the use of one or both of heat and radiation, preferably the curing is effected via heat. The object may have any shape, size or form and said object may for example be a coating. Hence, the invention further relates to cured Compositions, cured coating Compositions, to cured water-borne coating Compositions, to cured solvent-borne coating Compositions, to cured high-solids coating Compositions and to cured powder coating Compositions. Preferably, the invention further relates to cured Compositions, cured coating Compositions, to cured water-borne coating Compositions, to cured solvent-borne coating Compositions, to cured high-solids coating Compositions and to cured powder coating Compositions.

The invention further relates to methods for coating articles having the Compositions coated and cured thereon, to methods for coating articles having the coating Compositions coated and cured thereon, methods for coating articles having the water-borne Compositions coated and cured thereon, methods for coating articles having the solvent-borne coating Compositions coated and cured thereon, methods for coating articles having the high-solids Compositions coated and cured thereon, and to methods for coating articles having the powder coating Compositions coated and cured thereon.

Broadly in accordance with the invention there is provided a process for preparing and having a Composition coated and cured thereon, said process comprising the steps of:

i) providing a Composition and an article; and ii) depositing the Composition onto the article via any one of the following ways: brushing, dipping, autodeposition, flow coating, spraying, vapour deposition, deposition, electro-deposition, electrostatic spray, rolling, roll-to-roll, web-based coating, curtain coating, slot die coating. Wire-wound rod coating, screen printing, rotary screen coating, flexography, ink-jet printing, sputtering, embossing, in-mould finish, fluidized bed, electrostatic fluidized bed, flame spray, to obtain an article having the Composition coated thereon, and iii) curing the Composition at a temperature and for time enough to crosslink the Composition.

Preferably, step iii) is carried out at any temperature ranging from room temperature up $240°$ C., and optionally radiating the Composition, for a time of at least 0.5, more preferably at least 1, even more preferably at least 2, most preferably at least 3 minutes; and/or for a time of at most 100, more preferably at most 80, even more preferably at most 60, most preferably at most 40, especially at most 24, more especially at most 12, most especially at most 6, for example at most 1, for example at most 0.5 hours, for example at most 20 minutes.

The invention further relates to a use of:
i) a polymer as described in the claims and as disclosed herein ('Polymer'), or
ii) a binder as described in the claims and as disclosed herein ('Binder'), or
iii) a composition as described in the claims and as disclosed herein ('Composition'), or
iv) a cured composition as described in the claims and as disclosed herein ('cured Composition'), or
v) an article having a composition as described in the claims and as disclosed herein coated thereon,
vi) an article having a composition as described in the claims and as disclosed herein, coated and cured thereon, in paints (waterborne paints, solventborne paints, powder paints, lacquers, varnishes), polishes, inks, adhesives, pastes, 3D-printing, automotive applications (car parts, agricultural machines, composite structures, ceramic structures, etc.), marine applications (ships, boats), aerospace applications (planes, helicopters, composite structures, ceramic structures, etc.), medical applications (artificial joints, meshes, woven or non-woven sheets, tapes, ribbons, bands, cables, tube-like products for e.g. ligament replacement, composite structures, ceramic structures, etc.), defense applications (ballistic protection, body armour, ballistic vests, ballistic helmets, ballistic vehicle protection, composite structures, ceramic structures, etc.), sports/recreational applications (fencing, skates, skateboarding, snowboarding, suspension lines on sport parachutes, paragliders, kites, kite lines for kite sports, climbing equipment, composite structures, ceramic structures, etc.), architectural applications (windows, doors, (pseudo-)walls, cables, etc.), bottling applications, household applications (household appliances, white goods, furniture, computer housings, etc.), machinery applications (can and bottle handling machine parts, moving parts on weaving machines, bearings, gears, composite structures, ceramic structures, computer housings, etc.), can applications, coil applications, energy applications for e.g. generators for wind, tide or solar energy, textile applications for e.g. fabrics, this can be very broad from impregnation technical textiles to for example complete composites both as coating and as a binder for composites, and electrical applications (cabinets for electrical wire or switch boards).

There is an increasing demand to use raw materials e.g. monomers for polymerization, additives, etc., derived from biorenewable resources (biomass) (referred herein as biorenewable monomers) in order to improve the sustainability of the polymers. In view of concerns about depletion of fossil fuel resources or an increase in carbon dioxide in the atmosphere that poses a global-scale environmental problem in recent years, methods for producing raw materials (e.g. monomers for polymers) from biomass have attracted a lot of attention. Since biomass is renewable and therefore has a carbon-neutral foot-print, such methods are expected to gain in particular importance in future. It is therefore a preferred feature of the present invention and the aspects described herein that where possible the components used herein for preparing the Polymer, the Binder, the Composition, are as far as possible biorenewable.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 4 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Yet, another aspect of the invention is a polymer according to the invention as shown in the Examples.

Yet, another aspect of the invention is a Binder according to the invention as shown in the Examples.

Yet another aspect of the invention is a composition according to the invention as shown in the Examples.

Yet another aspect of the invention is cured composition e.g. a coating according to the invention as shown in the Examples.

Many other variations, preferments and embodiments of the invention will be apparent to those skilled in the art and such variations preferments and embodiments are contemplated within the scope of the claims. All embodiments disclosed and preferments disclosed herein may be combined with each other and/or with preferments of the invention as disclosed herein.

Further aspects of the invention and preferred features thereof are given in the claims herein.

Any and all citations to scientific or patent literature e.g. scientific papers, patents or patent applications mentioned in the description or in the examples, are incorporated herein by reference.

The invention will now be described in detail with reference to the following non-limiting examples which are byway of illustration only.

EXAMPLES

Chemicals & Raw Materials

Toluene, tetrahydrofuran (THF), dichloromethane ($CH_2Cl_2$) and diethyl ether were purchased from Biosolve and purified using an activated alumina purification system. Bis(triphenylphosphoranylidene)ammonium chloride (PPNCI) (assay 97%; m.p. 270-272° C.) was supplied by Aldrich and it was used as supplied. Carbon dioxide 5.3 ($CO_2$) with purity 99,9993 vol % was supplied by Linde. 4-vinylcyclohexene oxide (97%), cyclohexene oxide (98%), R-limonene oxide (98%, mixture of cis and trans), S-limonene oxide (99%, mixture of cis and trans) were supplied by Aldrich and were distilled over calcium hydride ($CaH_2$) and stored under nitrogen prior to use. R-limonene dioxide (98%, mixture of cis and trans) was supplied by Nitrochemie Aschau GmbH) and it was distilled over $CaH_2$ and stored under nitrogen. prior to use. AmberliteIR-120 (a cation exchange resin comprising a sulphonic acid) was supplied by Aldrich and used as is. Borchi® Oxy Coat (supplied by OMG Borchers) is an organic metal salt (1% w/w solution in propane diol) wherein the metal of the metal cation of the organic metal salt is Fe (Borchi® Oxy Coat contains 800-1000 ppm of Fe). Any other chemicals mentioned in the Examples and not explicitly mentioned in this paragraph, were supplied by Aldrich and they were used as supplied. All reactions involving air- or water-sensitive compounds were carried out under dry nitrogen using MBraun glove boxes or using standard Schlenk line techniques.

Experimental Methods & Techniques

The acid value (AV) was measured titrimetrically according to ISO 2114. The AV is given as the mass of potassium hydroxide (KOH) in milligrams that is required to neutralize one gram of the tested substance and is used as a measure of the concentration of carboxyl groups present.

The hydroxyl value (OHV) was measured titrimetrically according to ISO 4629. The OHV is given as the mass of potassium hydroxide (KOH) in milligrams that is required to neutralize one gram of the tested substance and is used as a measure of the concentration of hydroxyl groups present.

The oil length was calculated according to the equation shown in the section Definitions (see definition for the term 'oil length').

The glass transition temperature ($T_g$) of a Polymer and the m.p. (melting point) were measured by Differential Scanning Calorimetry (DSC) at a heating rate of 5° C./min in $N_2$ atmosphere at a flow rate of 50 mL/minute, on a a TA instruments DSC Q2000 apparatus according to the following method: a sample of 10±0.5 mg was weight and placed in the DSC cell at a temperature between 20 and 25° C. The sample was cooled down to −50° C. and the temperature was kept at −50° C. for time enough for the sample to reach equilibrium; upon equilibration the sample was heated up from −50° C. up to 160° C. at a heating rate of 5° C./minute (thermograph A); the sample was kept at that temperature for 2 minutes and it was subsequently cooled down to −50° C. at a cooling rate of 20° C./min; once the sample reached −50° C. the temperature was maintained for 5 minutes; subsequently, the sample was heated up from −50° C. up to 220° C. at a heating rate of 5° C./minute (thermograph B). The $T_g$ was measured from this last thermograph (thermograph B) as the inflection point of the DSC signal (DSC thermograph, Heat Flow vs. Temperature). The m.p. was measured from the thermograph A. The processing of the DSC signal and the determination of the m.p. and $T_g$ were carried out using Universal Analysis 2000 software version 4.5a provided by TA instruments.

The glass transition temperature ($T_g$) of the Binder is measured by Differential Scanning Calorimetry (DSC) at a heating rate of 5° C./min in $N_2$ atmosphere at a flow rate of 50 mL/minute, on a a TA instruments DSC Q2000 apparatus according to the following method: a sample of 10±0.5 mg is weight and placed in the DSC cell at a temperature between 20 and 25° C. The sample is cooled down to −50° C. and the temperature is kept at −50° C. for time enough for the sample to reach equilibrium; upon equilibration the sample is heated up from −50° C. up to 220° C. at a heating rate of 5° C./minute (thermograph A). The $T_g$ was measured from this last thermograph (thermograph A) as the inflection point of the DSC signal (DSC thermograph, Heat Flow vs. Temperature) The processing of the DSC signal and the determination of the $T_g$ was carried out using Universal Analysis 2000 software version 4.5a provided by TA instruments.

The number average molecular weight ($M_n$) and the weight average molecular weight ($M_w$) were measured via Gel Permeation Chromatography (GPC) calibrated with a set of polystyrene standards with a molecular weight range of from 500 up to $7 \times 10^6$ g/mol and using as eluent stabilized tetrahydrofuran (THF) modified with 0.8% acetic acid at a flow rate of 1 mL/min at 40° C. The GPC measurements were carried out on a Waters Alliance system equipped with: i) an Waters Alliance 2414 refractive index detector at 40° C., and ii) a Waters Alliance 2695 separation module equipped with two consecutive PL-gel columns of Mixed-C type with l/d=300/7.5 mm and filled with particles having a particle size of 10 μm (supplied by the Polymer Laboratories).

The polydispersity (D) was calculated according to the following equation: $D = M/M_n$.

$^1$H-NMR or $^{13}$C-NMR or $^{31}$P-NMR spectroscopy or combinations thereof were used to characterize chemical entities shown herein. $^1$H-NMR spectra were recorded on a Varian Mercury Vx (400 MHz) spectrometer or on a Bruker Advance (400 MHz) spectrometer at 25° C. in chloroform-d1 unless stated otherwise and referenced versus residual solvent shifts. $^{13}$C-NMR spectra were recorded on a Varian Mercury Vx (100 MHz) spectrometer or on a Bruker Advance (100 MHz) spectrometer at 25° C. in chloroform-d1 unless stated otherwise and referenced versus residual solvent shifts. $^{31}$P-NMR spectra were recorded on a Varian Mercury Vx (162 MHz) spectrometer or on a Bruker Advance (162 MHz) spectrometer at 25° C. in chloroform-d1: pyridine (70:30 v/v) and referenced versus residual solvent shifts (the $^{31}$P-NMR method according to P. Dais and A. Spyros described in Magnetic Resonance in Chemistry 2007; 45:367, may be used).

MALDI-ToF-MS analyses were performed on a Voyager DE-STR from Applied Biosystems equipped with a 337 nm nitrogen laser. An accelerating voltage of 25 kV was applied. Mass spectra of 1000 shots were accumulated. The polymer samples were dissolved in THF at a concentration of 1 mg/mL. The cationization agent used was potassium trifluoroacetate (Fluka, >99%) dissolved in THF at a concentration of 5 mg/mL. The matrix trans-2-[3-(4-tertbutylphenyl)-2-methyl-2-propenylidene]malononitrile (DCTB) (Fluka) was dissolved in THF at a concentration of 40 mg/mL. Solutions of matrix, salt, and polymer were mixed in a volume ratio of 4:1:4, respectively. The mixed solution was hand-spotted on a stainless steel MALDI target and left to dry. The spectra were recorded in the reflection mode. All MALDI-ToF-MS spectra were recorded from the crude products. In-house developed software was used to characterize the polymers in detail and allowed us to elucidate the individual chain structures and also the end groups of the polymer chains.

The Koenig hardness (reported in seconds) of the coatings was measured according to DIN 53157 using an Erichsen hardness equipment within 2 hours from the lapse of 168 hours from their application. The higher the number of seconds, the higher the Koenig hardness. Coatings scoring high in time units (seconds) since such scores correspond to high(er) Koenig hardness.

The surface drying rate of the coatings was assessed according to the 'cotton wool' method and the measurement of the dust-free time (DFT) as described below:
 a) initially a composition was applied on a glass plate using a coating applicator having a 100 μm slit to afford an uncured ('wet') film, and once said film was deposited onto the glass plate, a timer was set off (note: during the execution of this test (drying) the film undergoes gradual curing).
 b) subsequently, a swatch of cotton wool (a loose ball of cotton wool of approximately 0.2 g and a diameter of approximately 3 cm) was left to drop onto the film from a height of 5 cm. After 10 seconds from the time the cotton wool ball reached the film, the glass panel was turned upside-down (180° flip over).

Step b) was repeated for as long as the swatch of cotton wool once having fallen from the film surface there were no cotton fibers left onto the film surface. Once after a repetition of step b) the swatch of cotton wool left the film surface without leaving any cotton fibers onto the film surface, the timer was stopped ($t_{end}$). The time elapsed ($t_{end}$) between the time the coating was applied onto the glass plate and the point in time that upon a repetition of step b) the swatch of cotton wool left the film surface without leaving any cotton fibers stuck onto the film surface, is reported as the DFT in time units (seconds or hours). The lower the DFT, the shorter the time required for a film to dry. Films that dry at short(er) times are desirable.

The coating (film) thickness of the cured coatings was measured with a PosiTector 6000 coating thickness gauge from DeFelsko Corporation according to EN ISO 2808: 2007.

The chemical resistance (CR) of the coatings was assessed via methyl ethyl ketone (MEK) double rubs (MDR). The apparatus used is a DJH Designs MEK rub test machine and Greenson 4x4 pads. The coated ALQ-46 panel which was subjected to the test was at least 13x3 cm and it was affixed onto the machine with the help of tape or clamps. One double rub is one cycle. With one MEK double rub (MDR) is meant one continuous backward and forward movement over a length of about 12 cm, in a cycle time of about one second, over the surface of a coating having a thickness of 30±2 microns using the pad drenched in MEK, which pad covered a hammer head having a weight of about 2 Kgr. Every 10 rubs the cloth was drenched in MEK. During the testing, the pad was been wetted automatically with approximately 2 mL of MEK each time. The measurement was carried out at room temperature, and it was performed on coatings that were left at room temperature for 168 hours before been tested, and within 2 h from the lapse of the time period of 168 hours; the measurement was continued either until the coating was removed and the number of MDR at which the coating was removed was reported, or until 500 MDR were reached. For example, a result reported as 35 MDR indicates that there was no coating left after 35 MDR.

The water resistance (WR) of the coatings was assessed on coatings that were left at room temperature for 168 hours before been tested and within 2 h from the lapse of the time period of 168 hours; the measurement was carried out at room temperature and it was performed as follows: three droplets of demineralized water of a diameter of about 10 mm were placed on the coating with a pipette, making sure that the distance from the edge of the coating was at least 10 mm and at the same time each droplet was at least 10 mm away from each of the other droplets. The water droplets remained on the coating for 3 hours. Upon the lapse of the 3 hours, the water droplets were carefully removed from the coating with a paper tissue. Then, after 24 hours from when the water droplets were removed the damage (or lack of it) of the coating was visually inspected and recorded on a scale 0-5 (5=best) as follows:

1: very poor water resistance: the coating area that came in contact with the water was completely or to a great extent removed;

2: poor water resistance: the coating area that came in contact with the water droplets blistered;

3: mediocre water resistance: the coating area that came in contact with the water droplets turned matt (initial gloss was reduced);

4: good water resistance: only a circular footprint (corresponding to the periphery of the water droplets) was spotted on the coating area that came in contact the water droplets;

5: excellent water resistance: no visible damage of the coating area that came in contact with the water was spotted.

By the term 'Molar Ratio Q' (abbreviated as MRQ and referring to a polymer comprising units selected from the group consisting of S1, S2, S3, S4, and combinations thereof, as each of S1, S2, S3 and S4 is disclosed herein) is meant herein:

$$MRQ = \frac{S_{total}}{S_{specific}} = \frac{S_{specific} + S_{rest}}{S_{specific}}$$

wherein
$S_{total} = S_{specific} + S_{rest}$, and
$S_{specific}$ = (total moles S1) + (total moles S2), and
$S_{rest}$ = the total moles of all the units of a polymer wherein said units are not any one of S1, S2.
The MRQ is by definition equal to or higher than 1.
The MRQ can be determined by a combination of well-known analytical techniques and a methodology such as those described just below.

At first, one may determine the composition of the polymer via high resolution NMR spectroscopy e.g. $^1$H-NMR (400 MHz), $^{13}$C-NMR (≥100 MHz), $^{31}$P-NMR (≥162 MHz) [after phosphorylation reaction of the hydroxyl and carboxylic acid groups with 2-chloro-4,4,5,5-tetramethyldioxaphospholane (1) and the related derivative product (II); see method as reported by P. Dais and A. Spyros in Magnetic Resonance in Chemistry 2007, 45:367], or combinations thereof may be used; this is to say that the kind of constitutional units that make up the polymer e.g. monomer residues, or groups of atoms that form distinct residues, and their corresponding amounts are determined. Various well-known 2D NMR techniques such as COSY (homonuclear correlation spectroscopy), HSQC (heteronuclear single-quantum correlation spectroscopy) and HMBC (heteronuclear multiple-bond correlation spectroscopy) may be applied.

Subsequently, and having determined the polymer composition as described above, one may determine:
i) the total mol of ester groups ( . . . —O—C(=O)— . . . ) and carbonate groups ( . . . —O—C(=O)—O— . . . ) originating from the units S1, S2 and
ii) the total mol of any other repeating unit from sequences of monomer residues or group of atoms that form distinct residues, wherein each of said units is different than those of S1, S2.

The determination of i) can be carried out by $^{13}$C-NMR spectroscopy assisted by the co-employment of $^1$H-NMR and $^{31}$P-NMR spectroscopies, focusing on:
ia) for m=0: all the carbon atoms present in S1, S2; for m=1 all the carbon atoms in S1, S2, excluding those of Y apart from the carbon atom in Y that is connected directly to the ester group of S1, Z2, Z4.

If a carbon atom is a tertiary carbon atom, then only $^{13}$C-NMR; if a carbon atom is primary or secondary $^1$H-NMR may be also applied and assist the analysis from the $^{13}$C-NMR spectroscopy. Typically, $^{31}$P-NMR is used to determine the type of present carboxylic acid and hydroxyl groups present in these units. Various well-known 2D (see above) and/or 3D NMR techniques (e.g. experiments consisting of '2D experiments after another', the triple resonance experiments, etc.) may be used alone or in combination. Upon the completion of this part of the analysis, one is able to determine the total mol of S1, S2 units, and thus the $S_{specific}$.

The determination of ii) can be carried out by $^{13}$C-NMR spectroscopy assisted by the co-employment of $^1$H-NMR and $^{31}$P-NMR spectroscopies, focusing on the carbon atoms present in the sequences of monomer residues or group of atoms that that form distinct residues, and especially to the carbon atoms which are immediately next to the bonds connecting the various units together.

If a carbon atom is a tertiary carbon atom, then only $^{13}$C-NMR; if a carbon atom is primary or secondary $^1$H-NMR may be also applied and assist the analysis from the $^{13}$C-NMR spectroscopy. Typically, $^{31}$P-NMR is used to determine the type of present carboxylic acid and hydroxyl groups present in these units. Various well-known 2D (see above) and/or 3D NMR techniques (e.g. experiments consisting of '2D experiments after another', the triple resonance experiments, etc.) may be used alone or in combination. Upon the completion of this part of the analysis, one is able to determine the total mol of any unit other than S1, S2 units, and thus the $S_{rest}$.

Subsequently, given the values for the $S_{specific}$ and $S_{rest}$, one is able to calculate the MRQ by factoring in the equation concerning the MRQ (see above in this paragraph) the values for the $S_{specific}$ and $S_{rest}$.

1. Examples of Catalysts

Three catalysts were synthesized and characterized in Examples A to C. The synthesis of catalyst (Et-BDI)Zn[N(SiMe$_3$)$_2$] [Et-BDI=2-((2,6-diethylphenyl)amido)-4-((2,6-diethylphenyl)imino)-2-pentene)] is reported in Example A. The synthesis of catalyst N,N'-bis(3,5-di-tert-butylsalicylidene)-1,2-phenylenediimine chromium(II) chloride is reported in Example B. The synthesis of catalyst aminotriphenolate Al$^{III}$-complex is reported in Example C. These catalysts were used to prepare some of the polymers shown below.

1.1 1.1 Example A: Synthesis of (Et-BDI)Zn[N(SiMe$_3$)$_2$]

The synthesis of Et-BDI)Zn[N(SiMe$_3$)$_2$ was carried out in three stages as described below.

Stage 1: Synthesis of zinc bis[bis(trimethylsilyl)amide]

This synthesis was carried out according to Darensbourg D J, Holtcamp M W, Struck G E, Zimmer M S, Niezgoda S A, Rainey P, et al. Catalytic activity of a series of Zn(II) phenoxides for the copolymerization of epoxides and carbon dioxide, J. Am. Chem. Soc. 1998, 121(1), 107-116. More specifically, in a drybox, anhydrous zinc chloride (5.0 g, 36.7 mmol) was placed in a 100-mL Schlenk flask along with approximately 2 equivalents of $NaN(SiMe_3)_2$ (12.1 g, 66.1 mmol). The flask was removed from the dry box and placed under a positive pressure of argon. Diethyl ether (60-70 mL) was added to the flask, and the reaction mixture was stirred for 1 hour under argon. This reaction was exothermic, generating enough heat to boil the ether. Hence, the reaction flask was connected to a water-cooled condenser which is vented. Upon cooling of the mixture to ambient temperature, NaCl precipitated out and was removed by filtration through a glass frit under an inert atmosphere. The solid collected was washed with two portions of ether (5 mL), and the combined ether filtrate was evacuated at reduced pressure to provide a clear, colorless oil of $Zn[N(SiMe_3)_2]_2$. The product was purified by vacuum distillation (2-3 mmHg) in a short-path apparatus at 103° C.; 9.4 g of product was collected (74% yield) and shown to be pure by $^1H$-NMR (singlet at 0.5 ppm).

Stage 2: Synthesis of Et-BDI

This synthesis was carried out according to Jerald Feldman, Stephan J. McLain, Anju Parthasarathy, William J. Marshall, Joseph C. Calabrese, and Samuel D. Arthur; Electrophilic Metal Precursors and a β-Diimine Ligand for Nickel(II)- and Palladium(II)-Catalyzed Ethylene Polymerization; Organometallics 1997 16 (8), 1514-1516). More specifically, concentrated HCl (0.40 mL; 4.8 mmol) was added to a solution of 2,4-pentanedione (0.50 mL 4.9 mmol) and 2,6-diisopropylaniline (1.96 g; 11.0 mmol) in ethanol (20 mL). The reaction mixture was heated at reflux for 3 days and then concentrated to a brown residue. The crude product was extracted with 10 mL of methylene chloride. After stirring with 20 mL saturated sodium carbonate, compound 3 was extracted into methylene chloride. Evaporation of solvent and recrystallization from methanol afforded the product as a white crystalline solid (1.50 g, 73%). m.p.: 140-141° C.; $^1H$-NMR ($CDCl_3$, 25° C.) δ 12.12 (br, 1H, NH), 7.12 (m, 6H, $H_{aryl}$), 4.84 (s, 1H, $H_β$), 3.10 (mult, 4H, $CHMe_2$), 1.72 (s, 6H, α-Me), 1.22 (d, 12H, CHMeMe'), 1.12 (d, 12H, CHMeMe'); $^{13}C$-NMR ($CDCl_3$, 25° C.) δ 161.4 ($C_α$), 142.6, 140.9 ($C_o$), 125.3 ($C_p$), 123.2 ($C_m$), 93.4 ($C_β$), 28.4 ($CHMe_2$), 24.5 (CHMeMe'), 23.4 (CHMeMe'), 21.0 (α-Me); MS: m/z=418.333 (calc. 418.335).

Stage 3: Synthesis of $(Et-BDI)Zn[N(SiMe_3)_2]$

A solution of Et-BDI (0,369 g, 1.02 mmol) in toluene (5 mL) was added to zinc bis(trimethylsilyl)amide (0.42 mL, 1.0 mmol) in toluene (5 mL) at room temperature. After being stirred for 20 hours at 80° C., the clear, yellow solution was dried in vacuum, to afford the $(Et-BDI)Zn[N(SiMe_3)_2]$ in quantitative yield (0,593 g). $^1H$-NMR (CeDe, 400 MHz): δ 7.11 (6H, b, ArH), 4.87 (1H, s, β-CH), 2.73 (4H, m, J=7.5 Hz, $CH_2CH_3$), 2.60 (4H, m, J=7.5 Hz, $CH_2CH_3$), 1.58 (6H, s, α-Me), 1.21 (12H, t, J=7.5 Hz, $CH_2CH_3$), −0.03 (18H, s, $CH_3$). $^{13}C$ NMR (CeDe, 100 MHz): δ 169.21, 145.86, 136.99, 125.99, 125.85, 95.62, 24.79, 23.43, 13.59, 5.17.

1.2 Example B: Synthesis of N,N'-Bis(3,5-Di-Tert-Butylsalicylidene)-1,2-Phenylenediimine Chromium (III) Chloride This synthesis was carried out according to D. J. Darensbourg, R. M. Mackiewicz, J. L. Rodgers, C. C. Fang, D. R. Billodeaux, and J. H. Reibenspies Inorg. Chem. 2004, 43, 6024-6034. More specifically, N,N'-bis(3,5-di-tert-butylsalicylidene)-1,2-phenylenediimine (6.22 g, 11.50 mmol) and chromium(II) chloride (1.48 g, 12.05 mmol) were dissolved in THF (100 mL). After stirring under argon at ambient temperature for 24 h, the reaction mixture then was stirred under for 24 h more and poured into into methyl tert-butyl ether (200 mL). The organic layer was then washed with aqueous saturated $NH_4Cl$ (300 mL) and brine (300 mL) and dried with $Na_2SO_4$. The solids were then separated from the mother liquor by filtration. The volatiles were removed in vacuum, affording a dark brown powder (6.84 g, 95%)

1.3 Example C: Synthesis of amino-triphenolate $Al^{III}$-Complex

The synthesis of the amino-triphenolate $Al^{III}$-complex was carried out in three stages as described below.

Stage 1: Synthesis of Ligand ($H_3L$): tris(2-hydroxy-4,6-dimethylbenzyl)amine

This synthesis was carried out according to A. Chandrasekaran, Roberta O. Day, and Robert R. Holmes. A New Class of Silatranes: Structure and Dynamic NMR Behavior. JACS, 2000, 122(6), 1066-1072. More specifically, a mixture of hexamethylenetetramine (3.80 g, 27.1 mmol), 2,4-dimethylphenol (15.0 mL, 124 mmol) and p-toluenesulfonic acid hydrate (0.10 g) was stirred and heated with an oil bath at 110° C. for 20 h. Then an additional quantity of 2,4-dimethylphenol (5.00 mL, 41.4 mmol) was added and heated for a further period of 20 h. The resultant solid was crystallized from acetone (100 mL) which gave 15.2 g of product. An additional 1.6 g was obtained from a solution of 2-propanol. The crystals are deep yellow. In powder form, they are white; m.p. 186-188° C. (yield 16.8 g, 73%). $^1H$ NMR 2.19 (s, 18H, aryl-Me), 3.61 (s, 6H, $NCH_2$), 6.72 (s, 3H, aryl), 6.84 (s, 3H, aryl).

Stage 2: Synthesis of the amino-triphenolate $Al^{III}$-complex

This synthesis was carried out according to Christopher J. Whiteoak, Nicola Kielland, Victor Laserna, Eduardo C. Escudero-Adan, Eddy Martin and Arjan W. Kleij. A Powerful Aluminum Catalyst for the Synthesis of Highly Functional Organic Carbonates, JACS, 2013, 135(4), 1228-1231. More specifically, to a solution of $H_3L$ (1.47 mmol) in tetrahydrofuran (20 mL) was slowly added $AlMe_3$ (2M in heptane, 735 µL, 1.47 mmol). The solution was stirred at room temperature for a further 2 hours and then concentrated. Hexane was added to the concentrate resulting in precipitation of the complex which was isolated by filtration and further dried under vacuum to yield the amino-triphenolate $Al^{III}$-complex as a white powder. $^1HNMR$ (400 MHz, 298 K, $CDCl_3$): b=6.90 (d, 3H, ArH), 6.63 (d, 3H, ArH), 4.59 (br, 4H, THF), 4.28 (br d, 3H, $ArCH_2N$), 2.86 (br, 3H, $ArCH_2N$), 2.22 (s, 9H, $ArCH_3$), 2.21 (s, 9H, $ArCH_3$), 2.18 ppm (br, 4H, THF); $^{13}C\{^1H\}$ NMR (125 MHz, 298 K, $CDCl_3$): δ=154.29, 131.02, 126.97, 126.89, 125.83, 120.63 (all aromatic C), 71.31 (THF), 58.67 ($ArCH_2N$), 25.60 (THF), 20.40 ($ArCH_3$), 16.98 ppm ($ArCH_3$). The amino-triphenolate $Al^{III}$-complex is represented by the following formula:

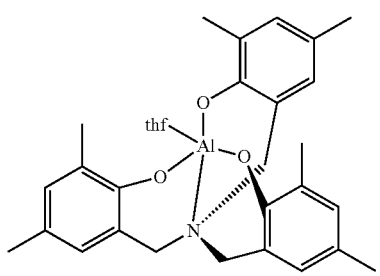

In some of the Examples the amino-triphenolate $Al^{III}$-complex was used together with PPNCI (the latter was used as a co-catalyst), which is represented by the following formula:

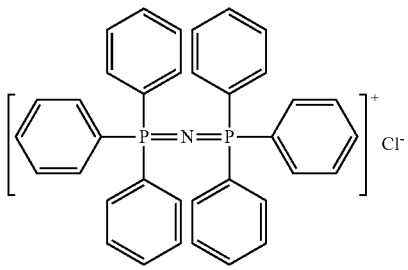

Where PPNCI was used together with the amino-triphenolate $Al^{III}$-complex (catalyst of Example C) in the examples, this is explicitly mentioned in those relevant examples.

2. Example of Polymers-2.2a, and Examples of Polymers

2.0 Example A: Preparation of a Polymer-2.2a

The polymerization was performed at 25° C. in bulk. The catalyst of Example A (10 μmol) was dissolved in R-limonene dioxide (25 mmol) and the solution was transferred into a 200 mL high pressure reactor. The reactor was sealed, pressurized with 4.0 MPa $CO_2$ and allowed to react for 5 hours. The final R-limonene dioxide conversion was determined by $^1$H-NMR to be 20%. The reaction mixture was dissolved in a proper amount of dichloromethane and precipitated with a large excess of methanol. The polymer was washed with methanol to remove the catalyst and any unreacted monomers and dried in vacuum. This polymer (that is a type of polymer-2.2a) is referred as 'P2.2a-1' in the Examples 1 to 5 that follow below. The analyses were performed on crude samples.

$^1$H-NMR (CDCl$_3$, 400 MHz): δ 5.05 (br s, 1H), 2.59 (br d, 1H), 2.55 (s, 1H), 2.41 (br s, 1H), 2.10-1.31 (m, 5H), 1.70 (br s, 3H), 1.50 (br s, 3H).

$M_n$=11.4×10$^3$ Da; D=1.3; $T_g$=135° C.

2.0.1 Example B: Preparation of a Polymer-2.2a

The polymerization was performed at 25° C. in bulk. 1.18 g of the catalyst of Example A (2 mmol) was dissolved in 100.9 g R-limonene dioxide (600 mmol) and the solution was transferred into a 250 mL stainless steel Büchi reactor and flushed 5 times with $CO_2$ (0.5 MPa). The reactor was sealed, pressurized with 1.0 MPa $CO_2$ and allowed to react for 12 hours. The final R-limonene dioxide conversion was determined by $^1$H-NMR to be 36%. The reaction mixture was dissolved in a proper amount of dichloromethane and precipitated with a large excess of methanol. The polymer was washed with methanol to remove the catalyst and any unreacted monomers and dried in vacuum. This polymer (that is a type of polymer-2.2a) is referred as 'P2.2a-2' in the Examples 7 and 8 that follow below. The analyses were performed on crude samples.

$M_n$=20×10$^3$ Da; D=1.2; $T_g$=135° C.

2.1 Example 1: Preparation of a Polymer of § 1.1 Consisting of i) One S1 Unit Wherein m=0, n>1, A is $CH_3$, X is X5 Wherein $R_9'$ is $CH_3$, and $R_{10}'$ is $CH_2(CH_2)_{10}CH_3$, and ii) One S1 Unit Wherein m=0, n>1, A is $CH_3$, X is X6 Wherein $R_{11}'$ is $CH_3$, and $R_{12}'$ is $CH_2(CH_2)_{10}CH_3$

PEX1

0.1 mL of aqueous LiOH solution (2,359 mmol LiOH in 10 mL water) was added to a solution of P2.2a-1 (100 mg, 0,472 mmol of oxirane groups) and 1-dodecanethiol (105 mg, 0,520 mmol) in THF (2.00 mL) at 0° C. The cooling was then removed and the reaction mixture was stirred at room temperature for 16 hours. After this time, the reaction mixture was diluted with dichloromethane and precipitated into methanol/water (v/v: 90/10) to give 189 mg of polymer. $^1$H-NMR (δ, ppm, 400 MHz, CDCl$_3$): 5.05 (br s, 1H), 2.69 (br m, 1H), 2.60 (br m, 1H), 2.51 (br m, 1H), 2.39 (br s, 1H), 2.1-1.9 (m, 1H), 1.9-1.5 (m 7H), 1.47 (br s, 3H), 1.4-1.2 (m 21H), 1.11 (br s, 3H), 0.87 (t, 3H)) (MRQ=1).

2.2 Example 2: Preparation of a Polymer of § 1.1 Consisting of i) One S1 Unit Wherein m=0, n>1, A is $CH_3$, X is X5 Wherein $R_9'$ is $CH_3$, and $R_{10}'$ is $CH_2CH_2OH$, and ii) One S1 Unit Wherein m=0, n>1, A is $CH_3$, X is X6 Wherein $R_{11}'$ is $CH_3$, and $R_{12}'$ is $CH_2CH_2OH$

PEX2

0.1 mL of aqueous LiOH solution (2,359 mmol LiOH in 10 mL water) was added to a solution of P2.2a-1 (100 mg, 0,472 mmol of oxirane groups) and 2-mercaptoethanol (41 mg, 0,520 mmol) in THF (2.00 mL) at 0° C. The cooling was then removed and the reaction mixture was stirred at room temperature for 16 hours. After this time, the reaction mixture was diluted with dichloromethane and precipitated into diethyl ether to give 125 mg of polymer. $^1$H-NMR (δ, ppm, 400 MHz, MeOD): 5.05 (d, 1H), 3.68 (br t, 2H), 2.69 (br m, 4H), 2.32 (br s, 1H), 2.15-1.95 (m, 1H), 1.95-1.5 (m, 5H), 1.50 (br s, 3H), 1.4-1.2 (br s, 1H), 1.16 (d, 3H)) (MRQ=1).

2.3 Example 3: Preparation of a Polymer of § 1.1 Consisting of i) One S1 Unit Wherein m=0, n>1, A is $CH_3$, X is X10 Wherein $R_{15}'$ is $CH_3$, and $R_{14}'$ is $CH_2(CH_2)_3CH_3$, and ii) One S1 Unit Wherein m=0, n>1, A is $CH_3$, X is X11 Wherein $R_{17}'$ is $CH_3$, $R_{16}'$ is $CH_2(CH_2)_3CH_3$

PEX5

P2.2a-1 (300 mg, 1,415 mmol of oxirane groups), hexanoic acid (181 mg, 1,557 mmol) and tetrabutylphosphonium bromide (4.6 mg, 0,014 mmol) were dissolved in 2 mL xylene and heated with stirring overnight at 120° C. under a nitrogen atmosphere. The reaction mixture was diluted with dichloromethane and precipitated into methanol. The raw product was dissolved in dichloromethane again and precipitated in methanol to give 403 mg of polymer. $^1$H-NMR (δ, ppm, 400 MHz, $CDCl_3$): 5.04 (m, 1H), 3.95 (br d, 1.6H), 2.65-2.50 (br m, 0.3H), 2.36 (br m, 2H), 2.32 (br s, 1H), 2.05-1.55 (m, 6H), 1.47 (br s, 4H), 1.40-1.15 (br m, 6H), 1.12 (br m, 3H), 0.88 (br t, 3H)) (MRQ=1).

2.4 Example 4: Preparation of a Polymer of § 1.1 Consisting of i) One S1 Unit Wherein m=0, n>1, A is $CH_3$, X is X10 Wherein $R_{15}'$ is $CH_3$, and $R_{14}'$ is $CH=CH_2$, and ii) One S1 Unit Wherein m=0, n>1, A is $CH_3$, X is X11 Wherein $R_{17}'$ is $CH_3$ $R_{16}'$ is $CH=CH_2$

PEX4

P2.2a-1 (300 mg, 1,415 mmol of oxirane groups), acrylic acid (216 mg, 3 mmol), hydroquinone (5 mg) and tetrabutylphosphonium bromide (4.6 mg, 0,014 mmol) were dissolved in 2 mL xylene and heated with stirring overnight at 120° C. under a nitrogen atmosphere. The reaction mixture was diluted with dichloromethane and precipitated into methanol. The raw product was dissolved in dichloromethane again and precipitated in methanol to give 403 mg of polymer. $^1$H-NMR (δ, ppm, 400 MHz, $CDCl_3$): 6.43 (m, 1H), 6.14 (m, 1H), 5.88 (m, 1H), 5.05 (br m, 1H), 4.46 (m, 1H), 4.07 (br m, 2H), 2.83-2.65 (m, 1H), 2.60-2.50 (m, 2H), 2.40 (br s, 1H), 2.05-1.85 (m, 2H), 1.78-1.60 (br m, 3H), 1.49 (br s, 4H), 1.40-1.10 (m, 4H)) (MRQ=1).

2.5 Example 5: Preparation of a Polymer of § 1.1 Consisting of One S1 Unit Wherein m=0, n>1, a is $CH_3$, X is X7 and $R_{13}'$ is $CH_3$ (PEX7)

P2.2a-1 (300 mg, 1,415 mmol of oxirane groups) and lithium bromide (3.7 mg, 0,043 mmol) were dissolved in 1 mL dimethylformamide and transferred into a 5 mL glass insert placed in the high pressure reactor. The reactor was sealed, pressurized to 4 MPa with $CO_2$ and allowed to react for the desired time (the conversion of the oxirane groups conversion may be measured by $^1$H-NMR). The reaction mixture was dissolved in a small amount of THF and precipitated with a large excess of $H_2O$/methanol (v/v: 50/50). The polymer was washed with water and dried in vacuum. $^1$H-NMR (δ, ppm, 400 MHz, $CDCl_3$): 5.07 (m, 1H), 4.30 (m, 1H), 4.09 (m, 1H), 2.35 (br m, 1H), 2.05-1.85 (br m, 2H), 1.80-1.60 (m, 4H), 1.35-1.05 (br m, 2H)) (MRQ=1).

2.6 Example 6: Preparation of a Polymer of § 1.5 Consisting of

I) One S1 Unit Wherein m=0, n>1, a is H, X is X10, $R_{15}'$ is H and $R_{14}'$ is a $C_{11}$-$C_{28}$ Unsaturated-Acyclic-Hydrocarbyl, and II) One S1 Unit Wherein m=0, n>1, a is H, X is X11, $R_{17}'$ is H and $R_{16}'$ is $C_{11}$-$C_{28}$ Unsaturated-Acyclic-Hydrocarbyl, and III) One S2 Unit Wherein w>1, Z is Z3, $R_9''$ is H, $R_{10}''$ is H and $R_{11}''$ is $C_4H$

PEX6

A solution of 24.24 g non-purified cyclohexene oxide (0.247 mol), 28.56 g vinylcyclohexene oxide (0.230 mol), 0,633 g of the catalyst of Example B (1.00 mmol) 0,122 g dimethylaminopyridine (1.00 mmol) and 0,540 g water (30 mmol, as chain transfer agent) in non-purified toluene (35 mL) was transferred into a 250 mL stainless steel Büchi reactor and flushed 5 times with $CO_2$ (0.5 MPa). The reaction mixture was then pressurized to 2.0 MPa with $CO_2$, heated to 80° C. and stirred mechanically during 16 hours. The volatiles were then removed in vacuum (rotatory evaporator), affording a viscous dark red residue that was purified by column chromatography over alumina (eluent: $CH_2Cl_2$). The resulting polymer bearing pendant carbon-carbon double bonds was isolated as a pale yellow solid was used for epoxidation reaction without further purification (40 g, 73% yield, $M_n$=2170 Da, D=1.3, $T_g$=76° C.). The epoxidation reaction of the pendant carbon-carbon double bonds of the polymer isolated above was carried out by using an aqueous hydrogen peroxide solution (35%) (HP) and acetic acid (AA) in a molar ratio 1/2/2 (unsaturation/AA/HP) and 44 g Amberlite IR-120/mol unsaturation. 35.4 g of the isolated polymer bearing carbon-carbon double bonds (=113 mmol unsaturated groups), 4.96 g Amberlite IR-120 and 10.39 g AA (226 mmol) were weighted and diluted with 83 g Toluene. 21.92 g HP solution (226 mmol) was dosed in 20 minutes at 75° C. After 5 hours at 75° C. 95% conversion of the pendant carbon-carbon double bonds to oxirane groups was accomplished (determined by $^1$H-NMR). Subsequently the solution was transferred in a separation funnel and washed once with 50 mL of a 5% bicarbonate solution, once with 50 mL of a 5% NaCl solution and once with 50 mL of demineralized water. The toluene layer was dried with $MgSO_4$ and subsequently the solvent was evaporated and the polymer bearing pendant oxirane groups was collected (28 g, 60% yield, $M_n$=2250 Da, D=1.3, $T_g$=75° C.). Subsequently, 20.0 g of the polymer bearing oxirane pendant groups (64.5 mmol oxirane groups), 11.5 g soya oil fatty acid (41.1 mmol) and 0.21 g triphenylethylphosphonium bromide (7.77 mmol) were dissolved in 31.5 g xylene and heated with stirring for 4.5 hours at 130° C. under a nitrogen atmosphere. The reaction was followed by measuring the acid value and continued until the acid value had reached a value below 1 mg KOH/g. The final product has an oil length of 41%, $M_n$=3.35×$10^3$ Da, D=1.5, $T_g$=26° C.).

2.7 Example 7: Preparation of a Polymer of § 1.1 Consisting of

I) One S1 Unit Wherein m=0, n>1, a is $CH_3$, X is X10, $R_{15}'$ is $CH_3$ and $R_{14}'$ is a $C_{11}$-$C_{28}$ Unsaturated-Acyclic-Hydrocarbyl, and II) One S1 Unit Wherein m=0, n>1, a is $CH_3$, X is X11, $R_{17}'$ is $CH_3$ and $R_{16}'$ is $C_{11}$-$C_{28}$ Unsaturated-Acyclic-Hydrocarbyl

PEX7

17.5 g of P2.2a-2 (82.4 mmol oxirane groups), 19.9 g soya oil fatty acid (71.1 mmol) and 0.25 g triphenylethylphosphonium bromide were heated with stirring for several hours at 130° C. under a nitrogen atmosphere. The reaction was followed by measuring the acid value and continued until the acid value had reached a value below 3 mg KOH/g. ($M_n$=29×10$^3$ Da, D=5.5, MRQ=1.2). The polymer had an oil length of 59%.

2.8 Example 8: Preparation of a Polymer of § 1.1 Consisting of

I) One S1 Unit Wherein m=0, n>1, a is $CH_3$, X is X10, $R_{15}'$ is $CH_3$ and $R_{14}'$ is $CH=CH_2$, and II) One S1 Unit Wherein m=0, n>1, a is $CH_3$, X is X11, $R_{17}'$ is $CH_3$ and $R_{16}'$ is C Monohydrocarbyl-Fatty-Group

PEX8

6.0 g of P2.2a-2 (28.3 mmol oxirane groups), 4.0 g isostearic acid (14.1 mmol), 0.72 g acrylic acid (10.0 mmol), 0,050 g hydroquinone monomethyl ether and 0.1 g triphenylethylphosphonium bromide were dissolved in 5 mL xylene and heated with stirring for several hours at 115° C. under a nitrogen atmosphere. The reaction was followed by measuring the acid value and continued until the acid value had reached a value below 3 mg KOH/g. Subsequently the xylene was evaporated and the polymer was collected as a yellow high viscous liquid ($M_n$=26.7×10$^3$ Da, D=1.4, MRQ=1.2).

2.9 Example 9: Preparation of a Polymer of § 1.5 Consisting of

I) One S1 Unit Wherein m=1, n>1, a is H, Y is Y20, X is X10, $R_{15}'$ is H and $R_{14}'$ is a $C_{11}$-$C_{28}$ Unsaturated-Acyclic-Hydrocarbyl, and II) One S1 Unit Wherein m=1, n>1, a is H, Y is Y20, X is X11, $R_{17}'$ is H and $R_{16}'$ is $C_{11}$-$C_{28}$ Unsaturated-Acyclic-Hydrocarbyl, and III) One S2 Unit Wherein w>1, Z is Z3, Y is Y20, $R_9''$ is H, $R_{10}''$ is H and $R_1''$ is $C_4H_8$

PEX9

148.1 g of phthalic anhydride (1.00 mol) and 3.65 g cetyltrimethylammonium bromide (10.0 mmol) were dissolved in 125 g xylene and heated to 170° C. A mixture of 62.1 g vinylcyclohexene oxide (0.50 mol) and 49.1 g cyclohexene oxide (0.50 mol) was dosed over 30 minutes. The progress of the reaction was monitored by acid value measurements; the reaction pursued up until an acid value of 2 mg KOH/g was reached. Subsequently, the pendant carbon-carbon double bonds of the polymer were epoxidised by initially dissolving 50 g of the polymer (containing 95 mmol carbon-carbon double bonds) in a solution of 2.8 g formic acid (47.5 mmol) in 50 g toluene and subsequently having dosed 20 g of hydrogen peroxide (35% solution) into the aforementioned solution over 30 minutes 40° C. The progress of the reaction (conversion) was followed by by $^1$H-NMR. The reaction continued at 40° C. for as long as a conversion of the pendant carbon-carbon double bonds to the corresponding oxirane groups reached a value of about 95%. Subsequently, the transparent reaction mixture was transferred into a separation funnel and washed once with 50 mL of a 5% bicarbonate solution, once with 50 mL of a 5% NaCl solution and once with 50 mL of demineralized water. Subsequently, the toluene layer was isolated and dried with MgSO4 and afterwards the polymer (bearing pendant oxirane groups) was collected upon evaporation of the solvent. Subsequently, 20.0 g of the polymer bearing oxirane pendant groups (36 mmol oxirane groups), 6.4 g soya oil fatty acid (22.9 mmol) and 0.12 g triphenylethylphosphonium bromide (4.34 mmol) were mixed in 31.5 g xylene and mechanically stirred for 4.5 hours at 130° C. under a nitrogen atmosphere. The progress of the reaction was monitored by measuring the acid value and it continued up until the acid value reached a value of about 0.8 mg KOH/g. Once the desired acid value was achieved, the polymer was discharged from the reaction vessel and collected.

2.10 Example 10: Preparation of a Polymer of § 1.5 Consisting of

I) One S1 Unit Wherein m=1, n>1, a is H, Y is Y20, X is X10, $R_{15}'$ is H and $R_{14}'$ is a $C_{11}$-$C_{28}$ Unsaturated-Acyclic-Hydrocarbyl, and II) One S1 Unit Wherein m=1, n>1, a is H, Y is Y20, X is X11, $R_{17}'$ is H and $R_{16}'$ is $C_{11}$-$C_{28}$ Unsaturated-Acyclic-Hydrocarbyl, and III) One S2 Unit Wherein w>1, Z is Z2, Y is Y20, $R_5''$ is H, $R_6''$ is H, $R_7''$ is H and $R_8''$ is $C_9H_{19}$

PEX10

148.1 g of phthalic anhydride (1.00 mol) and 3.65 g cetyltrimethylammonium bromide (10.0 mmol) were dissolved in 125 g xylene and the solution was heated to 170° C. A mixture of 62.1 g vinylcyclohexene oxide (0.50 mol) and 114.2 g Cardura E10P (0.50 mol) was dosed over 30 minutes. The progress of the reaction was monitored by acid value measurements; the reaction pursued up until an acid value of 3 mg KOH/g was reached. Subsequently, the pendant carbon-carbon double bonds of the polymer were epoxidised by initially dissolving 50 g of the polymer (containing 76 mmol carbon-carbon double bonds) in a solution of 2.3 g formic acid (38 mmol) in 50 g toluene and subsequently having dosed 16 g of hydrogen peroxide (35% solution) into the aforementioned solution over 30 minutes 40° C. The progress of the reaction (conversion) was followed by by $^1$H-NMR. The reaction continued at 40° C. for as long as a conversion of the pendant carbon-carbon double bonds to the corresponding oxirane groups reached a value of about 95%. Subsequently, the reaction mixture was transferred into a separation funnel and washed once with 50 mL of a 5% bicarbonate solution, once with 50 mL of a 5% NaCl solution and once with 50 mL of demineralized water. Subsequently, the toluene layer was isolated and dried with MgSO4 and afterwards the polymer (bearing pendant oxirane groups) was collected upon evaporation of the solvent. Subsequently, 20.0 g of the polymer bearing oxirane pendant groups (29 mmol oxirane groups), 5.2 g soya oil fatty acid (18.5 mmol) and 0.09 g triphenylethylphosphonium bromide (3.5 mmol) were mixed in 31.5 g xylene and mechanically stirred for 4.5 hours at 130° C. under a nitrogen atmosphere. The progress of the reaction was monitored by measuring the acid value and it continued up until the acid value reached a value of about 1 mg KOH/g. Once the desired acid value was achieved, the polymer was discharged from the reaction vessel and collected.

2.11 Example 11: Preparation of a Polymer of § 1.4 Consisting of

I) One S1 Unit Wherein m=0, n>1, a is H, X is X7; and

II) One S2 Unit Wherein w>1, Z is Z1, $R_5''$ is H, $R_6''$ is H, $R_7''$ is H and $R_8''$ is $CH_3$

PEX11

The polymerization was carried out at 25° C. in bulk. The catalyst of Example A (6.7 mmol) was dissolved in a mixture of vinylcyclohexene oxide (62.1 g, 0.5 mol) and propylene oxide (29.0 g, 0.5 mol). Subsequently, the solution was transferred into a stainless steel (700 mL) pressure reactor. The reactor was sealed off and degassed with nitrogen and subsequently pressurized up to a pressure of 4 MPa with $CO_2$. The mixture was allowed to react for 14 hours. Afterwards, the reaction mixture was dissolved in a small amount of dichloromethane and it was precipitated with a large excess of methanol. The polymer thus isolated was washed with methanol to remove the catalyst and any unreacted monomers, and it was dried in a vacuum. Subsequently, the pendant carbon-carbon double bonds of the isolated polymer were epoxidized as follows: 50 g of the polymer containing containing 185 mmol carbon-carbon double bonds were dissolved in a solution of 5.5 g formic acid (93 mmol) in 50 g toluene. Subsequently, 39 g hydrogen peroxide (35% solution) were dosed into the solution over 30 minutes at 40° C. The progress of the reaction (conversion) was monitored by $^1$H-NMR. The reaction continued at 40° C. for as long as the conversion of the pendant carbon-carbon double bonds to the corresponding oxirane groups reached a value of about 95%.

Subsequently, the reaction mixture was transferred into a separation funnel and washed once with 50 mL of a 5% bicarbonate solution, once with 50 mL of a 5% NaCl solution and once with 50 mL of demineralized water. Subsequently, the toluene layer was isolated and dried with MgSO4 and afterwards the polymer (bearing pendant oxirane groups) was collected upon evaporation of the solvent. Subsequently, 20.0 g of the polymer bearing oxirane pendant groups (66 mmol oxirane groups) were dissolved in a solution of lithium bromide (0.25 g, 2.9 mmol) in 75 mL dimethylformamide. The thus prepared solution was transferred into a stainless steel 700 mL pressure reactor. The reactor was sealed off degassed with nitrogen and pressurized with carbon dioxide up to a pressure of 4 MPa. The mixture was allowed to react for 14 hours. Afterwards, the reaction mixture was dissolved in a small amount of THF and precipitated with a large excess of $H_2O$/methanol (v/v: 50/50). The thus isolated polymer was washed with water and dried in vacuum.

2.12 Example 12: Preparation of a Polymer of § 1.3 Consisting of

I) One S2 Unit Wherein Z=Z3, $R_9'''=CH_3$, $R_{10}'''=H$, $R_{11}'''=C_7H_{13}O$, and II) One S2 Unit Wherein Z=Z3, $R_9'''=H$, $R_{10}'''=H$, $R_{11}'''=C_4H_8$, and III) One S1 Unit Wherein m=0, n>1, a is $CH_3$, X is X10, $R_{15}'$ is $CH_3$ and $R_{14}'$ is a $C_{11}$-$C_{28}$ Unsaturated-Acyclic-Hydrocarbyl, and IV) One S1 Unit Wherein m=0, n>1, a is $CH_3$, X is X11, $R_{17}'$ is $CH_3$ and $R_{16}'$ is a $C_{11}$-$C_{28}$ Unsaturated-Acyclic-Hydrocarbyl

PEX12

The polymerization was performed at 25° C. in bulk. 5.76 grams of the catalyst of example A (Et-BDI)Zn[N(SiMe$_3$)$_2$], 168.24 grams of limonene dioxide (1.00 mol) and 196.28 grams of cyclohexene oxide (2.00 mol) were added to a stainless steel 700 mL pressure reactor. The reactor was closed and degassed with nitrogen followed by degassing with carbon dioxide while stirring was applied. Then the pressure was raised to 4.0 MPa whilst the temperature was maintained at 25° C. and the mixture was allowed to react for 30 hours in which time the stirrer was shut down after 15 minutes. Afterwards, the feed of $CO_2$ was stopped and the reactor remained at 25° C. for about 16 hours; during this time period the pressure gradually dropped to 0.6 MPa. Afterwards, the pressure was raised back up to 4 MPa and after 1 hour the pressure was released. A yellow viscous material was obtained and it was subsequently solubilized by the addition of 200 mL THF that were added to the reactor and the raising of the temperature to 40° C. The polymer contained in the THF solution was subsequently precipitated in methanol, and thus isolated. Afterwards, 81.4 g of the thus isolated polymer (223.3 mmol oxirane groups), 48.19 g soya oil fatty acid (172.2 mmol) and 0.62 g triphenylethylphosphonium bromide in 25 g xylene were stirred for 30 hours at 120° C. under a nitrogen atmosphere. The progress of the reaction was followed by monitoring the acid value and it continued up until the acid value reached a value of about 2 mg KOH/g. Once the desired acid value was achieved, the polymer was discharged from the reaction vessel and collected. The polymer had an oil length of 41%, an AV of 2.3 mg KOH/g and an OHV of 10.1 mg KOH/g (MRQ=3.9).

2.13 Example 13: Preparation of a Polymer of § 1.3 Consisting of

I) One S2 Unit Wherein Z=Z4, $R_{12}'''$=H, $R_{13}'''$=H, $R_{14}'''$=$C_4H_8$, Y is Y20, and II) One S2 Unit Wherein Z=Z4, $R_{12}'''$=H, $R_{13}'''$=H, $R_{14}'''$=$C_8H_{10}$, Y is Y20, and III) One S2 Unit Wherein Z=Z4, $R_{12}'''$=H, $R_{13}'''$=H, $R_{14}'''$=$C_6H_{10}O$, Y is Y20, and IV) One S1 Unit Wherein m=1, n>1, a is H, X is X10, $R_{15}'$ is H and $R_{14}'$ is a $C_{11}$-$C_{28}$ Unsaturated-Acyclic-Hydrocarbyl, Y is Y20, and V) One S1 Unit Wherein m=1, n>1, a is H, X is X11, $R_{17}'$ is H and $R_{16}'$ is a $C_{11}$-$C_{28}$ Unsaturated-Acyclic-Hydrocarbyl, Y=Y20

PEX13

326.43 g of phthalic anhydride (2.40 mol) and 1.81 g sodiumacetate (24.0 mmol) were dissolved in 300 g xylene and heated to 140° C. In 0.75 hours a mixture of 184.75 g vinylcyclohexene oxide (1.62 mol) and 73.91 g cyclohexene oxide (0.82 mol) was dosed. The reaction was followed by measuring the acid value and continued until the acid value has a value of about 2 mg KOH/g. Subsequently, 230.51 g of this polymer (638 mmol pendant carbon-carbon double bonds), 25.17 g Amberlite IR-120 (strong cationic ion exchange resin) and 75.58 g acetic acid were diluted in 220 g toluene. Than 85.6 g hydrogen peroxide (35% solution) was dosed in 30 min at 50° C. 5 to the solution. The progress of the reaction (conversion) was followed by H-NMR. The reaction was continued at 50° C. for as long as a conversion of the pendant carbon-carbon double bonds to the corresponding oxirane groups reaches a value of 90%. Subsequently, the mixture was precipitated in 1500 ml ice cold methanol. The precipitated polymer was dried overnight in a vacuum oven at 30° C. Subsequently, 119 g of the polymer bearing oxirane pendant groups (285 mmol oxirane groups), 67.88 g soya oil fatty acid (243 mmol) and 0.84 g triphenylethylphosphonium bromide were dissolved in 25 g xylene and heated with stirring for 16 hours at 130° C. under a nitrogen atmosphere. The reaction was followed by measuring the acid value and was continued until the acid value reached a value below 2 mg KOH/g. Once the desired acid value was achieved the polymer was discharged from the reaction vessel and collected. The polymer had an oil length of 40%, an AV of 1.2 mg KOH/g and an OHV of 74.8 mg KOH/g (MRQ=2).

2.14 Example 14: Preparation of a Polymer of § 1.1 Consisting of

I) One S1 Unit Wherein m=0, n>1, a is H, X is X10, $R_{15}'$ is H and $R_{14}'$ is a $C_{11}$-$C_{28}$ Unsaturated-Acyclic-Hydrocarbyl, and II) One S1 Unit Wherein m=0, n>1, a is H, X is X11, $R_{17}'$ is H and $R_{16}'$ is a $C_{11}$-$C_{28}$ Unsaturated-Acyclic-Hydrocarbyl, and III) One S1 Unit Wherein m=1, n>1, a is H, X is X10, $R_1'$ is H and $R_{14}'$ is a $C_{11}$-$C_{28}$ Unsaturated-Acyclic-Hydrocarbyl, Y=Y5 Wherein $R_{13}$ is H and $R_{14}$ is H, and IV) One S1 Unit Wherein m=1, n>1, a is H, X is X11, $R_{17}'$ is H and $R_{16}'$ is a $C_{11}$-$C_{28}$ Unsaturated-Acyclic-Hydrocarbyl, Y=Y5 Wherein $R_{13}$ is H and $R_{14}$ is H

PEX14

11.4 g of glutaric anhydride (0.10 mol), 24.8 g 4-vinylcyclohexene oxide (0.20 mol), 0,506 g the catalyst of example B (0.8 mmol) and 0.10 g dimethylamino pyridine (0.8 mmol) were dissolved in 100 g toluene. The reactor was pressurized two times with nitrogen (3 bar) and two times with $CO_2$ (3 bar) and heated to 80° C. After 1 hour, the pressure was increased to 50 bar $CO_2$. After 6 hours, the pressure was released and the product discharged. After removing the toluene with a rotary evaporator, the product was dissolved in tetrahydrofuran and precipitated in ice-cold methanol. After filtration, the product was dried in a vacuum oven for 5 hours at 70° C. The resulting polymer bearing pendant carbon-carbon double bonds was used for epoxidation reaction without further purification ($T_g$=15° C. and 50° C., $M_n$=2.800 g/mol. Carbonate/ester ratio=20/80 (determined by $^1$H-NMR).

The epoxidation reaction of the pendant carbon-carbon double bonds of the polymer isolated just above was carried out by using an aqueous hydrogen peroxide solution (35%) (HP) and formic acid (FoA) in a molar ratio 1/2/10 (unsaturation/FoA/HP) at 40° C. in refluxing dichloromethane. 7 g of the poly(ester-co-carbonate) (0.020 mol unsaturation) and 1.85 g formic acid (0.040 mol) were weighted and diluted with 40 g dichloromethane. The mixture was stirred for 30 minutes. 20 g of a 35% aqueous hydrogen peroxide solution (0.20 mol) was added drop-wise at a rate such that the addition was completed in 30 min at 40° C. and the reaction was continued for 10 hours. After 10 hours, the reaction mixture was washed in a separating funnel with 20 ml of a 5% sodiumbicarbonate solution, with 20 ml of a 5% sodiumchloride solution and with 20 ml water successively. The collected water layers were washed once with 20 ml dichloromethane. The conversion was determined by $^1$H-NMR. 42% conversion of the pendant double bonds to the corresponding epoxide groups was achieved. The obtained polymer bearing oxirane pendant groups had a $M_n$ of $3.6 \times 10^3$ Da.

Subsequently, 5.0 g of the polymer bearing oxirane pendant groups (6.02 mmol oxirane groups), 1.6 g soya oil fatty acid (5.72 mmol) and 19.6 mg triphenylethylphosphonium bromide (0.73 mmol) were dissolved in 7.0 g xylene and heated with stirring for 6 hours at 130° C. under a nitrogen atmosphere. The progress of the reaction was monitored by acid values measurements and it continued up until the acid value reached a value of about 1 mg KOH/g. The final product had an oil length of 27% and an acid value of 0.5 mg KOH/g.

3. Examples of Compositions

Example 3.1: Preparation of the Inventive Composition PEX7-C

An amount of PEX7 (100 g) was solubilized in xylene (100 g) to afford a 50% w/w solution of PEX7 in xylene. Subsequently an amount of Borchi® Oxy Coat (0.7 g that correspond to an amount of the organic metal salt contained in Borchi® Oxy Coat of 0.007 pph PEX7) was diluted into the solution to afford the PEX7-Composition (the total of PEX7 and Borchi® Oxy Coat is an example of a binder according to the invention).

Example 3.2: Preparation of the Inventive Composition PEX12-C

An amount of PEX12 (100 g) was solubilized in xylene (100 g) to afford a 50% w/w solution of PEX12 in xylene. Subsequently an amount of Borchi® Oxy Coat (0.7 g that correspond to an amount of the organic metal salt contained in Borchi® Oxy Coat of 0.007 pph PEX12) was diluted into the solution to afford the PEX12-C (the total of PEX12 and Borchi® Oxy Coat is an example of a binder according to the invention).

Example 3.2: Preparation of the Inventive Composition PEX13-C

An amount of PEX13 (100 g) was solubilized in xylene (100 g) to afford a 50% w/w solution of PEX13 in xylene. Subsequently an amount of Borchi® Oxy Coat (0.7 g that correspond to an amount of the organic metal salt contained in Borchi® Oxy Coat of 0.007 pph PEX13) was diluted into the solution to afford the PEX13-C (the total of PEX13 and Borchi® Oxy Coat is an example of a binder according to the invention).

4. Examples of Comparative Polymers

Example 4.1: Preparation of Comparative Polymer CPEX1

(CPEX1 lacks an S1 unit and an S2 unit)

239 g of phthalic anhydride, 29 g benzoic acid, 119 g pentaerythritol, 119 g trimethylol propane, 5 g polyethylene glycol ($M_n=4\times10^3$ Da) and 557 g of soya oil fatty acid were polymerized via melt-polycondensation under a nitrogen atmosphere. The monomers were charged into a reaction vessel at room temperature and subsequently were gradually heated up to 245° C. over 6 hours. The polycondensation (first signs of water being evolved) started once the reaction mixture reached a temperature of about 160° C. During the polycondensation, the water evolved was continuously being removed from the reaction mixture by azeotropic distillation in the presence of xylene and the use of a Dean-Stark trap. After reaching the desired AV the reaction mixture was cooled down to 180° C. and vacuum was applied to remove the xylene. Subsequently, the polymer was discharged from the reaction vessel. The polymer had an oil length of 59 wt %, $M_n$ of $3.5\times10^3$ Da and an AV of 6 mg KOH/g.

Example 4.2: Preparation of Comparative Polymer CPEX2 i) One S2 Unit Wherein Z=Z3, $R_9'''$=$CH_3$, $R_{10}'''$=H, $R_{11}'''$=$CH_{13}O$, and ii) One S2 Unit Wherein Z=Z3, $R_9'''$=H, $R_{10}'''$=H, $R_{11}'''$=$C_4H_8$ CPEX2; Lacks an S1 Unit The polymerization was performed at 25° C. in bulk. 5.76 grams of the catalyst of example A (Et-BDI)Zn[N(SiMe$_3$)$_2$], 168.24 grams of limonene dioxide (1.00 mol) and 196.28 grams of cyclohexene oxide (2.00 mol) were added to a stainless steel 700 mL pressure reactor. The reactor was closed and degassed with nitrogen followed by degassing with carbon dioxide while stirring was applied. Then the pressure was raised to 4.0 MPa at 25° C. and the mixture was allowed to react for 30 hours in which time the stirrer was shut down after 15 minutes. Then the reactor was closed for the night and the next morning the pressure was 0.6 MPa. The pressure was raised to 4 MPa and after one hour the pressure was released. A yellow viscous material was obtained. 200 mL THE was added to the reactor to dissolve the fully soluble polymer material at 40° C. and then discharge. The polymer solution in THE was precipitated in methanol and the polymer was isolated.

Example 4.3: Preparation of Comparative Polymer i) One S2 Unit Wherein Z=Z4, $R_{12}'''$=H, $R_{13}'''$=H, $R_{14}'''$=$C_4H_8$, Y is Y20, and ii) One S2 Unit Wherein Z=Z4, $R_{12}'''$=H, $R_{13}'''$=H, $R_{14}'''$=$C_6H_{10}$, Y is Y20

CPEX3; Lacks One S1 Unit 326.43 g of phthalic anhydride (2.40 mol) and 1.81 g sodium acetate (24.0 mmol) were dissolved in 300 g xylene and heated to 140° C. In 0.75 hours a mixture of 184.75 g vinylcyclohexene oxide (1.62 mol) and 73.91 g cyclohexene oxide (0.82 mol) was dosed. The reaction was followed by measuring the acid value and continued until the acid value has a value of about 2 mg KOH/g upon which the polymer was discharged. The obtained polymer had an AV of 0.5 mg KOH/g and an OHV of 4.2 mg KOH/g.

5. Examples of Comparative Compositions

Example 5.1: Preparation of the Comparative Composition CPEX1-C

An amount of CPEX1 (100 g) was solubilized in xylene (100 g) to afford a 50% w/w solution of CPEX1 in xylene. Subsequently an amount of Borchi® Oxy Coat (0.7 g that correspond to an amount of the organic metal salt contained in Borchi® Oxy Coat of 0.007 pph CPEX1) was diluted into the solution to afford the CPEX1-C.

Example 5.2: Preparation of the Comparative Composition CPEX2-C

An amount of CPEX2 (100 g) was solubilized in xylene (100 g) to afford a 50% w/w solution of CPEX2 in xylene. Subsequently an amount of Borchi® Oxy Coat (0.7 g that correspond to an amount of the organic metal salt contained in Borchi® Oxy Coat of 0.007 pph CPEX2) was diluted into the solution to afford the CPEX2-C.

Example 5.3: Preparation of the Comparative Composition CPEX3-C

An amount of CPEX3 (100 g) was solubilized in xylene (100 g) to afford a 50% w/w solution of CPEX3 in xylene. Subsequently an amount of Borchi® Oxy Coat (0.7 g that correspond to an amount of the organic metal salt contained in Borchi® Oxy Coat of 0.007 pph CPEX3) was diluted into the solution to afford the CPEX3-C.

6. Examples of Coatings & Assessment of their Properties

Examples of Coatings Prepared from the Comparative Compositions CPEX1-C, CPEX2-C, CPEX3-C and of Coatings Prepared from the Inventive Compositions PEX7-C, PEX12-C and PEX13-C The comparative compositions (CPEX1-C, CPEX2-C, CPEX3-C) and the inventive compositions (PEX7-C, PEX12-C, PEX13-C) were used to prepare coatings according to the following procedure: an amount of each of composition was applied on i) a set of glass plates [intended for the testing of the water resistance (WR), the Koenig hardness (KH) and the assessment of the surface drying rate (measurement of the DFT)] and ii) on a set of ALQ-46 panels [intended for the testing of the chemical resistance (CR)] using a film applicator with a slit of 100 μm, to afford uncured ('wet') films.

Assessment of the WR, KH and CR:

The films thus prepared were left to cure and dry under standard drying conditions for a total time period of 168 hours starting from the point in time these films were applied on the glass and on the metal plates, to ultimately afford comparative coatings CPEX1-COA, CPEX2-COA and CPEX3-COA and inventive coatings PEX7-COA, PEX12-COA and PEX13-COA, respectively. The thickness of any one of PEX7-, PEX12-, PEX13-Coating, CPEX1-, CPEX2-, CPEX3-coating after 168 hours of drying was 30±2 μm.

Assessment of the surface drying rate (measurement of the DFT): The films thus prepared were immediately (no time for curing) subjected to the 'cotton wool' test for the measurement of the DFT as this is disclosed herein.

The water resistance, the Koenig hardness, the surface drying rate and the chemical resistance of the above mentioned coatings are shown in Table 1.

The object of the invention was to provide for coating that have all of the following very desired properties:

i) excellent enhanced Koenig hardness, and
ii) good—preferably excellent—water resistance, and
iii) excellent surface drying rate, and
iv) good chemical resistance.

By the term 'a coating has excellent Koenig hardness' is meant herein that the Koenig hardness (KH)—as this is measured as disclosed herein—is ≥70 seconds, preferably ≥80 seconds, more preferably ≥90 seconds.

By the term 'a coating has good water resistance' is meant herein that once the coating is subjected to the water resistance test as this is disclosed herein, the coating scores 4.

By the term 'a coating has excellent water resistance' is meant herein that once the coating is subjected to the water resistance test as this is disclosed herein, the coating scores 5.

By the term 'a coating has excellent surface drying rate' is meant herein that the DFT of the coating—as this is measured as disclosed herein—is ≤30 minutes, preferably ≤25 minutes, more preferably ≤20 minutes.

It was surprisingly found (see Table 1) that only the polymers of the invention (and the compositions of the invention) as shown in the claims were able to afford coatings that had a combination of four very desired properties, such as:

i) excellent water resistance, and
ii) excellent Koenig hardness, and
iii) excellent surface drying rate, and
iv) good chemical resistance.

Each of the comparative polymers and their compositions failed to afford coatings that combined all of the four above-mentioned properties. The reasons being that the comparative polymer CPEX1 lacked an S1 unit and an S2 unit, whilst each of the comparative examples CPEX2 and CPEX3 lacked an S1 unit.

TABLE 1

| Property of coating | Comparative Coating | | | Inventive Coating | | |
|---|---|---|---|---|---|---|
| | CPEX1-COA | CPEX2-COA | CPEX3-COA | PEX7-COA | PEX12-CO4 | PEX13-COA |
| Water resistance (scale: 0.5) | 5 | 0 | 0 | 5 | 5 | 5 |
| Koenig hardness (seconds) | 21 | 188 | 141 | 108 | 160 | 104 |
| Surface drying rate (DFT in minutes) | 120 | 15 | 15 | 10 | 15 | 15 |
| Chemical resistance (MEK double rubs) | 35 | 23 | 12 | 35 | 50 | 41 |
| Water resistance (scale: 0-5) | excellent | very poor | very poor | excellent | excellent | excellent |
| Koenig hardness (seconds) | very poor | excellent | excellent | excellent | excellent | excellent |
| Surface drying rate (DFT in minutes) | poor | excellent | excellent | excellent | excellent | excellent |
| Chemical resistance (MEK double rubs) | good | poor | poor | good | good | good |

(Note:
numbers or words describing achieved properties in Table 1 in plain and italics represent properties that are below the desired performance level; the cells identified as "excellent" or "good" represent an achieved desired property).

The invention claimed is:

1. A polymer comprising one or more S1 units, wherein each S1 unit is represented by the following formula:

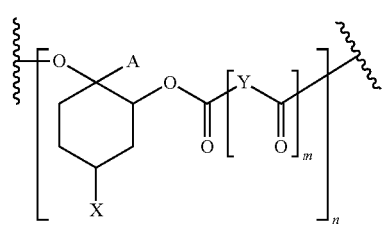

S1 and wherein
i) m is either 0 or 1,
ii) A is either H or $CH_3$, iii) n is an integer equal to or higher than 1, and iv) X is selected from the group consisting of X3, X4, X5, X6, X7, X10 and X11 as each of X3 to X11 is defined below, and wherein the black bold dot shown in each of the formulae of any one of X3 to X11 represents an attachment point of each of X3 to X11 to the S1 unit, and wherein the attachment point is a carbon atom,

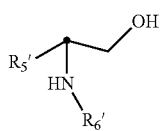
X3

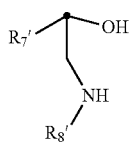
X4

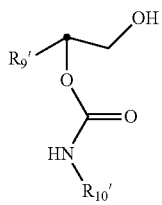
X5

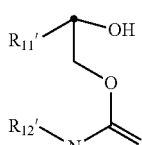
X6

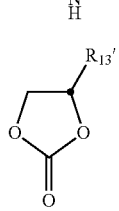
X7

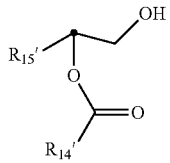
X10

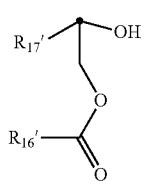
X11 wherein $R_5'$, $R_7'$, $R_9'$, $R_{11}'$, $R_{13}'$, $R_{15}'$, $R_{17}'$ is each independently selected from the group consisting of H and $CH_3$, $R_6'$, $R_8'$ is each independently selected from the group consisting of H, $CH_3$, and $C_2$-$C_{34}$ optionally-substituted-hydrocarbyl, and $R_{10}'$, $R_{12}'$, $R_{14}'$, $R_{16}'$ is each independently selected from the group consisting of $CH_3$, and $C_2$-$C_{34}$ optionally-substituted-hydrocarbyl, and v) Y is selected from the group consisting of Y1, Y5, Y10, Y11, Y12, Y13, Y14, Y15, Y16, Y17, Y18, Y19, and Y20, as each of Y1 to Y20 is defined below and wherein the black bold dots shown in each of the formulae of any one of Y1 to Y20 represent the attachment points of each of Y1 to Y20 to the S1, wherein each attachment point is a carbon atom,

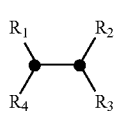
Y1

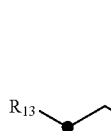
Y5

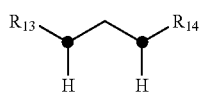

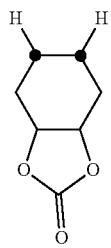
Y10

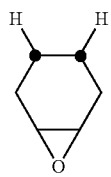
Y11

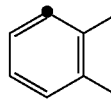
Y12

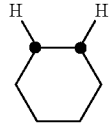
Y13

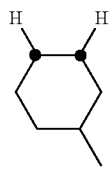
Y14

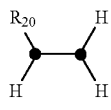
Y15

Y16

-continued

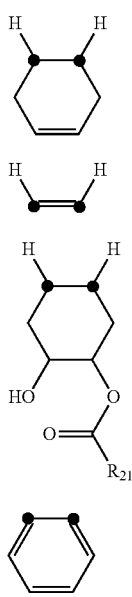

Y17

Y18

Y19

Y20 wherein $R_1$, $R_2$, $R_3$, $R_4$, $R_{13}$, $R_{14}$ and $R_{21}$ is each independently selected from the group consisting of H, CH$_3$, and C$_2$-C$_{34}$ optionally-substituted-hydrocarbyl, with the proviso that none of $R_1$, $R_2$, $R_3$, $R_4$, $R_{13}$, $R_{14}$ and $R_{21}$ comprises any carboxyl group or any anhydride group, and $R_{20}$ is a C$_1$-C$_{34}$ optionally-substituted-hydrocarbyl.

2. The polymer according to claim 1, further comprising one or more S2 units, wherein each S2 unit is represented by the following formula:

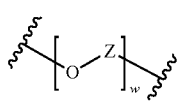

S2 and wherein

S1 and S2 may or may not be directly connected to each other along the polymer's backbone, w is an integer equal to or higher than 1, Z is selected from the group consisting of Z1, Z2, Z3 and Z4 as each of Z1 to Z4 is defined below, and wherein each of the black bold dots shown in the formulae of any one of Z1 to Z4 represents an attachment point of each of Z1 to Z4 to the S2 unit, wherein the attachment point is a carbon atom, with the proviso that the O of the [—O—Z—]$_w$ group is connected to the a-carbon atom in any one of Z1 to Z4,

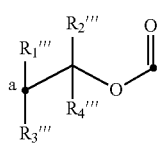

Z1

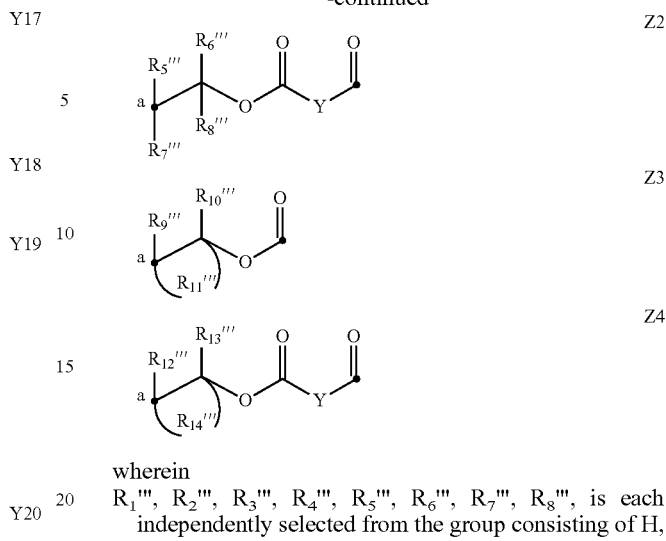

wherein $R_1'''$, $R_2'''$, $R_3'''$, $R_4'''$, $R_5'''$, $R_6'''$, $R_7'''$, $R_8'''$, is each independently selected from the group consisting of H, CH$_3$, and C$_2$-C$_{202}$ optionally-substituted-hydrocarbyl, preferably a C$_2$-C$_{36}$ optionally-substituted-hydrocarbyl, $R_9'''$, $R_{10}'''$, $R_{12}'''$, $R_{13}'''$ is each independently selected from the group consisting of H, CH$_3$, and C$_2$-C$_{34}$ optionally-substituted-hydrocarbyl, and $R_{11}'''$, $R_{14}'''$ is each independently selected from a C$_1$-C$_{34}$ optionally-substituted-hydrocarbylene.

3. The polymer according to claim 1, wherein X is selected from the group consisting of X10 and X11, and wherein $R_{14}'$ is a C$_{11}$-C$_{28}$ unsaturated-acyclic-hydrocarbyl,
$R_{15}'$ is H or CH$_3$,
$R_{16}'$ is a C$_{11}$-C$_{28}$ unsaturated-acyclic-hydrocarbyl, and
$R_{17}'$ is H or CH$_3$.

4. The polymer according to claim 1, wherein m=1 and wherein X is selected from the group consisting of X10 and X11, and wherein $R_{14}'$ is a C$_{11}$-C$_{28}$ unsaturated-acyclic-hydrocarbyl,
$R_{15}'$ is H or CH$_3$, and
$R_{16}'$ is a C$_{11}$-C$_{28}$ unsaturated-acyclic-hydrocarbyl,
$R_{17}'$ is H or CH$_3$, and wherein
Y is selected from the group consisting of Y16, Y17, Y18, Y19 and Y20.

5. The polymer according to claim 2, wherein
each of $R_1'''$, $R_2'''$, $R_3'''$, $R_5'''$, $R_6'''$, $R_7'''$, $R_9'''$, $R_{10}'''$, $R_{12}'''$, $R_{13}'''$ is H,
each of $R_4'''$, $R_8'''$ is a C$_2$-C$_{36}$ optionally-substituted-hydrocarbyl, and
each of $R_{11}'''$, $R_{14}'''$ is a C$_1$-C$_{34}$ optionally-substituted-hydrocarbylene.

6. The polymer according to claim 5, wherein X is selected from the group consisting of X10 and X11, and wherein $R_{14}'$ is a C$_{11}$-C$_{28}$ unsaturated-acyclic-hydrocarbyl,
$R_{15}'$ is H or CH$_3$,
$R_{16}'$ is a C$_{11}$-C$_{28}$ unsaturated-acyclic-hydrocarbyl, and
$R_{17}'$ is H or CH$_3$.

7. The polymer according to claim 5, wherein m=1 and wherein X is selected from the group consisting of X10 and X11, and wherein $R_{14}'$ is a C$_{11}$-C$_{28}$ unsaturated-acyclic-hydrocarbyl,
$R_{15}'$ is H or CH$_3$,
$R_{16}'$ is a C$_{11}$-C$_{28}$ unsaturated-acyclic-hydrocarbyl,
$R_{17}'$ is H or CH$_3$, and wherein
Y is selected from the group consisting of Y16, Y17, Y18, Y19 and Y20.

8. The polymer according to any one of claims 1-7, wherein the polymer has a Molar Ratio Q (MRQ) determined via NMR spectroscopy of at least 1 and at most 10, where MRQ is:

$$MRQ = \frac{S_{total}}{S_{specific}} = \frac{S_{specific} + S_{rest}}{S_{specific}}$$

wherein $S_{total}=S_{specific}+S_{rest}$, and $S_{specific}$=(total moles S1)+(total moles S2), and $S_{rest}$=the total moles of all the units of a polymer wherein said units are not any one of S1, S2.

9. The polymer according to claim 8, wherein the polymer has a MRQ of at most 4.

10. The polymer according to any one of claims 1-7, wherein the polymer has:
   i) a number average molecular weight ($M_n$) of at least $10^3$ and at most $4 \times 10^4$ Da,
   ii) a polydispersity (D) ($D=M_w/M_n$) of at least 1,2 and at most 14,
   iii) a glass transition temperature ($T_g$) of at least −10 and at most 150° C.,
   iv) an acid value (AV) of at most 10 mg KOH/g,
   v) a hydroxyl value (OHV) of at least 10 and at most 250, and
   vi) a functionality (f) of at least 0.2 and at most 50, wherein
   $M_w$ is weight average molecular weight measured via Gel Permeation Chromatography,
   $M_n$ is measured via Gel Permeation Chromatography,
   $T_g$ is measured via Differential Scanning Calorimetry
   AV is measured titrimetrically via ISO 2114,
   OHV is measured titrimetrically via ISO 4629, and
   f is determined by the equation:

$$f = \frac{[M_n \times (AV + OHV)]}{56110}.$$

11. The polymer according to any one of claims 1-7, wherein the polymer is ionic.

12. The polymer according to claim 8, wherein the polymer is ionic.

13. The polymer according to claim 9, wherein the polymer is ionic.

14. The polymer according to claim 10, wherein the polymer is ionic.

15. The polymer according to claim 10, wherein the polymer has a Molar Ratio Q (MRQ) determined via NMR spectroscopy of at least 1 and at most 4, where MRQ is:

$$MRQ = \frac{S_{total}}{S_{specific}} = \frac{S_{specific} + S_{rest}}{S_{specific}}$$

wherein $S_{total}=S_{specific}+S_{rest}$, and $S_{specific}$=(total moles S1)+(total moles S2), and $S_{rest}$=the total moles of all the units of a polymer wherein said units are not any one of S1, S2.

16. The polymer according to claim 15, wherein the polymer is ionic.

17. The polymer according to any one of claims 1-7, wherein the polymer has:
   i) a number average molecular weight (Mn) of at least $8 \times 10^2$ and at most $10^4$ Da,
   ii) a polydispersity (D) ($D=M_w/M_n$) of at least 1,1 and at most 4,
   iii) a glass transition temperature ($T_g$) of at least 20 and at most 150° C.,
   iv) an acid value (AV) of at least 0 and at most 250 mg KOH/g,
   v) a hydroxyl value (OHV) lower than 100 mg KOH/g, and
   vi) a functionality (f) of at least 3 and at most 20, wherein
   $M_w$ is weight average molecular weight measured via Gel Permeation Chromatography,
   $M_n$ is measured via Gel Permeation Chromatography,
   $T_g$ is measured via Differential Scanning Calorimetry,
   AV is measured titrimetrically via ISO 2114,
   OHV is measured titrimetrically via ISO 4629, and
   f is determined by the equation:

$$f = \frac{[M_n \times (AV + OHV)]}{56110}.$$

18. The polymer according to claim 17, wherein the polymer has a Molar Ratio Q (MRQ) determined via NMR spectroscopy of at least 1 and at most 4, where MRQ is:

$$MRQ = \frac{S_{total}}{S_{specific}} = \frac{S_{specific} + S_{rest}}{S_{specific}}$$

wherein $S_{total}=S_{specific}+S_{rest}$, and $S_{specific}$=(total moles S1)+(total moles S2), and $S_{rest}$=the total moles of all the units of a polymer wherein said units are not any one of S1, S2.

19. A composition comprising a binder, wherein the binder comprises:
   i) the polymer according to claim 1, and
   ii) a constituent A selected from the group consisting of organic metal salt, thermal initiator, photoinitiator, copolymerizable agent and mixtures thereof.

20. A cured composition, wherein the composition is the composition as defined in claim 19 which is cured.

21. A product which comprises the polymer according to claim 1.

* * * * *